United States Patent
Shimada et al.

(10) Patent No.: US 6,826,724 B1
(45) Date of Patent: Nov. 30, 2004

(54) DOCUMENT PROCESSOR, DOCUMENT CLASSIFICATION DEVICE, DOCUMENT PROCESSING METHOD, DOCUMENT CLASSIFICATION METHOD, AND COMPUTER-READABLE RECORDING MEDIUM FOR RECORDING PROGRAMS FOR EXECUTING THE METHODS ON A COMPUTER

(75) Inventors: Atsuo Shimada, Kanagawa (JP); Tatsuo Miyachi, Tokyo (JP); Eiji Kenmochi, Tokyo (JP); Makoto Yamasaki, Tokyo (JP); Kazutoshi Takeya, Kanagawa (JP); Tetsuro Nagatsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/472,249

(22) Filed: Dec. 27, 1999

(30) Foreign Application Priority Data

Dec. 24, 1998 (JP) .......................................... 10-376576
Dec. 25, 1998 (JP) .......................................... 10-369589
Jan. 29, 1999 (JP) .......................................... 11-022915
Dec. 2, 1999 (JP) .......................................... 11-343890

(51) Int. Cl.$^7$ .......................................... G06F 15/00
(52) U.S. Cl. .......................................... 715/500; 707/4
(58) Field of Search .............................. 707/3, 4, 5, 6; 715/500; 382/224, 225

(56) References Cited

U.S. PATENT DOCUMENTS 5,072,367 A * 12/1991 Clayton et al. ................. 707/3
5,454,104 A * 9/1995 Steidlmayer et al. .......... 707/4
5,632,009 A    5/1997 Rao et al.

(List continued on next page.)

FOREIGN PATENT DOCUMENTS

| JP | 6-215036 | 8/1994 |
| JP | 7-114572 | 5/1995 |
| JP | 10-260991 | 9/1998 |
| JP | 10-283366 | 10/1998 |
| JP | 11-213000 | 8/1999 |

OTHER PUBLICATIONS

Patent Abstract of Japan, HEI 7–36897 A, Feb. 7, 1995.
Patent Abstract of Japan, HEI 6–176064 A, Jun. 24, 1994.
Hinrich Schuetze, et al., "Projections for Efficient Document Clustering", Proceedings of SIGIR, ACM, 1997, pp. 74–81.
Brian T. Bartell, et al., "Representing Documents Using an Explicit Model of Their Similarities", Journal of the American Society for Information Science, vol. 46, No. 4, May 1995, pp. 254–271.
Douglas R. Cutting, et al., "Scatter / Gather: A Cluster–based Approach to Browsing Large Document Collections", Proceedings of the 15$^{th}$ ACM/SIG–IR Conference, 1992, pp. 318–329.

(List continued on next page.)

Primary Examiner—Joseph Feild
Assistant Examiner—Maikhanh Nguyen
(74) Attorney, Agent, or Firm—Oblon, Spivak, McClelland, Maier & Neustadt, P.C.

(57) ABSTRACT

In the document processor, a document memory which stores input document data; a selector which selects all or part of document data stored in the document memory; a characteristics extractor which extracts data relating to characteristics of letter rows from all or part of the document data selected by the selector; a work processor which work-processes all or part of the document data based on the data relating to characteristics of letter rows extracted by the characteristics extractor; and an output section which outputs all or part of the document data work-processed by the work processor are provided.

11 Claims, 56 Drawing Sheets

U.S. PATENT DOCUMENTS

| | | | | |
|---|---|---|---|---|
| 5,710,916 A | * | 1/1998 | Barbara et al. | 707/9 |
| 5,717,914 A | * | 2/1998 | Husick et al. | 707/5 |
| 5,880,742 A | | 3/1999 | Rao et al. | |
| 5,893,092 A | * | 4/1999 | Driscoll | 707/5 |
| 5,899,992 A | * | 5/1999 | Iyer et al. | 707/7 |
| 6,125,362 A | * | 9/2000 | Elworthy | 707/6 |
| 6,128,410 A | * | 10/2000 | Park et al. | 382/218 |
| 6,192,360 B1 | * | 2/2001 | Dumais et al. | 707/6 |
| 6,212,532 B1 | * | 4/2001 | Johnson et al. | 715/500 |
| 6,249,779 B1 | * | 6/2001 | Hitt | 706/1 |
| 6,463,426 B1 | * | 10/2002 | Lipson et al. | 707/3 |
| 6,542,635 B1 | * | 4/2003 | Hu et al. | 382/173 |
| 6,562,077 B2 | * | 5/2003 | Bobrow et al. | 715/517 |
| 6,581,056 B1 | * | 6/2003 | Rao | 707/5 |

OTHER PUBLICATIONS

Ramana Rao, et al., "The Table Lens: Merging Graphical and Symbolic Representations in an Interactive Focus+Context Visualization for Tabular Information", Proceedings of the ACM CHI'94 Conference on Human Factors in Computing Systems, 1994, pp. 318–329.

Peter Pirolli, et al., "Table Lens as a Tool for Making Sense of Data", Proceedings of the Advanced Visual Interfaces (AVI–96) Workshops, Jun. 1996, 16 pgs.

Edward A. Fox, et al., "Users, User Interfaces, and Objects: Envision, a Digital Library", Journal of the American Society for Information Science, vol. 44, No. 8, Sep. 1993, pp. 480–491.

Lucy T. Nowell, et al., "Exploring Search Results with Envision", CHI 97 Electronic Publications: Demonstrations, 1997, 4 pgs.

U.S. patent application Ser. No. 09/472,249, Shimada et al., filed Dec. 27, 1999.

U.S. patent application Ser. No. 10/438,005, Yamasaki, filed May 15, 2003.

U.S. patent application Ser. No. 09/472,249, Shimada et al., filed Dec. 27, 1999.

U.S. patent application Ser. No. 10/447,223, Takahashi et al., filed May 29, 2003.

U.S. patent application Ser. No. 09/472,249, Shimada et al., filed Dec. 27, 1999.

U.S. patent application Ser. No. 10/600,342, Takeya, filed Jun. 23, 2003.

* cited by examiner-

FIG.5

| ITEM NAME | ITEM VALUE |
|---|---|
| APPLICATION NO. | JAPANESE PATENT APPLICATION LAID-OPEN NO. 10-00000 |
| DATE OF APPLICATION | JANUARY 1, 1998 |
| NUMBER OF CLAIMS | 3 |
| NAME OF INVENTION | IMAGE CREATING DEVICE |
| ADVANTAGES | THE IMAGE CREATING DEVICE OF THE PRESENT INVENTION COMPRISES.... |

FIG.7

| | CELL ATTRIBUTE VALUE 701 | POINTER TO CELL CONTENTS 702 | | | | | |
|---|---|---|---|---|---|---|---|
| NO.1000 | 2 | 3000 | 2 | 3018 | ... | 2 | 3327 |
| NO.1100 | 1 | 3421 | 1 | 3512 | ... | 1 | 3698 |
| ... | | | | | | | |
| NO.1500 | 0 | 0 | 0 | 0 | ... | 0 | 0 |

FIG.8

| NO. | DATE RECEIVED | SALES OFFICE | TYPE OF VEHICLE | YEAR | CONTENTS |
|---|---|---|---|---|---|
| 1 | 1997/3/5 | AICHI | ABC1800 | 1993 | LARGE NOISE POLLUTION |
| 2 | 1997/3/5 | TOYAMA | ABC2000 | 1995 | EXHAUST IS BLACK |
| 3 | 1997/3/5 | TOKYO | ABC1800 | 1996 | VEHICLE PAINT CHANGES COLOR |
| 4 | 1997/3/5 | SAPPORO | DEF1600 | 1995 | OIL LEAKS |
| 5 | 1997/3/5 | FUKUOKA | KLM1200 | 1992 | HEATER DOES NOT FUNCTION |
| 6 | 1997/3/5 | NOBORIBETSU | DEF1600 | 1994 | LARGE NOISE POLLUTION |
| 7 | 1997/3/5 | NAGANO | DEF1600 | 1996 | ENGINE WILL NOT START |
| 8 | 1997/3/5 | TOKYO | ABC1800 | 1997 | OVERHEAT OCCURS |
| 9 | 1997/3/5 | TAKAMATSU | XYZ3000 | 1992 | BATTERY IS DEAD |
| 10 | 1997/3/6 | NAGASAKI | KLM1200 | 1993 | ENGINE WILL NOT START |
| 11 | 1997/3/6 | OSAKA | ABC1600 | 1994 | EXHAUST IS BLACK |
| 12 | 1997/3/6 | NAGANO | DEF1600 | 1997 | RADIO DOES NOT WORK |
| 13 | 1997/3/6 | MORIOKA | ABC1800 | 1996 | PAINT IS PEELING |
| 14 | 1997/3/6 | SENDAI | XYZ3000 | 1995 | HEATER DOES NOT FUNCTION |

FIG.9

| NO. | DATE RECEIVED | SALES OFFICE | TYPE OF VEHICLE | YEAR | CONTENTS |
|---|---|---|---|---|---|
| 11 | 1997/3/6 | OSAKA | ABC1600 | 1994 | EXHAUST IS BLACK |
| 53 | 1997/4/21 | NAGANO | ABC1600 | 1993 | OIL LEAKS |
| 1 | 1997/3/5 | AICHI | ABC1800 | 1993 | LARGE NOISE POLLUTION |
| 3 | 1997/3/5 | TOKYO | ABC1800 | 1996 | VEHICLE PAINT CHANGES COLOR |
| 8 | 1997/3/5 | TOKYO | ABC1800 | 1997 | OVERHEAT OCCURS |
| 13 | 1997/3/6 | MORIOKA | ABC1800 | 1996 | PAINT IS PEELING |
| 18 | 1997/3/10 | OSAKA | ABC1800 | 1994 | BATTERY IS DEAD |
| 28 | 1997/3/12 | HIROSHIMA | ABC1800 | 1995 | EXHAUST IS BLACK |
| 35 | 1997/3/17 | YOKOHAMA | ABC1800 | 1996 | LARGE NOISE POLLUTION |
| 39 | 1997/3/20 | AICHI | ABC1800 | 1993 | LARGE NOISE POLLUTION |
| 42 | 1997/3/22 | TOKYO | ABC1800 | 1996 | VEHICLE PAINT CHANGES COLOR |
| 46 | 1997/3/24 | TOYAMA | ABC1800 | 1997 | ENGINE WILL NOT START |
| 47 | 1997/3/24 | OSAKA | ABC1800 | 1994 | BATTERY IS DEAD |
| 4 | 1997/3/5 | SAPPORO | DEF1600 | 1995 | OIL LEAKS |

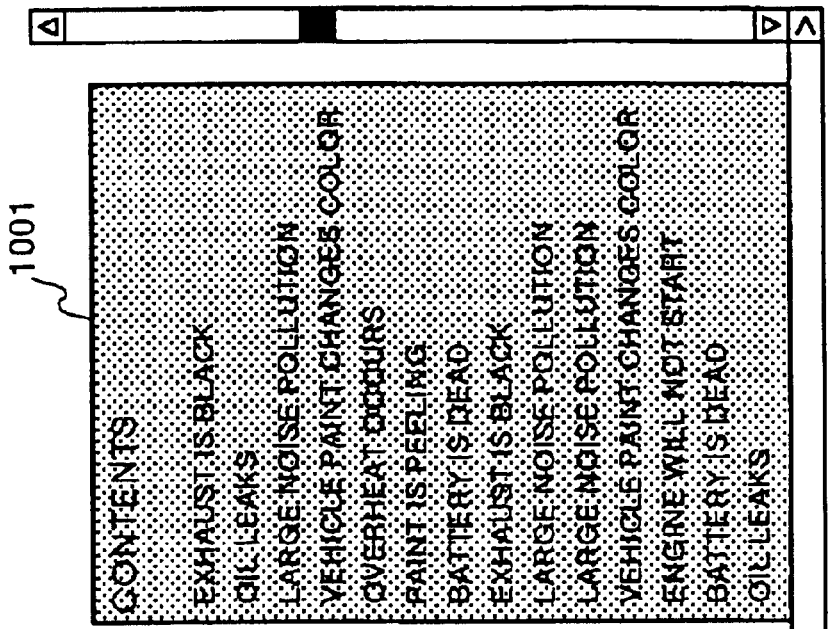

| NO. | DATE RECEIVED | SALES OFFICE | TYPE OF VEHICLE | YEAR | CONTENTS |
|---|---|---|---|---|---|
| 11 | 1997/3/6 | OSAKA | ABC1600 | 1994 | EXHAUST IS BLACK |
| 53 | 1997/4/21 | NAGANO | ABC1600 | 1993 | OIL LEAKS |
| 1 | 1997/3/5 | AICHI | ABC1800 | 1993 | LARGE NOISE POLLUTION |
| 3 | 1997/3/5 | TOKYO | ABC1800 | 1996 | VEHICLE PAINT CHANGES COLOR |
| 8 | 1997/3/5 | TOKYO | ABC1800 | 1997 | OVERHEAT OCCURS |
| 13 | 1997/3/6 | MORIOKA | ABC1800 | 1996 | PAINT IS PEELING |
| 18 | 1997/3/10 | OSAKA | ABC1800 | 1994 | BATTERY IS DEAD |
| 28 | 1997/3/12 | HIROSHIMA | ABC1800 | 1995 | EXHAUST IS BLACK |
| 35 | 1997/3/17 | YOKOHAMA | ABC1800 | 1996 | LARGE NOISE POLLUTION |
| 39 | 1997/3/20 | AICHI | ABC1800 | 1993 | LARGE NOISE POLLUTION |
| 42 | 1997/3/22 | TOKYO | ABC1800 | 1996 | VEHICLE PAINT CHANGES COLOR |
| 46 | 1997/3/24 | TOYAMA | ABC1800 | 1997 | ENGINE WILL NOT START |
| 47 | 1997/3/24 | OSAKA | ABC1800 | 1994 | BATTERY IS DEAD |
| 4 | 1997/3/5 | SAPPORO | DEF1600 | 1995 | OIL LEAKS |

FIG.11

| | CONTENTS OF EXTRACTION PROCESSING |
|---|---|
| 1 | WORDS IN LETTER ROW |
| 2 | NUMBER OF WORDS IN LETTER ROW |
| 3 | NUMBER OF LETTER OF WORDS IN LETTER ROW |
| 4 | NUMBER OF TIMES WORDS IN LETTER ROW APPEAR |
| 5 | PARTS OF SPEECH OF WORDS IN LETTER ROW |
| 6 | DATA REPRESENTING RELATIONSHIP BETWEEN WORDS IN LETTER ROW |
| 7 | NUMBER OF SENTENCES IN LETTER ROW |
| 8 | NUMBER OF LETTERS IN SENTENCES IN LETTER ROW |
| 9 | NUMBER OF CLAUSES OF SENTENCES IN LETTER ROW |
| 10 | RELATIONSHIP BETWEEN SENTENCES IN LETTER ROW |
| ... | ... |

FIG.12

| | CONTENTS OF WORK PROCESSING |
|---|---|
| 1 | CLASSIFICATION |
| 2 | RETRIEVAL |
| 3 | REARRANGEMENT |
| 4 | EXTRACT REPRESENTATIVE VALUE |
| 5 | EXTRACT MAXIMUM VALUE |
| 6 | EXTRACT MINIMUM VALUE |
| 7 | CALCULATION |
| ⋮ | ⋮ |

FIG.13

| | NOISE POLLUTION | IS | LARGE | PAINT | COLOR | CHANGE | OVERHEAT | OCCURS | PEELING | BATTERY | DEAD | EXHAUST | BLACK |
|---|---|---|---|---|---|---|---|---|---|---|---|---|---|
| LARGE NOISE POLLUTION | 1 | 1 | 1 | 0 | 0 | 0 | 0 | 0 | 0 | 0 | 0 | 0 | 0 |
| VEHICLE PAINT CHANGES COLOR | 0 | 1 | 0 | 1 | 1 | 1 | 0 | 0 | 0 | 0 | 0 | 0 | 0 |
| OVERHEAT OCCURS | 0 | 1 | 0 | 0 | 0 | 0 | 1 | 1 | 0 | 0 | 0 | 0 | 0 |
| PAINT IS PEELING | 0 | 1 | 0 | 1 | 0 | 0 | 0 | 0 | 1 | 0 | 0 | 0 | 0 |
| BATTERY IS DEAD | 0 | 1 | 0 | 0 | 0 | 0 | 0 | 0 | 0 | 1 | 1 | 0 | 0 |
| EXHAUST IS BLACK | 0 | 1 | 0 | 0 | 0 | 0 | 0 | 0 | 0 | 0 | 0 | 1 | 1 |

FIG.14

| WORD | WORD ID |
|---|---|
| NOISE POLLUTION | 1 |
| IS | 2 |
| LARGE | 3 |
| PAINT | 4 |
| COLOR | 5 |
| CHANGE | 6 |
| OVERHEAT | 7 |
| OCCURS | 8 |
| PEELING | 9 |
| BATTERY | 10 |
| DEAD | 11 |
| EXHAUST | 12 |
| BLACK | 13 |

FIG.15

| NO. | DATE RECEIVED | SALES OFFICE | TYPE OF VEHICLE | YEAR | CONTENTS | CLUSTER NUMBER |
|---|---|---|---|---|---|---|
| 1 | 1997/3/5 | AICHI | ABC1800 | 1993 | LARGE NOISE POLLUTION | 5 |
| 2 | 1997/3/5 | TOYAMA | ABC2000 | 1995 | EXHAUST IS BLACK | 1 |
| 3 | 1997/3/5 | TOKYO | ABC1800 | 1996 | VEHICLE PAINT CHANGES COLOR | 7 |
| 4 | 1997/3/5 | SAPPORO | DEF1600 | 1995 | OIL LEAKS | 11 |
| 5 | 1997/3/5 | FUKUOKA | KLM1200 | 1992 | HEATER DOES NOT FUNCTION | 2 |
| 6 | 1997/3/5 | NOBORIBETSU | DEF1600 | 1994 | LARGE NOISE POLLUTION | 5 |
| 7 | 1997/3/5 | NAGANO | DEF1600 | 1996 | ENGINE WILL NOT START | 8 |
| 8 | 1997/3/5 | TOKYO | ABC1800 | 1997 | OVERHEAT OCCURS | 14 |
| 9 | 1997/3/6 | TAKAMATSU | XYZ3000 | 1992 | BATTERY IS DEAD | 12 |
| 10 | 1997/3/6 | NAGASAKI | KLM1200 | 1993 | ENGINE WILL NOT START | 8 |
| 11 | 1997/3/6 | OSAKA | ABC1600 | 1994 | EXHAUST IS BLACK | 1 |
| 12 | 1997/3/6 | NAGANO | DEF1600 | 1997 | RADIO DOES NOT WORK | 6 |
| 13 | 1997/3/6 | MORIOKA | ABC1800 | 1996 | PAINT IS PEELING | 7 |
| 14 | 1997/3/6 | SENDAI | XYZ3000 | 1995 | HEATER DOES NOT FUNCTION | 2 |

1501

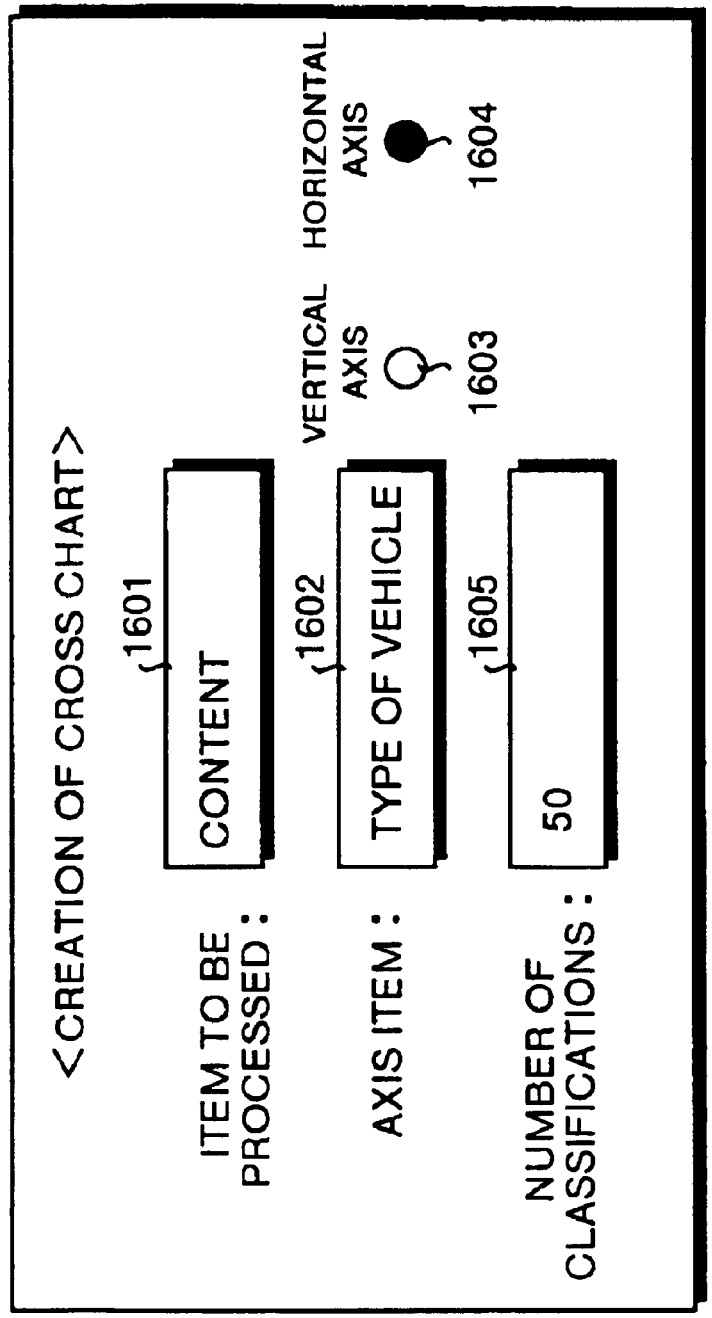

| TYPE OF VEHICLE | ABC1600 | ABC1800 | ABC2000 | DEF1600 | KLM1200 | XYZ3000 | TOTAL |
|---|---|---|---|---|---|---|---|
| CLUSTER 1 | 3 | 0 | 4 | 1 | 1 | 0 | 9 |
| CLUSTER 2 | 0 | 0 | 2 | 0 | 0 | 23 | 25 |
| CLUSTER 3 | 5 | 3 | 2 | 7 | 0 | 4 | 21 |
| CLUSTER 4 | 7 | 6 | 7 | 0 | 0 | 1 | 21 |
| ...... | ...... | ...... | ...... | ...... | ...... | ...... | ...... |
| TOTAL | 227 | 135 | 87 | 194 | 134 | 281 | 1058 |

| TYPE OF VEHICLE | ABC1600 | ABC1800 | ABC2000 | DEF1600 | KLM1200 | XYZ3000 | TOTAL |
|---|---|---|---|---|---|---|---|
| CLUSTER 1 | 3 | 0 | 4 | 1 | 1 | 0 | 9 |
| | | | | 0 | 0 | 23 | 25 |
| | | | | 7 | 0 | 4 | 21 |
| | | | | 0 | 0 | 1 | 21 |
| | | | | ...... | ...... | ...... | ...... |
| | | | | 194 | 134 | 281 | 1058 |

1700

1800

NUMBER OF DATA : 4
DISPLAY ITEM : CONTENTS
CELL : ABC2000-CLUSTER 1

EXHAUST IS BLACK
EXHAUST IS BLACK
EXHAUST IS BLACK
EXHAUST IS BLACK

| NO. | DATE RECEIVED | SALES OFFICE | TYPE OF VEHICLE | YEAR | CONTENTS | CLUSTER NUMBER |
|---|---|---|---|---|---|---|
| 1 | 1997/3/5 | AICHI | ABC1800 | 1993 | LARGE NOISE POLLUTION | 5 |
| 2 | 1997/3/5 | TOYAMA | ABC2000 | 1995 | EXHAUST IS BLACK | 1 |
| 3 | 1997/3/5 | TOKYO | ABC1800 | 1996 | VEHICLE PAINT CHANGES COLOR | 7 |
| 4 | 1997/3/5 | SAPPORO | DEF1600 | 1995 | OIL LEAKS | 11 |
| 5 | 1997/3/5 | FUKUOKA | KLM1200 | 1992 | HEATER DOES NOT FUNCTION | 2 |
| 6 | 1997/3/5 | NOBORIBETSU | DEF1600 | 1994 | LARGE NOISE POLLUTION | 5 |
| 7 | 1997/3/5 | NAGANO | DEF1600 | 1996 | ENGINE WILL NOT START | 8 |
| 8 | 1997/3/5 | TOKYO | ABC1800 | 1997 | OVERHEAT OCCURS | 14 |
| 9 | 1997/3/6 | TAKAMATSU | XYZ3000 | 1992 | BATTERY IS DEAD | 12 |
| 10 | 1997/3/6 | NAGASAKI | KLM1200 | 1993 | ENGINE WILL NOT START | 8 |
| 11 | 1997/3/6 | OSAKA | ABC1600 | 1994 | EXHAUST IS BLACK | 1 |
| 12 | 1997/3/6 | NAGANO | DEF1600 | 1997 | RADIO DOES NOT WORK | 6 |
| 13 | 1997/3/6 | MORIOKA | ABC1800 | 1996 | PAINT IS PEELING | 7 |
| 14 | 1997/3/6 | SENDAI | XYZ3000 | 1995 | HEATER DOES NOT FUNCTION | 2 |

| NO. | DATE RECEIVED | SALES OFFICE | TYPE OF VEHICLE | YEAR | CONTENTS | CLUSTER NUMBER |
|---|---|---|---|---|---|---|
| 2 | 1997/3/5 | TOYAMA | ABC2000 | 1995 | EXHAUST IS BLACK | 1 |
| 11 | 1997/3/6 | YOKYO | ABC1600 | 1994 | EXHAUST IS BLACK | 1 |
| 15 | 1997/3/7 | SAPPORO | ABC2000 | 1996 | EXHAUST IS BLACK | 1 |
| 23 | 1997/3/7 | FUKUOKA | ABC2000 | 1995 | EXHAUST IS BLACK | 1 |
| 35 | 1997/3/8 | NAGANO | KLM1200 | 1992 | EXHAUST STINKS | 1 |
| 54 | 1997/3/10 | TOKYO | ABC1600 | 1994 | EXHAUST IS BLACK | 1 |
| 63 | 1997/3/12 | NAGANO | ABC2000 | 1996 | EXHAUST IS BLACK | 1 |
| 73 | 1997/3/14 | TOKYO | DEF1600 | 1997 | EXHAUST SMELLS | 1 |
| 82 | 1997/3/14 | FUKUOKA | ABC1600 | 1992 | EXHAUST IS BLACK | 1 |
| 14 | 1997/3/6 | SENDAI | XYZ3000 | 1995 | HEATER DOES NOT FUNCTION | 1 |
| 18 | 1997/3/7 | NAGANO | XYZ3000 | 1997 | COLD DUE TO HEATER NOT WORKING | 2 |
| 22 | 1997/3/7 | NAGANO | XYZ3000 | 1997 | HEATER DOES NOT FUNCTION | 2 |
| 27 | 1997/3/8 | SENDAI | XYZ3000 | 1995 | HEATER DOES NOT WORK PROPERLY | 2 |
| 37 | 1997/3/8 | NAGANO | XYZ3000 | 1995 | HEATER DOES NOT FUNCTION | 2 |

FIG.23

| NO. | DATE RECEIVED | SALES OFFICE | TYPE OF VEHICLE | YEAR | CONTENTS | CLUSTER NUMBER |
|---|---|---|---|---|---|---|
| 2 | 1997/3/5 | TOYAMA | ABC2000 | 1995 | EXHAUST IS BLACK | 1 |
| 11 | 1997/3/6 | YOKYO | ABC1600 | 1994 | EXHAUST IS BLACK | 1 |
| 15 | 1997/3/7 | SAPPORO | ABC2000 | 1996 | EXHAUST IS BLACK | 1 |
| 23 | 1997/3/7 | FUKUOKA | ABC2000 | 1995 | EXHAUST IS BLACK | 1 |
| 35 | 1997/3/8 | NAGANO | KLM1200 | 1992 | EXHAUST STINKS | 1 |
| 54 | 1997/3/10 | TOKYO | ABC1600 | 1994 | EXHAUST IS BLACK | 1 |
| 63 | 1997/3/12 | NAGANO | ABC2000 | 1996 | EXHAUST IS BLACK | 1 |
| 73 | 1997/3/14 | TOKYO | DEF1600 | 1997 | EXHAUST SMELLS | 1 |
| 82 | 1997/3/14 | FUKUOKA | ABC1600 | 1992 | EXHAUST IS BLACK | 1 |
| 14 | 1997/3/6 | SENDAI | XYZ3000 | 1995 | HEATER DOES NOT FUNCTION | 2 |
| 18 | 1997/3/7 | NAGANO | XYZ3000 | 1997 | COLD DUE TO HEATER NOT WORKING | 2 |
| 22 | 1997/3/7 | NAGANO | XYZ3000 | 1997 | HEATER DOES NOT FUNCTION | 2 |
| 27 | 1997/3/8 | SENDAI | XYZ3000 | 1995 | HEATER DOES NOT WORK PROPERLY | 2 |
| 37 | 1997/3/8 | NAGANO | XYZ3000 | 1995 | HEATER DOES NOT FUNCTION | 2 |

| NO. | DATE RECEIVED | SALES | TYPE OF VEHICLE | YEAR | CONTENTS |
|---|---|---|---|---|---|
| 11 | 1997/3/ | | | 1994 | EXHAUST IS BLACK |
| 53 | 1997/4/ | | | 1993 | OIL LEAKS |
| 1 | 1997/3/ | | | 1993 | LARGE NOISE POLLUTION |
| 3 | 1997/3/ | | | 1996 | VEHICLE PAINT CHANGES COLOR |
| 8 | 1997/3/ | | | 1997 | OVERHEAT OCCURS |
| 13 | 1997/3/6 | MORIOKA | ABC1800 | 1996 | PAINT IS PEELING |
| 18 | 1997/3/10 | OSAKA | ABC1800 | 1994 | BATTERY IS DEAD |
| 28 | 1997/3/12 | HIROSHIMA | ABC1800 | 1995 | EXHAUST IS BLACK |
| 35 | 1997/3/17 | YOKOHAMA | ABC1800 | 1996 | LARGE NOISE POLLUTION |
| 39 | 1997/3/20 | AICHI | ABC1800 | 1993 | LARGE NOISE POLLUTION |
| 42 | 1997/3/22 | TOKYO | ABC1800 | 1996 | VEHICLE PAINT CHANGES COLOR |
| 46 | 1997/3/24 | TOYAMA | ABC1800 | 1997 | ENGINE WILL NOT START |
| 47 | 1997/3/24 | OSAKA | ABC1800 | 1994 | BATTERY IS DEAD |
| 4 | 1997/3/5 | SAPPORO | DEF1600 | 1995 | OIL LEAKS |

Dialog: PLEASE INPUT NUMBER OF CLASSIFICATIONS
NUMBER OF CLASSIFICATIONS : 50

Labels: 2601, 2602, 2603 CLASSIFICATION, 2604, 2605 FILE EDIT

FIG.28

| NO. | DATE RECEIVED | SALES OFFICE | TYPE OF VEHICLE | YEAR | CONTENTS | CLUSTER NUMBER |
|---|---|---|---|---|---|---|
| 1 | 1997/3/5 | AICHI | ABC1800 | 1993 | LARGE NOISE POLLUTION | 5 |
| 2 | 1997/3/5 | TOYAMA | ABC2000 | 1995 | EXHAUST IS BLACK | 1 |
| 3 | 1997/3/5 | TOKYO | ABC1800 | 1996 | VEHICLE PAINT CHANGES COLOR | 7 |
| 4 | 1997/3/5 | SAPPORO | DEF1600 | 1995 | OIL LEAKS | 11 |
| 5 | 1997/3/5 | FUKUOKA | KLM1200 | 1992 | HEATER DOES NOT FUNCTION | 2 |
| 6 | 1997/3/5 | NOBORIBETSU | DEF1600 | 1994 | LARGE NOISE POLLUTION | 5 |
| 7 | 1997/3/5 | NAGANO | DEF1600 | 1996 | ENGINE WILL NOT START | 8 |
| 8 | 1997/3/5 | TOKYO | ABC1800 | 1997 | OVERHEAT OCCURS | 14 |
| 9 | 1997/3/6 | TAKAMATSU | XYZ3000 | 1992 | BATTERY IS DEAD | 12 |
| 10 | 1997/3/6 | NAGASAKI | KLM1200 | 1993 | ENGINE WILL NOT START | 8 |
| 11 | 1997/3/6 | OSAKA | ABC1600 | 1994 | EXHAUST IS BLACK | 1 |
| 12 | 1997/3/6 | NAGANO | DEF1600 | 1997 | RADIO DOES NOT WORK | 6 |
| 13 | 1997/3/6 | MORIOKA | ABC1800 | 1996 | PAINT IS PEELING | 7 |
| 14 | 1997/3/6 | SENDAI | XYZ3000 | 1995 | HEATER DOES NOT FUNCTION | 2 |

2801 CLASSIFICATION RESULT 1
CLASSIFICATION RESULT 2

2802
<CLASSIFICATION SET VALUE>
NUMBER OF CLASSIFICATIONS : 30
CLASSIFICATION SPEECH PARTS : NOUNS

FIG.31

| CLUSTER ID (3101) | NUMBER OF MEMBERS (3102) | WORDS OF HIGH INCIDENCE (3103) | DOCUMENT CONTENTS (3104) | DEGREE OF RESEMBLANCE TO CENTER (3105) |
|---|---|---|---|---|
| 1 | 248 | MANAGER, BUSY,.... | MUCH SYSTEM MANAGEMENT WORK AND VERY BUSY | 0.987 |
| | | | BUSY SYSTEM MANAGEMENT AND COSTS CANNOT BE REDUCED | 0.965 |
| | | | WHEN MANAGER IS BUSY, SYSTEM BREAKS DOWN | 0.911 |
| | | | MANAGEMENT DIFFICULT DUE TO SYSTEM BREAKDOWN | 0.889 |
| | | | MANAGEMENT OFFICE IS BUSY DUE TO SYSTEM BREAKDOWN | 0.876 |

3110

| N | 1498 | OPERABILITY, POOR,.... | SOFTWARE HAS POOR OPERABILITY | 0.969 |
|---|---|---|---|---|
| | | | DIFFICULT TO REMEMBER SOFTWARE OPERABILITY | 0.962 |

| DOCUMENT ID | SEQUENCE OF CLASSIFICATIONS OF SELECTION DATA (1 = SELECTED / 0 = NOT SELECTED) |
|---|---|
| 1 | [1, 1, 0, 0] |
| 2 | [0, 0, 0, 0] |
| 3 | [0, 1, 0, 0] |
| n-1 | [1, 0, 0, 0] |
| n | [0, 0, 0, 0] |

FIG.44

IDENTIFICATION NUMBER LOCATED IN DOCUMENT DATA

| | DOCUMENT DATA IDENTIFICATION NUMBER |
|---|---|
| DOCUMENT 1 | 1 |
| DOCUMENT 2 | 2 |
| DOCUMENT 3 | 3 |

DIVIDED IDENTIFICATION NUMBER LOCATED IN DOCUMENT DATA

| | | DIVIDED DOCUMENT DATA IDENTIFICATION NUMBER |
|---|---|---|
| DOCUMENT 1 | DIVIDED DOCUMENT 1 | 1 |
| | DIVIDED DOCUMENT 2 | 2 |
| | DIVIDED DOCUMENT 3 | 3 |
| | DIVIDED DOCUMENT 4 | 4 |
| | DIVIDED DOCUMENT 5 | 5 |
| DOCUMENT 2 | DIVIDED DOCUMENT 6 | 6 |
| | DIVIDED DOCUMENT 7 | 7 |
| | DIVIDED DOCUMENT 8 | 8 |
| DOCUMENT 3 | DIVIDED DOCUMENT 9 | 9 |
| | DIVIDED DOCUMENT 10 | 10 |
| | DIVIDED DOCUMENT 11 | 11 |
| | DIVIDED DOCUMENT 12 | 12 |

| DOCUMENT DATA IDENTIFICATION NUMBER | DIVIDED DOCUMENT DATA IDENTIFICATION NUMBER |
|---|---|
| 1 | 1 |
| 1 | 2 |
| 1 | 3 |
| 1 | 4 |
| 1 | 5 |
| 2 | 6 |
| 2 | 7 |
| 2 | 8 |
| 3 | 9 |
| 3 | 10 |
| 3 | 11 |
| 3 | 12 |

MAP OF DOCUMENT - DIVIDED DOCUMENT ACCORDING TO ID NUMBER

FIG.45

IDENTIFICATION NUMBER LOCATED IN DOCUMENT DATA

|  | DIVIDED DOCUMENT DATA IDENTIFICATION NUMBER | DIVIDED DOCUMENT DATA CHARACTERISTICS VECTOR |
|---|---|---|
| DIVIDED DOCUMENT 1 | 1 | (1,1,1) |
| DIVIDED DOCUMENT 2 | 2 | (5,5,5) |
| DIVIDED DOCUMENT 3 | 3 | (3,2,4) |
| DIVIDED DOCUMENT 4 | 4 | (3,2,3) |
| DIVIDED DOCUMENT 5 | 5 | (5,4,6) |
| DIVIDED DOCUMENT 6 | 6 | (1,2,1) |
| DIVIDED DOCUMENT 7 | 7 | (1,0,1) |
| DIVIDED DOCUMENT 8 | 8 | (5,4,5) |
| DIVIDED DOCUMENT 9 | 9 | (2,2,4) |
| DIVIDED DOCUMENT 10 | 10 | (2,1,1) |
| DIVIDED DOCUMENT 11 | 11 | (4,4,6) |
| DIVIDED DOCUMENT 12 | 12 | (5,5,6) |

DOCUMENT CLASSIFICATION (USING CLUSTER ANALYSIS) ↓

RESULT OF DIVIDING DIVIDED DOCUMENT DATA INTO THREE CATEGORIES

|  | DIVIDED DOCUMENT DATA IDENTIFICATION NUMBER | CLASSIFICATION CATEGORY | DISTANCE TO REPRESENTATIVE VALUE OF RELEVANT CATEGORY |
|---|---|---|---|
| DIVIDED DOCUMENT 1 | 1 | CATEGORY 1 | 0.25 |
| DIVIDED DOCUMENT 2 | 2 | CATEGORY 3 | 0.87 |
| DIVIDED DOCUMENT 3 | 3 | CATEGORY 2 | 0.48 |
| DIVIDED DOCUMENT 4 | 4 | CATEGORY 2 | 0.74 |
| DIVIDED DOCUMENT 5 | 5 | CATEGORY 3 | 0.54 |
| DIVIDED DOCUMENT 6 | 6 | CATEGORY 1 | 1.03 |
| DIVIDED DOCUMENT 7 | 7 | CATEGORY 1 | 1.03 |
| DIVIDED DOCUMENT 8 | 8 | CATEGORY 3 | 0.70 |
| DIVIDED DOCUMENT 9 | 9 | CATEGORY 2 | 0.74 |
| DIVIDED DOCUMENT 10 | 10 | CATEGORY 1 | 0.75 |
| DIVIDED DOCUMENT 11 | 11 | CATEGORY 3 | 0.94 |
| DIVIDED DOCUMENT 12 | 12 | CATEGORY 3 | 0.83 |

DATA REPRESENTING CLASSIFICATION CATEGORY

|  | REPRESENTATIVE VALUE (CENTER OF RELEVANT DIVIDED DOCUMENT DATA) | NUMBER OF RELEVANT DATA |
|---|---|---|
| CATEGORY 1 | (1.25, 1.00, 1.00) | 4 |
| CATEGORY 2 | (2.66, 2.00, 3.66) | 3 |
| CATEGORY 3 | (4.80, 4.00, 5.60) | 5 |

DISTANCE BETWEEN CLASSIFICATION CATEGORIES

|  | CATEGORY 2 | CATEGORY 3 |
|---|---|---|
| CATEGORY 1 | 3.17 | 6.68 |
| CATEGORY 2 |  | 3.69 |

FIG.46

DOCUMENT CLASSIFICATION RESULTS

| CLASSIFICATION CATEGORY | DIVIDED DOCUMENT | DEGREE OF RESEMBLANCE | RELEVANT DOCUMENT | AREA OCCUPIED BY DOCUMENT | RELATIVE POSITION | RESEMBLANCE RANKING |
|---|---|---|---|---|---|---|
| CATEGORY 1 | DOCUMENT 1 | 0.25 | DOCUMENT 1 | 1/5 | 1/5 | 1 |
| CATEGORY 1 | DOCUMENT 6 | 1.03 | DOCUMENT 2 | 2/3 | 1/3 | 3 |
| CATEGORY 1 | DOCUMENT 7 | 1.03 | DOCUMENT 2 | 2/3 | 2/3 | 3 |
| CATEGORY 1 | DOCUMENT 10 | 0.75 | DOCUMENT 3 | 1/4 | 2/4 | 2 |
| CATEGORY 2 | DOCUMENT 3 | 0.48 | DOCUMENT 1 | 2/5 | 3/5 | 1 |
| CATEGORY 2 | DOCUMENT 4 | 0.74 | DOCUMENT 2 | 2/5 | 4/5 | 2 |
| CATEGORY 2 | DOCUMENT 9 | 0.74 | DOCUMENT 3 | 1/4 | 1/4 | 2 |
| CATEGORY 3 | DOCUMENT 2 | 0.87 | DOCUMENT 1 | 2/5 | 2/5 | 4 |
| CATEGORY 3 | DOCUMENT 5 | 0.54 | DOCUMENT 1 | 2/5 | 5/5 | 1 |
| CATEGORY 3 | DOCUMENT 8 | 0.70 | DOCUMENT 2 | 1/3 | 3/3 | 2 |
| CATEGORY 3 | DOCUMENT 11 | 0.94 | DOCUMENT 3 | 2/4 | 3/4 | 4 |
| CATEGORY 3 | DOCUMENT 12 | 0.83 | DOCUMENT 3 | 2/4 | 4/4 | 3 |

FIG.50

DOCUMENT DATA

- STUDENTS AT KYOTO UNIVERSITY DRANK TEA INFECTED WITH TOXIC CHEMICAL AND SUFFERED SYMPTOMS SUCH AS DIARRHOEA.

- IN CORRUPTION CASE CONCERNING DEFENSE MINISTRY HEADQUARTERS, PAPERS FOUND AT HOME OF A STAFF MEMBER.

- KANAGAWA PREFECTURE ANNOUNCES TERMINATION THIS YEAR OF YOKOHAMA WELFARE CENTER.

- PHILIPPINE AIRWAYS EMPLOYMENT WRANGLE ENDS WITH THE COMPANY COLLAPSING AFTER 57 YEARS IN THE BUSINESS.

- THE PAKISTAN PREMIER SHARIF SAYS HIS COUNTRY WILL BE READY FOR THE CTBT FEDERATION BY SEPTEMBER NEXT YEAR.

- US ENERGY AGENCY ANNOUCES A FOURTH ROUND OF SUBTERRANEAN NUCLEAR TESTS.

- SECOND PRIME MINISTER HUSSEIN IS SAFE, BUT FOUR CIVILIANS KILLED IN ROCKET ATTACK.

HTML FORMAT

```
‹HTML›
‹HEAD›
    ‹META NAME="GENERATOR" CONTENT="Claris Home Page 2.
0J"›
    ‹META HTTP-EQUIV="CONTENT-TYPE" CONTENT="text/html;
charset=Shift_JIS"›
    ‹X-SAS-WINDOW TOP=64 BOTTOM=769 LEFT=224 RIGHT=6
58›
‹/HEAD›
‹BODY›
‹P› ‹/P›
‹P› NEWS TOPIC (98/09/25) ‹/P›
‹UL›
‹LI›STUDENTS AT KYOTO UNIVERSITY DRANK TEA INFECTED
WITH TOXIC CHEMICAL AND
SUFFERED SYMPTOMS SUCH AS DIARRHOEA.‹/LI›

‹LI›IN CORRUPTION CASE CONCERNING DEFENSE MINISTRY
HEADQUARTERS, PAPERS FOUND
AT HOME OF A STAFF MEMBER.‹/LI›

‹LI›KANAGAWA PREFECTURE ANNOUNCES TERMINATION
THIS YEAR OF YOKOHAMA WELFARE
CENTER.‹/LI›

‹LI›PHILIPPINE AIRWAYS EMPLOYMENT WRANGLE ENDS
WITH&NBSP; THE COMPANY COLLAPSING
AFTER 57 YEARS IN THE BUSINESS.‹/LI›

‹LI›THE PAKISTAN PREMIER SHARIF SAYS HIS COUNTRY WILL
BE READY FOR THE CTBT FEDERATION
BY SEPTEMBER NEXT YEAR.‹/LI›

‹LI›US ENERGY AGENCY ANNOUCES A FOURTH ROUND OF
SUBTERRANEAN NUCLEAR TESTS.‹/LI›

‹LI›SECOND PRIME MINISTER HUSSEIN IS SAFE, BUT FOUR
CIVILIANS KILLED IN ROCKET
ATTACK.‹/LI›
‹/UL›

‹/BODY›
‹/HTML›
```

DIVISION OF DOCUMENT DATA

|| CONVERT TEXT WITH TAG ‹LI› INTO ONE DIVIDED DOCUMENT DATA ||

DIVIDED DOCUMENT DATA

DIVIDED DOCUMENT 1

STUDENTS AT KYOTO UNIVERSITY DRANK TEA INFECTED WITH TOXIC CHEMICAL AND SUFFERED SYMPTOMS SUCH AS DIARRHOEA.

DIVIDED DOCUMENT 2

IN CORRUPTION CASE CONCERNING DEFENSE MINISTRY HEADQUARTERS, PAPERS FOUND AT HOME OF A STAFF MEMBER.

DIVIDED DOCUMENT 3

KANAGAWA PREFECTURE ANNOUNCES TERMINATION THIS YEAR OF YOKOHAMA WELFARE CENTER.

DIVIDED DOCUMENT 4

PHILIPPINE AIRWAYS EMPLOYMENT WRANGLE ENDS WITH THE COMPANY COLLAPSING AFTER 57 YEARS IN THE BUSINESS.

DIVIDED DOCUMENT 5

THE PAKISTAN PREMIER SHARIF SAYS HIS COUNTRY WILL BE READY FOR THE CTBT FEDERATION BY SEPTEMBER NEXT YEAR.

DIVIDED DOCUMENT 6

US ENERGY AGENCY ANNOUCES A FOURTH ROUND OF SUBTERRANEAN NUCLEAR TESTS.

DIVIDED DOCUMENT 7

SECOND PRIME MINISTER HUSSEIN IS SAFE, BUT FOUR CIVILIANS KILLED IN ROCKET ATTACK.

FIG.52

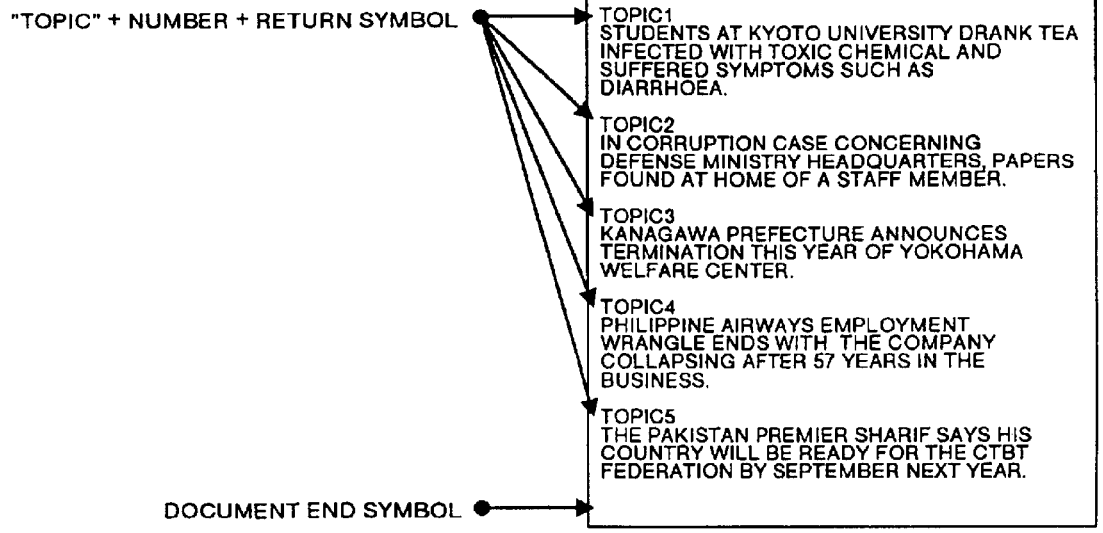

DOCUMENT DATA

"TOPIC" + NUMBER + RETURN SYMBOL

NEWS TOPIC (98/10/25)

TOPIC1
STUDENTS AT KYOTO UNIVERSITY DRANK TEA INFECTED WITH TOXIC CHEMICAL AND SUFFERED SYMPTOMS SUCH AS DIARRHOEA.

TOPIC2
IN CORRUPTION CASE CONCERNING DEFENSE MINISTRY HEADQUARTERS, PAPERS FOUND AT HOME OF A STAFF MEMBER.

TOPIC3
KANAGAWA PREFECTURE ANNOUNCES TERMINATION THIS YEAR OF YOKOHAMA WELFARE CENTER.

TOPIC4
PHILIPPINE AIRWAYS EMPLOYMENT WRANGLE ENDS WITH THE COMPANY COLLAPSING AFTER 57 YEARS IN THE BUSINESS.

TOPIC5
THE PAKISTAN PREMIER SHARIF SAYS HIS COUNTRY WILL BE READY FOR THE CTBT FEDERATION BY SEPTEMBER NEXT YEAR.

DOCUMENT END SYMBOL

NATURAL LANGUAGE PROCESSING

- EXTRACT NOUN ("TOPIC" AND NUMBER) AND RETURN SYMBOL
- EXTRACT POSITIONS OF NOUN ("TOPIC" AND NUMBER) AND RETURN SYMBOL WITHIN DOCUMENT
- DETECT POSITION OF LETTER ROW OF "TOPIC" + NUMBER + RETURN SYMBOL

DIVISION OF DOCUMENT DATA

WITH "TOPIC" + NUMBERS + RETURN SYMBOL AS THE HEADER, DEEM A LETTER ROW COMPRISING "TOPIC" + NUMBERS + RETURN SYMBOL, OR A LETTER ROW SURROUNDED BY A DOCUMENT END SYMBOL, AS ONE DIVIDED DOCUMENT DATA

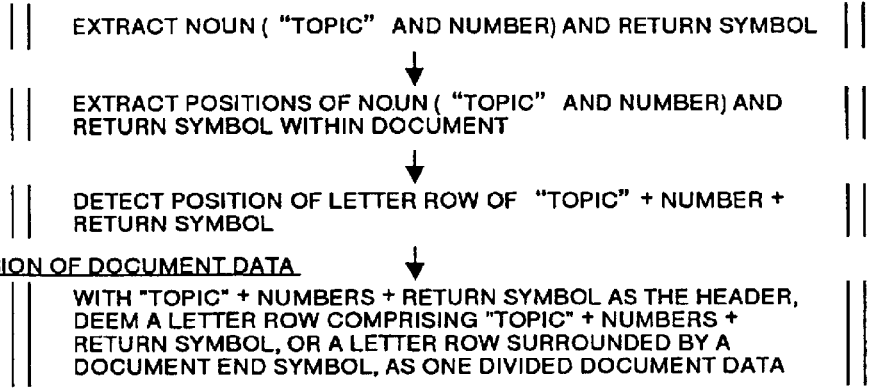

DIVIDED DOCUMENT DATA

DIVIDED DOCUMENT 1
STUDENTS AT KYOTO UNIVERSITY DRANK TEA INFECTED WITH TOXIC CHEMICAL AND SUFFERED SYMPTOMS SUCH AS DIARRHOEA.

DIVIDED DOCUMENT 2
IN CORRUPTION CASE CONCERNING DEFENSE MINISTRY HEADQUARTERS, PAPERS FOUND AT HOME OF A STAFF MEMBER.

DIVIDED DOCUMENT 3
KANAGAWA PREFECTURE ANNOUNCES TERMINATION THIS YEAR OF YOKOHAMA WELFARE CENTER.

DIVIDED DOCUMENT 4
PHILIPPINE AIRWAYS EMPLOYMENT WRANGLE ENDS WITH THE COMPANY COLLAPSING AFTER 57 YEARS IN THE BUSINESS.

DIVIDED DOCUMENT 5
THE PAKISTAN PREMIER SHARIF SAYS HIS COUNTRY WILL BE READY FOR THE CTBT FEDERATION BY SEPTEMBER NEXT YEAR.

FIG. 54

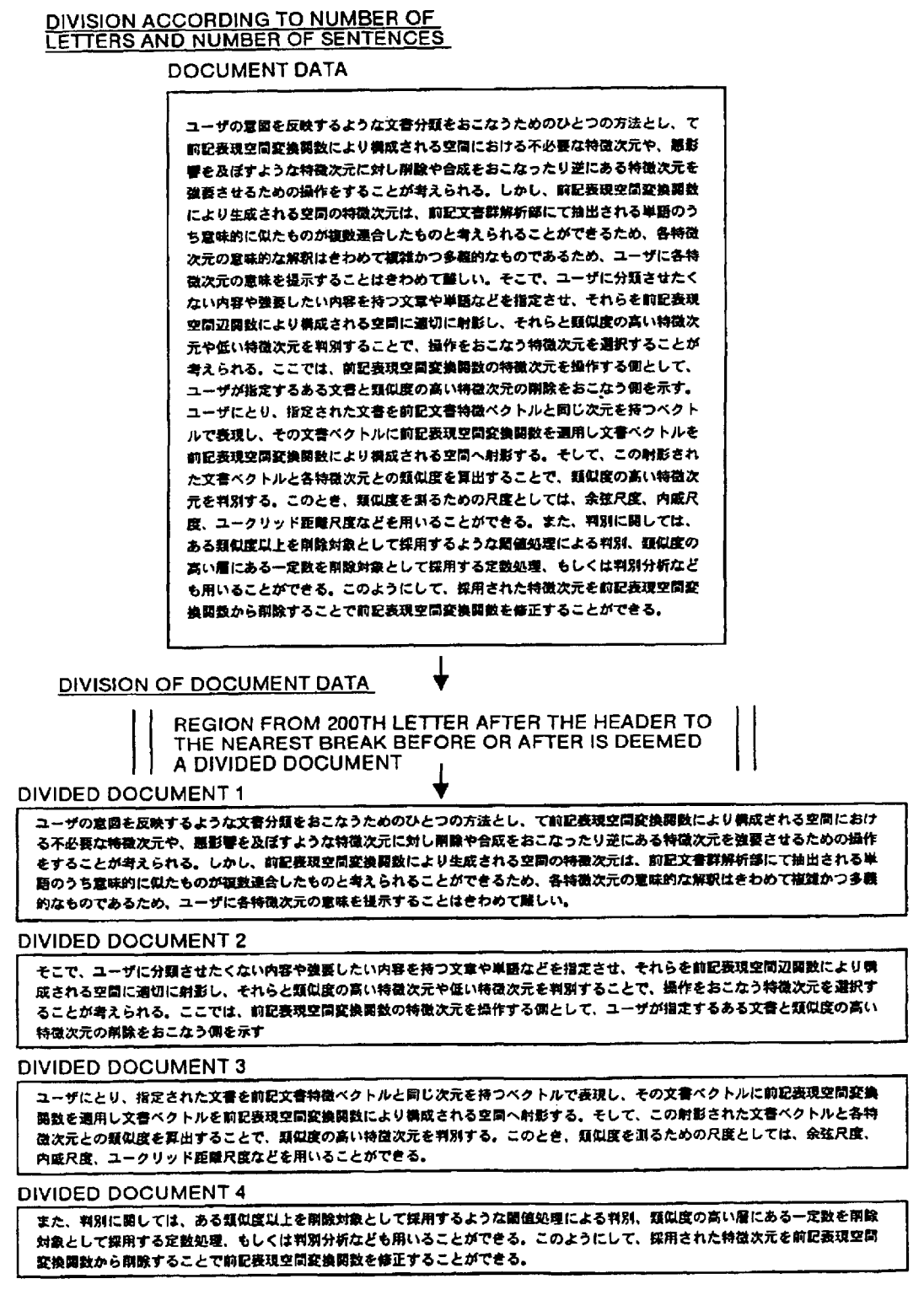

DIVISION ACCORDING TO NUMBER OF
LETTERS AND NUMBER OF SENTENCES

DOCUMENT DATA

[Japanese text block]

DIVISION OF DOCUMENT DATA

REGION FROM 200TH LETTER AFTER THE HEADER TO
THE NEAREST BREAK BEFORE OR AFTER IS DEEMED
A DIVIDED DOCUMENT

DIVIDED DOCUMENT 1

[Japanese text]

DIVIDED DOCUMENT 2

[Japanese text]

DIVIDED DOCUMENT 3

[Japanese text]

DIVIDED DOCUMENT 4

[Japanese text]

DOCUMENT PROCESSOR, DOCUMENT CLASSIFICATION DEVICE, DOCUMENT PROCESSING METHOD, DOCUMENT CLASSIFICATION METHOD, AND COMPUTER-READABLE RECORDING MEDIUM FOR RECORDING PROGRAMS FOR EXECUTING THE METHODS ON A COMPUTER

FIELD OF THE INVENTION

The present invention relates to a document processor for displaying and printing multiple input document data in a predetermined format, a document processing method, and a computer-readable recording medium for recording a program to execute the method on a computer. Furthermore, this invention relates to a document classification device and a document classification method for classifying multiple input document data based on the contents thereof, and particularly for refining classification categories calculated during document classification, and to a computer-readable recording medium for recording a program to execute the method on a computer.

BACKGROUND OF THE INVENTION

Various document classification devices and document retrieval devices have been developed in recent years. The proliferation of network technology, such as the Internet, has made it possible to access a huge amount of electronic documents, domestically and overseas, and there has been a proportionate rapid expansion in the amount of data which is stored electronically. Accordingly, there is an increasing need for intellectual operations such as classifying large collections of document data into meaningful categories.

The benefits of classifying large amounts of document data according to their meaning are as follows. Firstly, it makes it easier to retrieve data. Retrieval becomes relatively easy since vast groups of documents can be retrieved using category names as clues.

Secondly, entire groups of data can be grasped. That is, it is possible to grasp the contents (individual classifications) of an entire cluster of documents. However, when a large amount of document data is classified by an operator, although accurate classification can be achieved, classification requires enormous manpower and time. Consequently, in view of the huge amount of documents stored in recent years, devices for automatically classifying document data have been proposed.

As an example of a conventional device for automatically classifying documents, Japanese Patent Application Laid-open (JP-A) No. 7-36897 discloses a device which defines a document as a document vector characterized by a word, uses clustering to group these document vectors, and automatically classifies the documents based on the grouped document vectors.

Furthermore, in "Projections for Efficient Document Clustering (Authors: Hinrich Schutze and Craing Silverstein, Academy: ACM, Title of Paper: Proceedings of SIGIR, pages: 78–81, Year of Publication: 1997)" documents are classified in dormant meaning space. Other conceivable methods include using a probability theory approach, etc.

Furthermore, in recent years, the proliferation of the Internet and the like has made it possible to access large amounts of document clusters, and as a result, there is an increasing need to be able use these document clusters effectively, and in accordance with the intentions of a variety of users. To accomplish this, an intellectual operation is starting to be used in which a large amount of document clusters is classified into meaningful categories, and the structure of the document clusters is grasped. However, when this type of classification is performed manually, enormous manpower and time are required. Further, since only the classifier knows how to classify the document data, classification standard change when the person responsible for classification is replaced.

Consequently, there is a demand for a document classification device capable of automatically classifying groups of documents according to the same type of classification standards used by humans. For example, as disclosed in Japanese Patent Application Laid-open (JP-A) No. 7-114572, a document classification device capable of automatically extracting a word characteristic vector from a document, and classifying the document based on the characteristic vector, thereby making it possible to automatically classify the documents using meaningful differences.

However, since the conventional document classification device described above uses a method for statistically classifying documents arranged in multi-dimensional space essentially comprising words, the result of the classification is nothing more than the statistically determined behaviour of the words. Consequently, clusters (partial groups of individual classified documents) calculated after classification are sometimes incomprehensible to the operator (user).

A further problem is that the question of what kind of classification is appropriate depends on the characteristics of the document clusterings to be classified and the intentions of the user, making it difficult to define an appropriate classification. In particular, when grasping entire data groups as mentioned above, the type of classification required will differ depending on the widely varying intentions of the operators, and it will be difficult to obtain the result desired by the operator in a single classification.

Thus, the problem can be interpreted by saying that a document classification result includes a great amount of noise, only one part of which is of use to the operator.

Furthermore, the conventional technology does not consider the constitutional units of the document, and in a case where the structure of a document is partitioned by one or multiple period symbols, titles, and the like, multiple topics and meanings are contained in a single document. This results in problems that it is difficult for a user to understand the classification categories, the category may be limited to a specific topic or specific meaning, or the document may be classified under a category different to that intended by the user.

A context-dependent automatic classification device is disclosed in Japanese Patent Application Laid-open (JP-A) No. 6-176064, and aims to increase classification precision by automatically classifying documents in consideration of the conclusive data therein, but essentially does not solve the problems mentioned above.

Furthermore, conventional document processors, such as the document classification device and document retrieve device described above, merely classify or retrieve documents, and give no consideration to further analysis of information hidden in the document clusters. Consequently, they have a disadvantage that a separate analyzing device must be used to analyze information hidden in the document clusters.

Furthermore, the operator who wishes to analyze the information does not perform classification and retrieval as an end in itself, but simply as an intermediate Step during his analysis of the information. After classification and retrieval, in order to grasp the result more easily it is usually necessary to derive a meaningful result from the information analysis by repeating a variety of other processes, such as maximizing the practical usefulness of the information included in the original document, rearranging the result, carrying out totalization and statistical processing, and drawing up charts and graphs based on the results.

Furthermore, table-calculating software is sometimes needed when analyzing information about numerical data. However, table-calculating software was originally developed to handle numerical data, and is not sufficiently effective for analyzing textual data, particularly when the analysis concerns the meaning of documents.

SUMMARY OF THE INVENTION

This invention has been achieved in order to solve the problems of the conventional examples described above. It is a first object of the present invention to provide a document processor, a document processing method, and a computer-readable recording medium storing programs for executing the method on a computer, for carrying out analysis concerning the meaning of documents, not simply by outputting the results of fixed functions such as classification and retrieval, but by supporting a complete range of information analysis.

To solve the problems of the conventional example described above, it is a second object of the present invention to provide a document classification device and a document classification method capable of momentarily determining what type of contents are contained in a given document cluster, and a computer-readable recording medium for storing programs for executing the method on a computer.

Furthermore, to solve the problems of the conventional example described above, it is a third object of the present invention to provide a document classification device and a document classification method wherein, when one document contains multiple topics and meanings, these can be classified into categories according to specific topics and meanings, so that the classifications do not differ from categories desired by a user, thereby enabling the user to easily comprehend the classification categories, and a computer-readable recording medium for storing programs for executing the method on a computer.

In order to solve the problems mentioned above, the document processor according to one aspect of the present invention for displaying and printing in a predetermined format multiple input document data, comprises a document memory unit for storing input document data; a selection unit for selecting all or part of document data stored in the documents memory unit; a characteristics extraction unit for extracting data relating to characteristics of letter rows from all or part of the document data selected by the selection unit; a work processing unit for work-processing all or part of the document data based on the data relating to characteristics of letter rows extracted by the characteristics extraction unit; and an output unit for outputting all or part of the document data work-processed by the work processing unit.

According to the above aspect of this invention, when analyzing documents according to their meanings, rather than merely outputting the result of the analysis, the entire information analysis operation can be supported.

Further, the output unit of the document processor comprises an item value set unit for setting a plurality of item values based on the contents of all or part of the document data work-processed by the work-processing unit; and a totalization unit for totalizing all or part of the document data for each item value set by the item value set unit. Furthermore, the output unit outputs all or part of the document data in the format of a table having an item value as at least one axis.

Hence the result of the work-processing can easily be expressed in a cross table, and the contents of the information can easily be grasped. Therefore, when analyzing documents according to their meanings, rather than merely outputting the result of the analysis, the entire information analysis operation can be supported.

Further, the output unit outputs all or part of the document data work-processed by the work processing unit together with all or part of the document data in its state prior to work-processing by the work processing unit.

Hence data to be work-processed and other data can be displayed simultaneously and identified, whereby the range of the work-processing to be carried out can be accurately and easily determined. Therefore, when analyzing documents according to their meanings, rather than merely outputting the result of the analysis, the entire information analysis operation can be supported.

Further, the document memory unit also stores all or part of the document data work-processed by the work processing unit.

Since other data can be handled simultaneously, when thereafter analyzing documents according to their meanings, rather than merely outputting the result of the analysis, the entire information analysis operation can be supported.

Further, the selection unit further selects all or part of the document data output by the output unit.

Since all or part of the document data output by the output unit can be selected for analysis, a wide variety of information can be analyzed with high precision. Therefore, when analyzing documents according to their meanings, rather than merely outputting the result of the analysis, the entire information analysis operation can be supported.

Further, the document memory unit further stores data relating to contents of the work processing.

Hence not only can loss of data relating to the contents of work-processing can be prevented and the data managed easily, but also the relationship between settings used in the work-processing and the processed result can be determined. Therefore, when analyzing documents according to their meanings, rather than merely outputting the result of the analysis, the entire information analysis operation can be supported.

A document classification device for classifying documents based on contents thereof according to another aspect of the present invention comprises an input unit for inputting document data; a language analyzer unit for analyzing document data input by the input unit and obtaining language analysis information; a vector creation unit for document characteristic vectors for the document data based on the language analysis information obtained by the language analyzer unit; a classification unit for classifying documents based on the degree of similarity between document characteristic vectors created by the vector creation unit, and creating clusters of documents; a cluster characteristics calculation unit for calculating cluster characteristics, which are characteristics of clusters of documents created by the classification unit; and a classification category memory unit for storing cluster characteristics, calculated by the cluster characteristics calculation unit, as constituent elements of classification categories.

According to the above aspect of this invention, it is possible to obtain clusters, and to structure and categorize the clusters based on their contents using their degree of similarity to the cluster center, and the like.

A document classification device for classifying documents based on contents thereof according to still another aspect of the present invention comprises an input unit for inputting document data; a language analyzer unit for analyzing document data input by the input unit and obtaining language analysis information; a vector creation unit for creating document characteristic vectors for the document data based on the language analysis information obtained by the language analyzer unit; a classification unit for classifying documents based on the degree of similarity between document characteristic vectors created by the vector creation unit, and creating clusters of documents; a cluster characteristics calculation unit for calculating cluster characteristics, which are characteristics of clusters of documents created by the classification unit; a display unit for displaying the cluster characteristics calculated by the cluster characteristics calculation unit; a cluster selection specification unit for selecting predetermined clusters from cluster of documents created by the classification unit; and a classification category memory unit for storing cluster characteristics, calculated by the cluster characteristics calculation unit, as constituent elements of classification categories.

According to the above aspect of this invention, only selected clusters are used, making it possible to structure and categorize to clusters in a manner closer to that desired by the operator.

Further, the arrangement of the present invention described above further comprises a document characteristic vector memory unit for storing document characteristic vectors created by vector creation unit; and a vector correction unit for correcting document characteristic vectors stored in the document characteristic vector memory unit, so that document characteristic vectors of documents belonging to clusters selected by the cluster selection unit are deleted. Furthermore, the classification unit classifies documents based on the document characteristic vectors corrected by the vector correction unit.

Hence the effects of clusters which are already known can be eliminated, and new clusters can be created.

Further, the document classification device of the present invention further comprises a document characteristic vector memory unit for storing document characteristic vectors created by vector creation unit; and a document expression space correction unit for correcting document expression space when determining the degree of similarity between document characteristic vectors stored in the document characteristic vectors memory unit, based on a characteristics amount calculated from clusters selected by the cluster selection unit. Furthermore, the classification unit classifies documents based on the degree of similarity between document characteristic vectors created by the vector creation unit, using the document expression space corrected by the document expression space correction unit.

Hence, cluster characteristics selected by the operator in the previous classification can be eliminated from the next classification, enabling new clusters to be created.

Further, the document classification device according to the present invention further comprises a document characteristic vector memory unit for storing document characteristic vectors created by vector creation unit; and a document expression space correction unit for correcting document expression space when determining the degree of similarity between document characteristic vectors stored in the document characteristic vectors memory unit, based on a characteristics amount calculated from clusters selected by the cluster selection unit. Furthermore, the classification unit classifies documents based on the degree of similarity between document characteristic vectors created by the vector creation unit, using the document expression space corrected by the document expression space correction unit.

Hence influences of the known cluster can be eliminated and cluster characteristics selected by the operator in the previous classification can be eliminated from the next classification, enabling new clusters to be created.

Further, the document classification device of the present invention further comprises a selection information appending unit for appending selection information showing the fact of selection when all or part of the documents belonging to a cluster of documents created by the classification unit have been selected. Furthermore, the display unit displays the cluster characteristics, and also displays the selection information appended by the selection information appending unit.

Hence it is possible to improve the ability to identity documents used on multiple occasions, and the ability to identify documents which have not been selected at all.

Further, the classification category memory unit stores cluster characteristics and/or information created by an operator, in addition to all or part of the documents belonging to a cluster of documents selected by the selection specification unit, as constituent elements of classification categories.

Hence the contents of clusters can be easily recognized, and in addition, the operator can easily create his own classification categories, thereby improving the usefulness of the classification categories.

A document classification device for classifying document clusters in accordance with contents thereof according to still another aspect of the present invention comprises a document input unit for inputting document data groups; a document dividing unit for dividing document data into one or multiple divided document data based on a predetermined reference; a document-divided document map creation unit for creating a map showing the correspondence between the document data and the divided document data; a divided document classification unit for classifying the divided document data; a divided document classification result creation unit for creating divided document classification result information based on a classification result of the divided document classification unit; and a document classification result creation unit for creating classification result information of the above document data using the document-divided document map and the divided document classification result information.

According to the above aspect of this invention, when one document contains multiple topics and meanings, these can be classified into categories according to specific topics and meanings, so that the classifications do not differ from categories desired by a user, thereby enabling the user to easily comprehend the classification categories. Furthermore, since the positions of the divided documents in documents prior to division (documents belonging to the clusters) is displayed, the user is able to efficiently read the parts of the document clusters he or she wishes to read.

Further, the document classification device further comprises a document save unit for saving the document data; a divided document save unit for saving the divided document data; and a document-divided document map save unit for saving a document-divided document map created by the document-divided document map creation unit.

Hence for a single document data, it is possible to efficiently determine classification results having different parameters such as the number of classifications, the classification method, and the settings used in the classifications, without recreating the divided document data and the document-divided document map. Furthermore, by classifying the document data and saving the data needed to create the classification result, the user is free to take more time over the classification, and to re-analyze previously classified documents within a given period of time.

Further, the document classification device in the specific arrangement described above further comprises a divided document classification result save unit for saving divided document classification result information created by the divided document classification result creation unit.

Hence, an additional effect, such that after one classification has been carried out, the result of that classification can be expressed in a variety of formats such as text, charts, graphs, and the like can be achieved. Furthermore, by saving the divided document classification result information, the user is free to take more time over classifications and analysis of classification results, and to re-analyze previously classified documents in a variety of formats within a given period of time.

Further, the multiple divided document data created by the document dividing unit contains the document data in its state prior to being divided.

Hence in addition to a classification structure of detailed document data, obtained by classifying the divided document data, the user can obtain a classification structure fusing schematic macro classifications as a result of classifying the document data itself prior to division.

Further, the document dividing unit divides document data based on information relating to the structure of the document data.

Hence division and the like of different topics can be carried out, whereby documents can be classified in such a manner that the detailed classification structures of their document data can be known.

Further, the document classification device further comprises a document element extraction unit for extracting elements in the document data; an element-accompanying information extraction unit for extracting element-accompanying information accompanying the elements extracted by the document element extraction unit. Furthermore, the document dividing unit divides the document data using elements extracted by the document element extraction unit, or the elements and element-accompanying information extracted by the element-accompanying information extraction unit.

Hence documents can be classified so that the detailed classification structure of the document data can be known.

Further, the document dividing unit divides document data in compliance with a specified specification range.

Hence documents can be classified in accordance with the wishes of the user, and so that the detailed classification structure of the document data can be known.

Further, the document dividing unit divides document data based on the number of letters, the number of sentences, or both the number of letters and the number of sentences.

Hence there is an increased capability to classify different documents having contents of different topics and the like.

Therefore, as above, documents can be classified so that the detailed classification structure of the document data can be known.

Further, the document classification result creation unit extracts and presents information showing document data, and representative information accompanying the document data, as classification result information.

Hence the user is able to determine a detailed schematic structure or overall structure of the document data.

Further, the document classification result creation unit extracts and presents information showing divided-document data, and representative information accompanying the divided document data, as classification result information.

Hence the user is able to determine a detailed schematic structure or overall structure of the document data. In addition, the user can easily determine which divided document has been classified in a given category.

A document processing method according to still another aspect of the present invention outputs multiple input document data in order to display or print the document data in a predetermined format, and comprises the steps of storing input document data; selecting all or part of the document data stored in the documents memory unit; extracting data relating to characteristics of letter rows from all or part of the document data selected by the selection unit; work-processing all or part of the document data based on the data relating to characteristics of letter rows extracted by the characteristics extraction unit; and outputting all or part of the document data work-processed by the work processing unit.

According to the above aspect of this invention, when analyzing documents according to their meanings, rather than merely outputting the result of the analysis, the entire information analysis operation can be supported.

Further, the step of outputting comprises the steps of setting a plurality of item values based on the contents of all or part of the document data work-processed by the work-processing unit; and totalizing all or part of the document data for each item value set by the item value set unit; and outputs all or part of the document data in the format of a table having an item value as at least one axis.

Hence the result of the work-processing can easily be expressed in a cross table, and the contents of the information can easily be grasped. Therefore, when analyzing documents according to their meanings, rather than merely outputting the result of the analysis, the entire information analysis operation can be supported.

Further, the step of outputting further comprises outputting all or part of the document data work-processed by the work processing unit together with all or part of the document data in its state prior to work-processing by the work processing unit.

Hence the data to be work-processed and other data can be displayed simultaneously and identified, whereby the range of the work-processing to be carried out can be accurately and easily determined. Therefore, when analyzing documents according to their meanings, rather than merely outputting the result of the analysis, the entire information analysis operation can be supported.

Further, the step of storing further comprises storing all or part of the document data work-processed by the work processing unit.

Since other data can be handled simultaneously, when thereafter analyzing documents according to their meanings, rather than merely outputting the result of the analysis, the entire information analysis operation can be supported.

Further, the step of selecting further comprises selecting all or part of the document data output by the output unit.

Since all or part of the document data output by the output unit can be selected for analysis, a wide variety of information can be analyzed with high precision. Therefore, when analyzing documents according to their meanings, rather than merely outputting the result of the analysis, the entire information analysis operation can be supported.

Further, the step of storing a document further comprises storing data relating to contents of the work processing.

Hence not only can loss of data relating to the contents of work-processing can be prevented and the data managed easily, but also the relationship between settings used in the work-processing and the processed result can be determined. Therefore, when analyzing documents according to their meanings, rather than merely outputting the result of the analysis, the entire information analysis operation can be supported.

A document classification method for classifying documents based on contents thereof according to still another aspect of the present invention comprises the steps of inputting document data; language-analyzing document data input in the step of inputting and obtaining language analysis information; creating document characteristic vectors for the document data based on the language analysis information obtained in the step of language-analyzing; classifying documents based on the degree of similarity between document characteristic vectors created in the step of creating vectors, and creating clusters of documents; calculating cluster characteristics, being characteristics of clusters of documents created in the step of classifying; and storing cluster characteristics, calculated in the step of calculating cluster characteristics, as constituent elements of classification categories.

According to the above aspect of this invention, it is possible to obtain clusters, and to structure and categorize the clusters based on their contents using their degree of similarity to the cluster center, and the like.

A document classification method for classifying documents based on contents thereof according to still another aspect of the present invention comprises the steps of inputting document data; language-analyzing document data input in the step of inputting and obtaining language analysis information; creating document characteristic vectors for the document data based on the language analysis information obtained in the step of language-analyzing; classifying documents based on the degree of similarity between document characteristic vectors created in the step of creating vectors, and creating clusters of documents; calculating cluster characteristics, which are characteristics of clusters of documents created in the step of classifying; displaying the cluster characteristics calculated in the step of calculating cluster characteristics; selecting predetermined clusters from cluster of documents created in the step of classifying; and storing cluster characteristics, calculated in the step of calculating cluster characteristics, as constituent elements of classification categories.

According to the above aspect of this invention, only selected clusters are used, making it possible to structure and categorize to clusters in a manner closer to that desired by the operator.

Further, the document classification method further comprises a step of correcting document characteristic vectors stored in the step of storing document characteristic vectors, so that document characteristic vectors of documents belonging to clusters selected by the step of selecting clusters are deleted. Furthermore, the step of classifying comprises classifying documents based on the document characteristic vectors corrected by the step of correcting vectors.

Hence the effects of clusters which are already known can be eliminated, and new clusters can be created.

Further, the document classification method further comprises a step of correcting document expression space when determining the degree of similarity between document characteristic vectors stored in the step of storing document characteristic vectors, based on a characteristics amount calculated from clusters selected in the step of selecting clusters, and the step of classifying comprises classifying documents based on the degree of similarity between document characteristic vectors created in the step of creating vectors, using the document expression space corrected in the step of correcting the document expression space.

Hence cluster characteristics selected by the operator in the previous classification can be eliminated from the next classification, enabling new clusters to be created.

Further, the document classification method further comprises the steps of correcting document expression space when determining the degree of similarity between document characteristic vectors stored in the step of storing document characteristic vectors, based on a characteristics amount calculated from clusters selected in the step of selecting clusters. Furthermore, the step of classifying comprises classifying documents based on the degree of similarity between document characteristic vectors created in the step of creating vectors, using the document expression space corrected in the step of correcting the document expression space.

Hence influences of the known cluster can be eliminated and cluster characteristics selected by the operator in the previous classification can be eliminated from the next classification, enabling new clusters to be created.

Further, the document classification method further comprises the steps of appending selection information showing the fact of selection when all or part of the documents belonging to a cluster of documents created in the step of classifying have been selected. Furthermore, the step of displaying comprises displaying the cluster characteristics, and displaying the selection information appended in the step of appending selection information.

Hence it is possible to improve the ability to identify documents used on multiple occasions, and the ability to identify documents which have not been selected at all.

Further, the step of creating classification categories comprises creating cluster characteristics and/or information created by an operator, in addition to all or part of the documents belonging to a cluster of documents selected in the step of specifying selection, as constituent elements of classification categories.

Hence the contents of clusters can be easily recognized, and in addition, the operator can easily create his own classification categories, thereby improving the usefulness of the classification categories.

A document classification method for classifying document clusters in accordance with contents thereof according to still another aspect of the present invention comprises the steps of inputting document data groups; dividing document data into one or multiple divided document data based on a predetermined reference; creating a map showing the correspondence between the document data and the divided document data; classifying the divided document data; creating divided document classification result information based on the classification result of classifying the divided documents; and creating classification result information of the document data using the document-divided document map and the divided document classification result information.

According to the above aspect of this invention, when one document contains multiple topics and meanings, these can be classified into categories according to specific topics and meanings, so that the classifications do not differ from categories desired by a user, thereby enabling the user to easily comprehend the classification categories. Furthermore, since the positions of the divided documents in documents prior to division (documents belonging to the clusters) is displayed, the user is able to efficiently read the parts of the document clusters he or she wishes to read.

A computer-readable recording medium of still another aspect of the present invention stores programs for executing the above-described document classification method on a computer, thereby making the program readable mechanically, and enabling the operation of the document classification method to be executed by a computer.

Other objects and features of this invention will become understood from the following description with reference to the accompanying drawings.

BRIEF DESCRIPTION OF THE DRAWINGS

FIG. 5 is a diagram explaining the relationship between item names of the document processor according to the first embodiment of the present invention;

FIG. 7 is a diagram explaining another data structure of a document stored in a document memory of the document processor according to the first embodiment of the present invention;

FIG. 8 is a diagram explaining an example of a screen display in an output section of a document processor according to an embodiment of the present invention;

FIG. 9 is a diagram explaining another example of a screen display of an output section of a document processor according to an embodiment of the present invention;

FIG. 10 is a diagram explaining another example of a screen display of an output section of a document processor according to an embodiment of the present invention;

FIG. 11 is a diagram explaining a list of contents of extraction processing performed by a characteristics extractor of a document processor according to the first embodiment of the present invention;

FIG. 12 is a diagram explaining a list of contents of work processing performed by a work processor of a document processor according to the first embodiment of the present invention;

FIG. 13 is a diagram explaining characteristic vectors of each item of a document processor according to the first embodiment of the present invention;

FIG. 14 is a diagram explaining words, and the number of appearances of each word ID, of a document processor according to the first embodiment of the present invention;

FIG. 15 is a diagram explaining another screen display of an output section of a document processor according to the first embodiment of the present invention;

FIG. 16 is a diagram explaining a command screen for creating a cross table in an output section of a document processor according to the first embodiment of the present invention;

FIG. 18 is a diagram explaining another cross table displaying a result of classification processing by an output section of a document processor according to the first embodiment of the present invention;

FIG. 21 is a diagram explaining another screen display of an output section of a document processor according to the first embodiment of the present invention;

FIG. 22 is a diagram explaining another screen display of an output section of a document processor according to the first embodiment of the present invention;

FIG. 23 is a diagram explaining another screen display of an output section of a document processor according to the first embodiment of the present invention;

FIG. 26 is a diagram explaining another screen display of an output section of a document processor according to the first embodiment of the present invention;

FIG. 28 is a diagram explaining another screen display of an output section of a document processor according to the first embodiment of the present invention;

FIG. 31 is a diagram explaining an example of a display of a cluster characteristics display section in a document classification device according to the second embodiment of the present invention;

FIG. 40 is a diagram explaining a table provided in a classification result memory of a document classification device according to the sixth embodiment of the present invention;

FIG. 44 is another diagram explaining a document classification device and a document classification method according to the seventh embodiment of the present invention;

FIG. 45 is another diagram explaining a document classification device and a document classification method according to the seventh embodiment of the present invention;

FIG. 46 is another diagram explaining a document classification device and a document classification method according to the seventh embodiment of the present invention;

FIG. 50 is a diagram explaining a document classification device and a document classification method according to an eleventh embodiment of the present invention;

FIG. 52 is a diagram explaining a document classification device and a document classification method according to the twelfth embodiment of the present invention;

FIG. 54 is a diagram explaining a document classification device and a document classification method according to a fourteenth embodiment of the present invention;

DESCRIPTION OF THE PREFERRED EMBODIMENTS

Preferred embodiments of a document processor, a document processing method, and a computer-readable recording medium for recording a program to execute the method on a computer according to the present invention will be described below with reference to the accompanying drawings.

Figure 1:
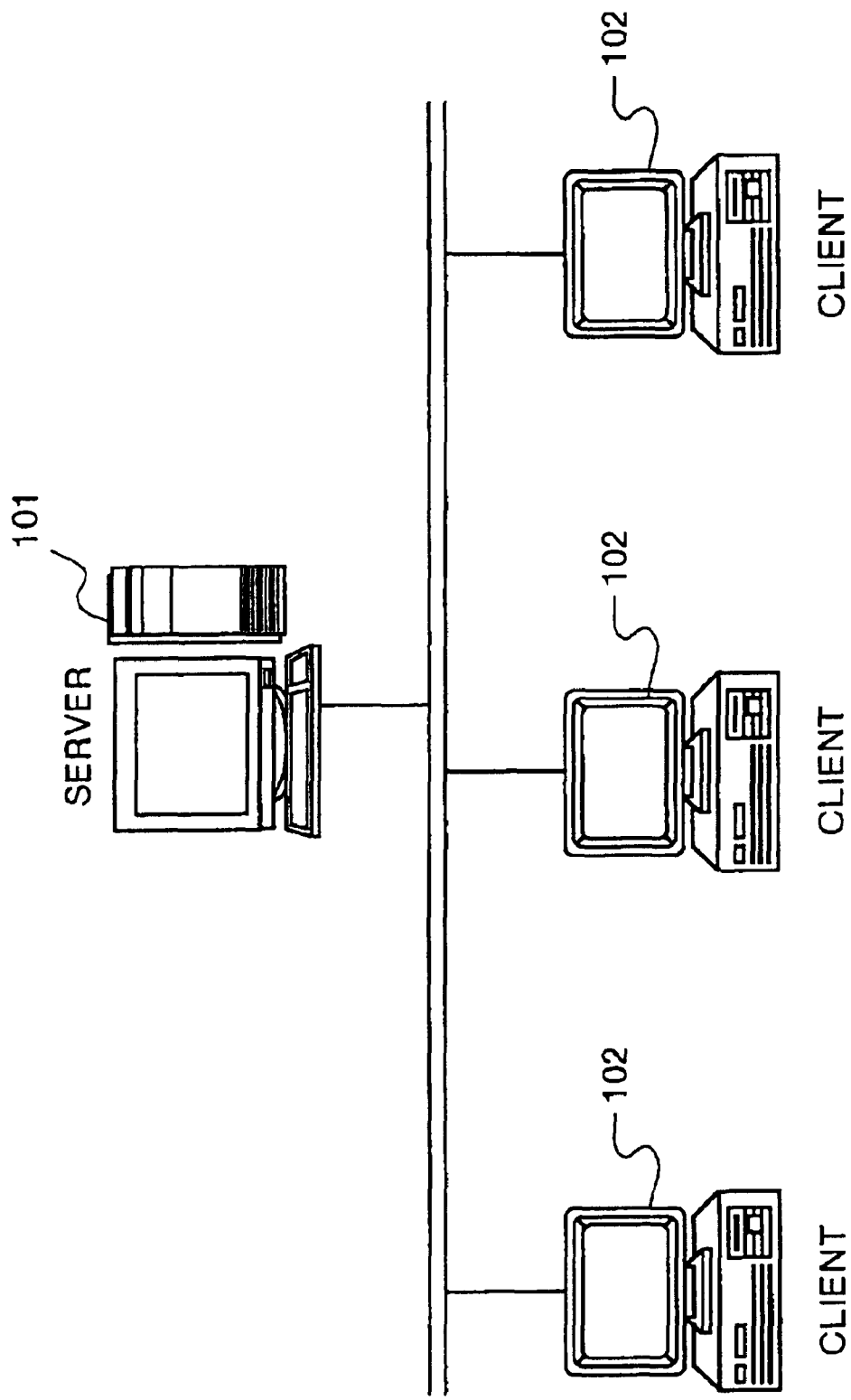
FIG. 1 is a diagram explaining the entire hardware constitution of a data processing system comprising a document processor according to a first embodiment of the present invention.

To begin with, the hardware constitution of an entire data processing system comprising a document processor according to a first embodiment of the present invention will be explained. FIG. 1 is a diagram explaining the hardware constitution of an entire data processing system comprising a document processor according to the first embodiment of the present invention.

As shown in FIG. 1, a data processing system comprising the document processor according to the first embodiment comprises a server/client system. That is, a server 101 and multiple clients 102 are connected via a network 103. The clients 102 create work data such as classification data, send this to the server 101, and display the results of work processing such as classification, and the like. On the other hand, in compliance with specifications from the clients 102, the server 101 carries out vast numerical calculations to perform work processing such as document (text) classification, and sends the results of the processing to the clients 102.

More specifically, when performing classification processing, the server 101 classifies a text (pre-processing, clustering) and the clients 102 create classification data, program execution commands, tables of text classification result, and such like. As described above, the processing at the server 101 is divided into two types, "pre-processing" and "classification", and the burden of this processing can be extremely heavy when there is a vast amount of data. Therefore, a manager process creates a processing receive list and controls the processing, so that "pre-processing" and "classification" in the server 101 are only performed once each.

Furthermore, data is exchanged between the server 101 and the clients 102 by a method termed joint filing. That is, a file used in processing such as classification is created in at joint folder on the server 101, enabling both sides to exchange the data. Therefore, the clients 102 can use the joint folder of the server 101 via the joint network.

Figure 2:
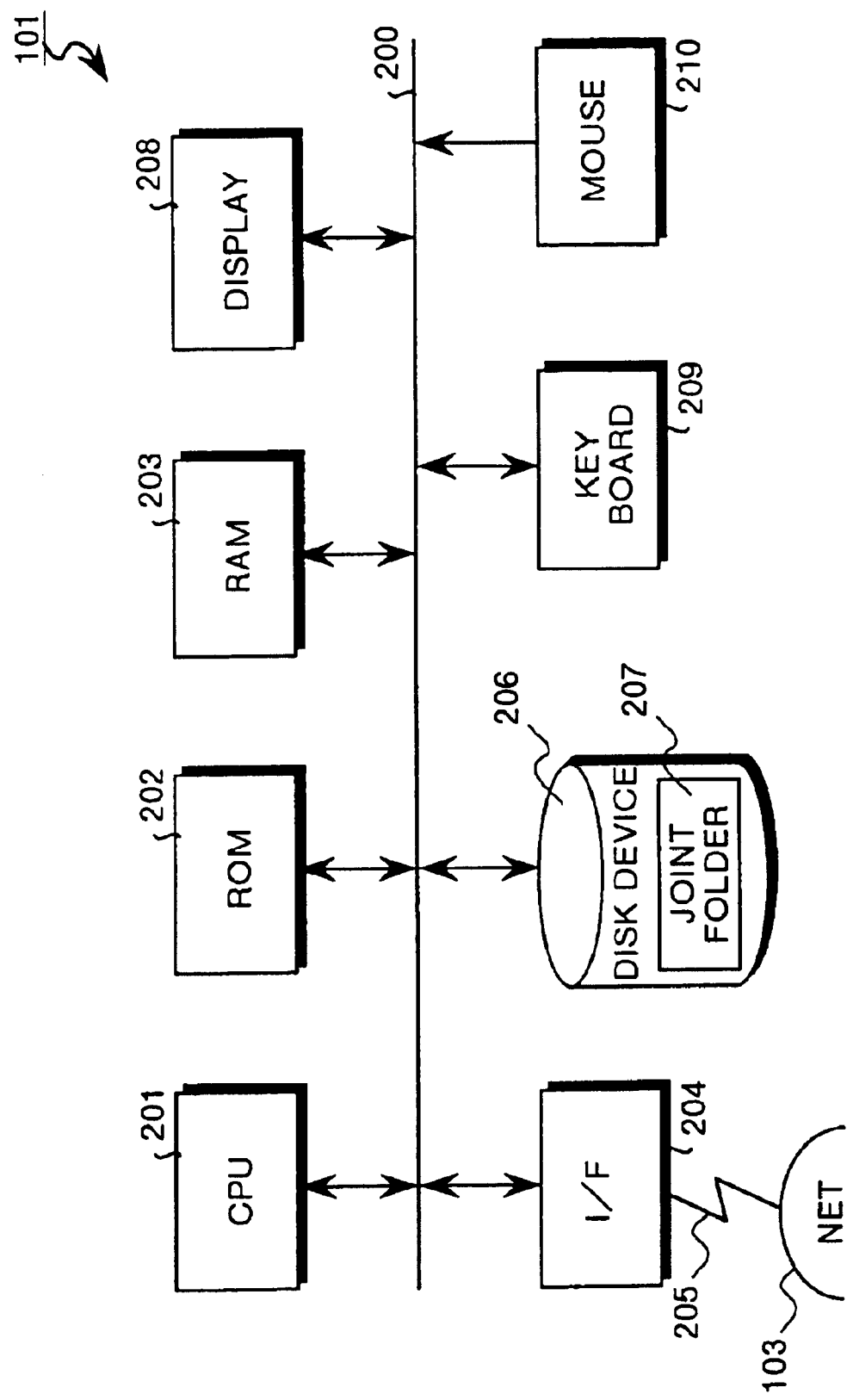
FIG. 2 is a diagram explaining the hardware constitution of a server in a data processing system comprising the document processor according to the first embodiment of the present invention.

The constitution of the hardware of the server 101 and the clients 102 will be explained below. FIG. 2 is a diagram explaining a hardware constitution of the server 101 in the data processing system comprising the document processor according to the first embodiment. A work station (WS) is, for example, used as the server 101.

In FIG. 2, reference symbol 201 represents a CPU for controlling the entire server 101, reference symbol 202 represents a ROM which stores boot programs and the like, reference symbol 203 represents a RAM used as work area of the CPU 201, reference symbol 204 represents an interface (I/F), which is connected to the network 103 via a communications line 205 and controls the network 103 and an internal interface, and reference symbol 206 represents a disk device for storing data. The reference symbol 200 represents a bus for coupling the above parts.

In addition, a display 208 for displaying document information, image information, function information, and the like, a keyboard 209 for inputting data, and a mouse 210 and the like, may similarly be connected. Moreover, the disk device 206 comprises a joint folder 207 for exchanging data with the clients 102.

Figure 3:
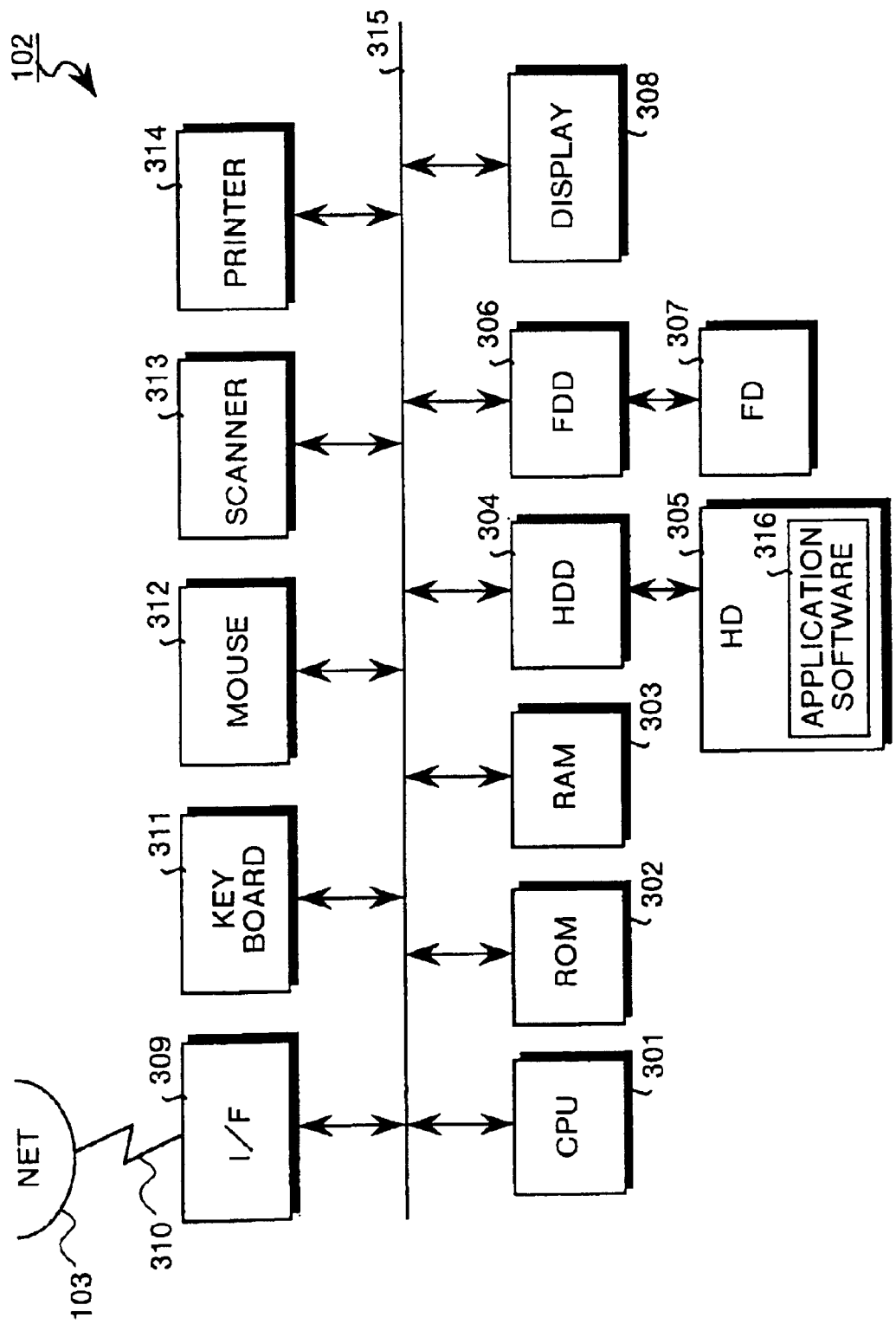
FIG. 3 is a diagram explaining the hardware constitution of a client in a data processing system comprising the document processor according to the first embodiment of the present invention.

Furthermore, FIG. 3 is a diagram explaining a hardware constitution of a client 102 in a data processing system comprising the document processor according to the first embodiment. A personal computer (PC) is, for example, used as the client 102.

In FIG. 3, reference symbol 301 represents a CPU for controlling the entire system, reference symbol 302 represents a ROM which stores boot programs and the like, reference symbol 303 represents a RAM used as a work area of the CPU 301, reference symbol 304 represents an HDD (hard disk drive) for controlling reading and writing of data to an HD (hard disk) 305 in compliance with the CPU 301, reference symbol 305 represents an HD for storing data written in compliance with the HDD 304, reference symbol 306 represents an FDD (floppy disk drive) for controlling reading and writing of data to an FD (floppy disk) 307 in compliance with the CPU 301, reference symbol 307 represents a freely attachable and detachable FD for storing data written in compliance with the FDD 306, and reference symbol 308 represents a display for displaying documents, images, function data, etc.

Furthermore, reference symbol 309 represents an interface (I/F), which is connected to the network 103 via a communications line 310 and controls the network 103 and the internal interface, reference symbol 311 represents a keyboard comprising keys for inputting letters, numbers, a variety of commands, and the like, reference symbol 312 represents a mouse for moving a cursor and selecting a range, or pressing icons and buttons displayed on a display screen, moving windows and changing their sizes, and the like, reference symbol 313 represents a scanner for optically reading images having an OCR (optical character reader) function, reference symbol 314 represents a printer for printing contents and the like of data comprising classification results, and reference symbol 315 represents a bus for joining all the above parts. Furthermore, an application software 316 such as a word processing software is stored in the HD 305.

Figure 4:
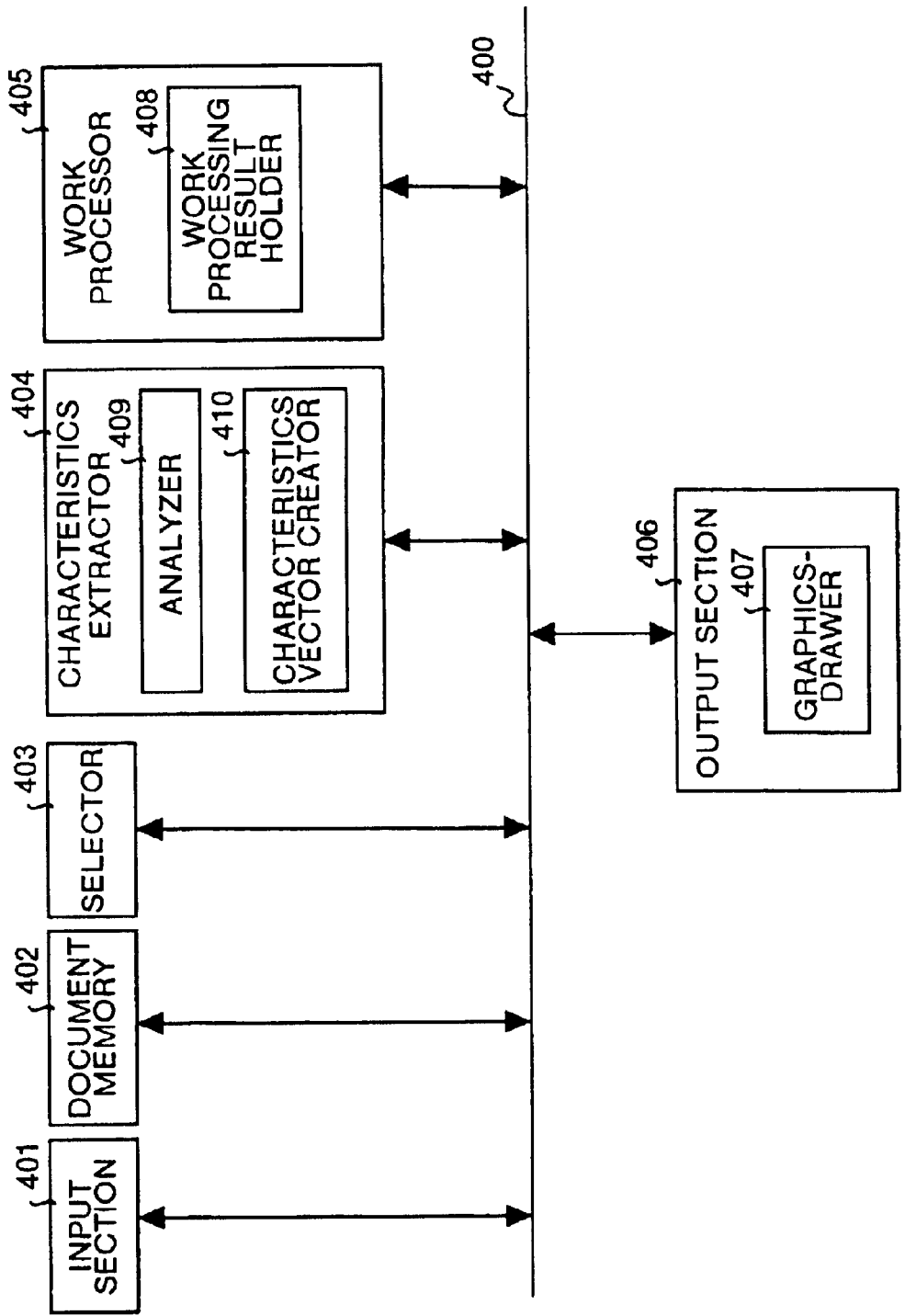
FIG. 4 is a block diagram functionally showing a constitution of the document processor according to the first embodiment of the present invention.

Functional constitution of the document processor according to the first embodiment will be explained here. FIG. 4 is a block diagram functionally showing a constitution of the document processor according to the first embodiment of the present invention. In FIG. 4, the document processor comprises an input section 401, a document memory 402, a selector 403, a characteristics extractor 404, a work processor 405, and an output section 406.

The input section 401, the document memory 402, the selector 403, the characteristics extractor 404, the work processor 405, and the output section 406, are controlled by CPU 201 and CPU 301 and the like, which operate processing in compliance with commands contained in programs recorded in recording media such as a ROM 202 and 302, a RAM 203 and 303, or a disk device 306 and a hard disk 316, etc.

The input section 401 inputs document data, and for example comprises the I/F 204 or 309, or the like, capable of obtaining documents and groups of documents via a keyboard 209 or 311, a scanner 313 comprising an OCR function, and a network 103. Furthermore, in addition to the above, if the input section 401 is capable of extracting document data, it comprises all the above parts. For example, when the document data is saved in a data base, and the medium in which the data base is stored is provided in the document processor of the first embodiment, document data is input.

A document is a collection of one or more sentences written in a natural language, comprising letters, rows of letters, numbers, and the like, which are organized into a meaningful arrangement to form one document. Furthermore, a collection of multiple documents is termed a document cluster.

A document comprises one or multiple items. An item comprises item name and item value. An item name is a label showing the contents of the item, and may or may not be included in the document. An item value is the actual content of the item. FIG. 5 is a diagram explaining the relationship between an item name and an item-value in the document processor according to the first embodiment. FIG. 5 shows an example in which one patent specification forms one document, and the patent specification is expressed using an item name and an item value.

Figure 6:
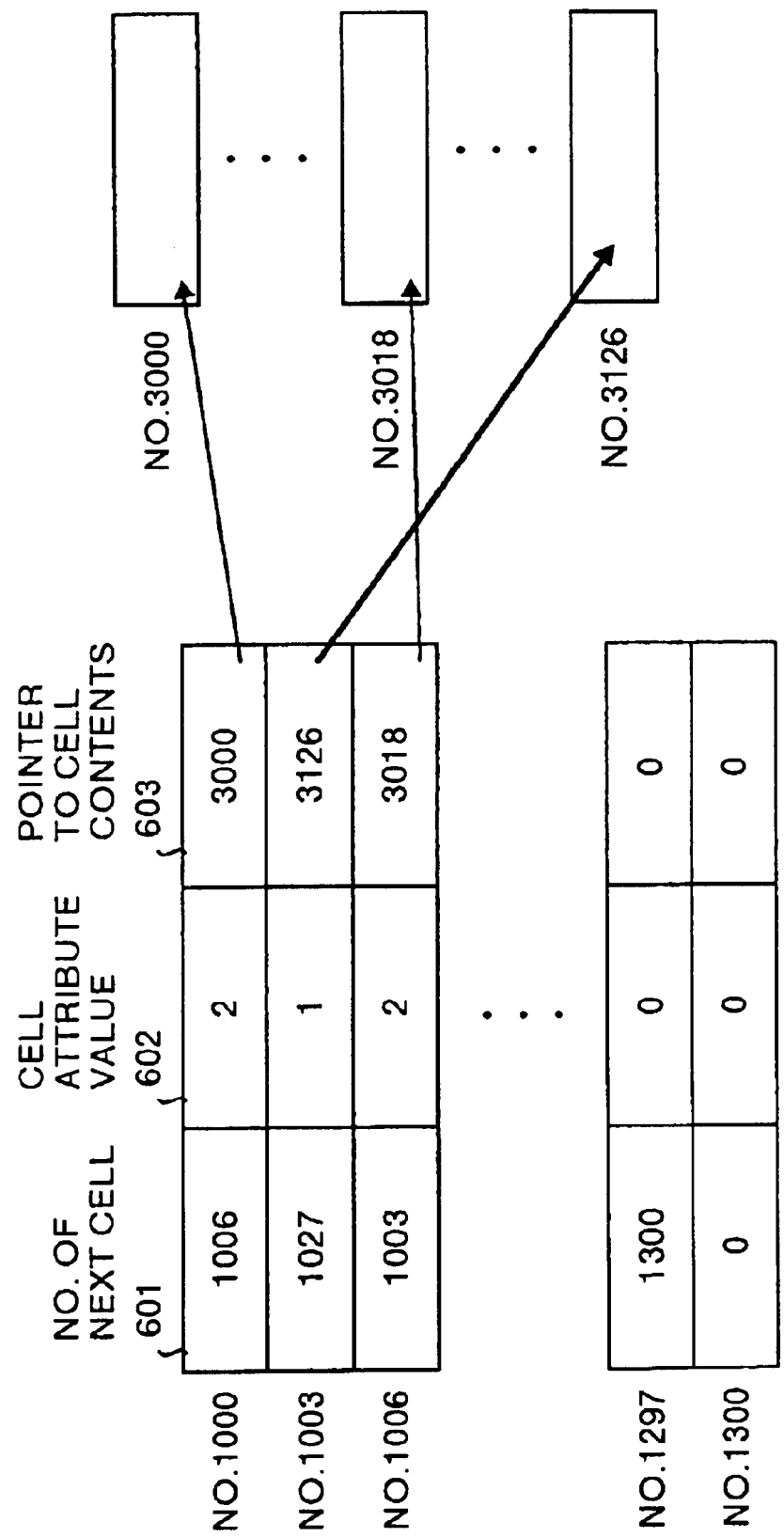
FIG. 6 is a diagram explaining a data structure of a document stored in a document memory of the document processor according to the first embodiment of the present invention.

A unique document ID is appended to each document and each document in the document clusters obtained by the input section 401, and these are stored in the document memory 402. FIG. 6 is a diagram explaining the structure of document data stored in the document memory 402 of the document processor according to the first embodiment. Each of the item names and item values are saved in one memory unit, that is, in one cell of the document memory 402.

In FIG. 6, one cell comprises three memory regions, and the position (number) of the next cell in the document memory 402 is stored in the first memory region 601. The generic value of the cell is stored in the second memory region 602.

The generic values of the cells can, for example, be set such that "0" signifies "empty", "1" signifies "numerical value", and "2" signifies a letter row . . . The content of the cell, that is, the head position of the region which the item name or the item value and the like are stored in, is stored in the third memory region 603.

Rearrangement of the cell sequence, and addition and deletion of cells, can easily be performed by changing the position of the next cell stored in the first memory region 601. Furthermore, since the actual content of the cell is stored in a different region in the cell structure, when an item has been updated and can no longer be held in a region reserved in advance, for example, it is only necessary to reserve another large region in which to store the item, with no effect on the structure of the cell itself, and to update the head position of the third memory region 603 stored third.

FIG. 7 is a diagram explaining another data structure of a document stored in the document memory 402 of the document processor according to the first embodiment. In FIG. 7, one cell uses two memory regions. The generic value of the cell is stored in a first memory region 701. The content of the cell, that is, the head position of the region which the item name or the item value and the like are stored in, is stored in a second memory region 702.

The next cell is stored in the next memory region adjacent in the document memory 402. With this data structure, a movement operation within the memory is required when cells have been rearranged, added, or deleted.

The document memory 402 comprises a semiconductor memory for handling data usually at high-speed, but may include an auxiliary memory device comprising a magnetic disk, an optical disk, or the like.

Documents and document clusters stored in the document memory 402 are displayed by the output section 46. In the first embodiment, the output section 406 comprises a CRT display, a liquid crystal display, or the like. The output section 406 reads out the contents of documents and document clusters stored in the document memory 402 in the cell sequence, and displays or prints them in table format.

Furthermore, the output section 406 may also comprise a graph drawer 407 for drawing graph based on the data displayed or printed in table format. The graph drawer 407 reads out contents of a region set by the user with respect to item values of a document or a cluster of documents stored in the document memory 402, draws graph such as bar graphs, pie charts, regular line graphs, and the like, and displays and prints them.

The output section 406 also displays operations of the input section 401, by for example displaying operation menus, mouse pointers, cursor displays, and the like. Furthermore, the output section 406 may also comprise a printing device such as a printer for printing the results of processing.

In compliance with a command input by the operator to the input section 401, the selector 403 reads out data in a region selected by the display of the output section 406 from the document memory 402, and sends it to the characteristics extractor 404. The method by which the selector 403 makes its selection will be explained using FIGS. 8 to 10.

FIGS. 8 to 10 are diagrams explaining examples of screen displays of the output section 406 of the document processor according to the first embodiment. More specifically, the diagrams show examples of screen displays listing types of vehicle malfunctions. In FIG. 8, the display screen displays a "numbers" column 801 showing document ID numbers, a "date received" column 802 showing the date on which the malfunction information was received, a "sales office" column 803 showing the sales office where the malfunction information was received, a "vehicle type" column 804 showing the type of vehicle to which the information refers, a "year" column 805 showing the year of the vehicle to which the information refers, and a "contents" column 806 showing the content of the malfunction information.

In FIG. 9, a selected region 901 is the portion displayed within the rectangle and altered in color. Similarly, in FIG. 10, the selected region 1001 is the portion displayed within the rectangle and altered in color.

The region selected by the selector 403 may be one part of a column displayed on the screen as shown in FIG. 9, or, when an item name is selected as shown in FIG. 10, all the item value belonging to that item name may be selected. In the first embodiment, only regions belonging to letter rows can be selected.

Next, the process of extraction performed by the characteristics extractor 404 will be explained. An item value is selected by the selector 403, and the characteristics of the item name are extracted by the characteristics extractor 404. FIG. 11 is a diagram explaining a list of contents of extraction processing performed by the characteristics extractor 404 of the document processor according to the first embodiment.

In FIG. 11, extraction includes extracting a word contained in a letter row, the number of words, the number of letters in the word, the number of appearances of that word, etc. These are extracted using a natural language processing technique such as format element analysis or syntax analysis, generally used in devices such as a regulatory audio synthesizer device or an automated translation device.

Next, work processing performed by the work processor 405 will be explained. The work processor 405 processes the amount of characteristics extracted by the characteristics extractor 404. FIG. 12 is a diagram explaining a list of contents of work processing performed by the work processor 405 of the document processor according to the first embodiment.

Work processing comprises processing such as "classification" for classifying identical characteristics, "retrieval" for retrieving a predetermined amount of characteristics, "rearranging" for rearranging contents of the characteristics amount, "representative extraction" for extracting a representative value of an amount of characteristics, "maximum value extraction" for extracting a maximum value from an amount of characteristics, "minimum value extraction" for extracting a minimum value from an amount of characteristics, "calculation" for calculating an amount of characteristics, and such like.

The operator can select his own combination of the contents of characteristics extracted by the characteristics extractor 404, and extracted characteristics processed by the work processor 405. Furthermore, it is possible to preset highly-efficient combinations, and supply these to the operator.

The result of the processing carried out by the work processor 405 is saved in a work-processing result saving section 408 in the work processor 405. The processed result saved in the work-processing result saving section 408 is output from the output section 406. The output section 406 reads out the contents of the work-processing result saving section 408, and displays or prints them.

Here, an example will be explained in which the number of appearances of a word contained in the item value is selected as the (amount of) characteristics extracted by the characteristics extractor 404, and classification is selected as the work-processing to be carried out by the work processor 405.

In general, when there are two documents, and the incidence of appearance of words comprising the two documents are equal, it can be assumed that the meanings of the two documents are similar to each other. That is, the number of appearances of a word in a document is a characteristic having a profound relationship to the meaning of the document. Therefore, it can be envisaged that when multiple documents have been classified using the number of appearances of a word therein as a characteristic, the relevant documents having a meaning close to the classification categories will.

The analyzer 409 in the characteristics extractor 404 performs natural language analysis, such as format element analysis, to each of one or multiple item values selected by the selector 403, and divides them into words. Furthermore, information representing the part of speech of each word is appended thereto. Of the words appearing, a unique word ID is appended to those that are nouns, and the number of appearances of each word ID is counted for one item value, and for all item values selected by the selector 403.

The characteristics extractor 404 comprises a characteristic vector creator 410, which creates an item value characteristic vector showing the (amount of) characteristics of individual item values based on the number of appearances counted. For example, FIG. 13 shows the characteristic vectors for each item value when the item values selected by the selector 403 are:

"Large noise pollution"
"Vehicle paint changes color"
"Overheat occurs"
"Paint is peeling"
"Battery is dead"
"Black exhaust fumes"

Furthermore, FIG. 14 shows the words and the number of appearances of each of the word IDs those words.

Hence, the following characteristic vectors were obtained:

"Large noise pollution": {1, 1, 1, 0, 0, 0, 0, 0, 0, 0, 0, 0, 0}

"Vehicle paint changes color": {0, 1, 0, 1, 1, 1, 0, 0, 0, 0, 0, 0, 0}

"Overheat occurs": {0, 1, 0, 0, 0, 0, 1, 1, 0, 0, 0, 0, 0}

"Paint is peeling"; {0, 1, 0, 1, 0, 0, 0, 0, 1, 0, 0, 0, 0}

"Battery is dead": {0, 1, 0, 0, 0, 0, 0, 0, 0, 1, 1, 0, 0}

"Black exhaust fumes": {0, 1, 0, 0, 0, 0, 0, 0, 0, 0, 0, 1, 1}.

The characteristic vectors of these item values are output from the characteristics extractor 404 and sent to the work processor 405. The work processor 405 classifies the documents using the characteristic vectors of the item values. Firstly, the distances between the individual vectors are calculated. For example, the distances can be measured using their inner products.

After the distance have been calculated, the vectors with the nearest distances are gathered together. For example, a K-means method is used to classify a group of vectors into K numbers of vector groups in correspondence with the distances thereof. When the vectors have been classified, the work processor 405 appends numbers showing which classification the vectors belong with respect to their item values, that is, cluster numbers, and document IDs corresponding to the item values, and sends the result to the output section 406, where they are displayed.

FIG. 15 shows an example of a screen display of cluster number 1501. Documents which have the same cluster number (for example, documents "1" and "6", both have the cluster number "5") belong to the same classification group.

Next, an arrangement of a second aspect of the present invention in which a cross table is output will be explained. After the input section 401 has read out a cluster of documents to be analyzed, the operator inputs commands indicating the names of items to be classified, the names of items which will form the vertical or horizontal axis of the cross table, and the number of classifications.

FIG. 16 shows a command screen for creating a cross table. In FIG. 16, the command screen 1600 comprises a process item name input column 1601, an axis item name column 1602, a vertical axis command button 1603, a horizontal axis command button 1604, and a classification number input column 1605.

The name of the item to be processed 1601 is input to the process item name input column 1601. The item name can be input from the keyboard 209 or the like, or by using the mouse 210 or the like to select an item from available items being displayed. Furthermore, the name of the item to be the vertical axis is input to the axis item name column 1602. This can be input by the same method as to the process item name input column 1601.

The vertical axis command button 1603 and the horizontal axis command button 1604 are for specifying commands to display an item name to be an axis on the vertical axis or the horizontal axis. Furthermore, the number of classifications is input to the classification number input column 1605. The number of classifications can be input from the keyboard 209 or the like, or by using the mouse 210 or the like to select an item from available items being displayed.

In FIG. 16, "contents" is input to the process item name input column 1601, "vehicle type" is input to the axis item name column 1602, the horizontal axis command button 1604 is marked, and "50" is input to the classification number input column 1605. This indicates that a command has been given to classify the document cluster into "50" classifications based on the "contents" of the document cluster, and to display "vehicle type" along the horizontal axis of the cross table.

Figure 17:
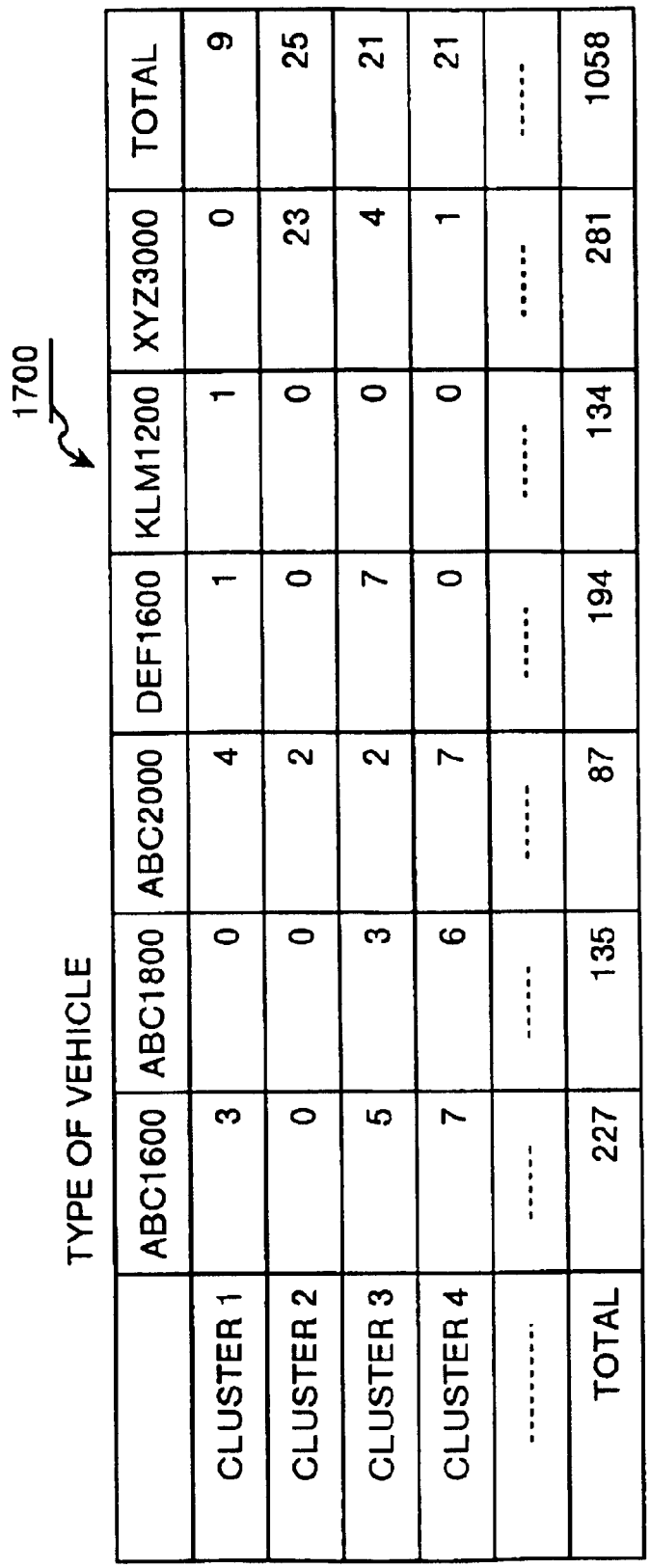
FIG. 17 is a diagram explaining a cross table displaying a result of classification processing by an output section of a document processor according to the first embodiment of the present invention.

Following a command to create the cross table, classification is carried out, and the classification result is displayed in the cross table. FIGS. 17 and 18 are diagrams showing cross charts displaying classification results. In the cross table 1700 of FIG. 17, the vertical axis displays "cluster 1", "cluster 2", . . . , showing classifications, and the horizontal axis displays "ABC1600", "ABC1800", . . . , showing vehicle types.

The vertical axis of the table, that is, the lines, correspond to clusters created by classification. The first column of each line contains letter rows showing values determined at the end of classification as preset cluster numbers. The horizontal axis of the table, that is, the columns, display non-duplicating letter rows contained in the item "vehicle name" of the document cluster. Each cell of the line "cluster 1" displays the number of the documents classified into cluster 1 in which the value of the item "vehicle type" matches the vehicle type in that column.

Here, instead of displaying numbers, the size of numbers to display the color intensity of the cell, or the area needed to paint the cell, need only be expressed. Furthermore, the columns on the far right and far left of the table show the totals of lines and columns.

In FIG. 18, by moving a mouse pointer 1800 to a cell of the cross table 1700, pressing the mouse button of the mouse 210, or moving the cursor by operating a cursor key on the keyboard 209, and pressing a specific key, so that the content display screen 1801 near that cell is displayed, the item "contents" of the corresponding document are displayed.

The content display screen 1801 displays the number of data in the cell, the display items, cell information, and contents of the display items in the data. The cell specified by the mouse pointer 1800 displays a data number: "4", display item: "contents", cell information: "ABC2000-cluster 1", and four contents as "contents" of the display items: "exhaust is black, exhaust is black, . . . ". Consequently, the contents of a cell can be identified simply by moving the mouse pointer to the desired cell and pressing the mouse button.

Furthermore, the items displayed in the content display screen 1801 can be updated by resetting, all the items can be displayed, and items can be selectively displayed.

The first column of each line contains letter rows showing values determined at the end of classification as preset cluster numbers. This column can be rewritten by the operator. For example, after confirming the contents of a cell by the operation described above, "cluster 1" can be rewritten as "exhaust problems." As a consequence, it is easier to grasp the content of the information.

Furthermore, instead of inserting a letter row showing the value determined at the end of classification as a preset cluster number, it is possible to extract a letter row showing the characteristics of the cluster, and insert this into the cell. For example, this can be achieved by extracting the phrases and words which appear most frequently from the item "contents" of the document contained in cluster 1.

In FIG. 18, words such as "exhaust is black" or "exhaust" are entered into the cluster 1. Thus, by a simple operation, the operator is able to learn not only the distribution of the entire document, but also, where necessary, the detailed contents of individual documents.

Figure 19:
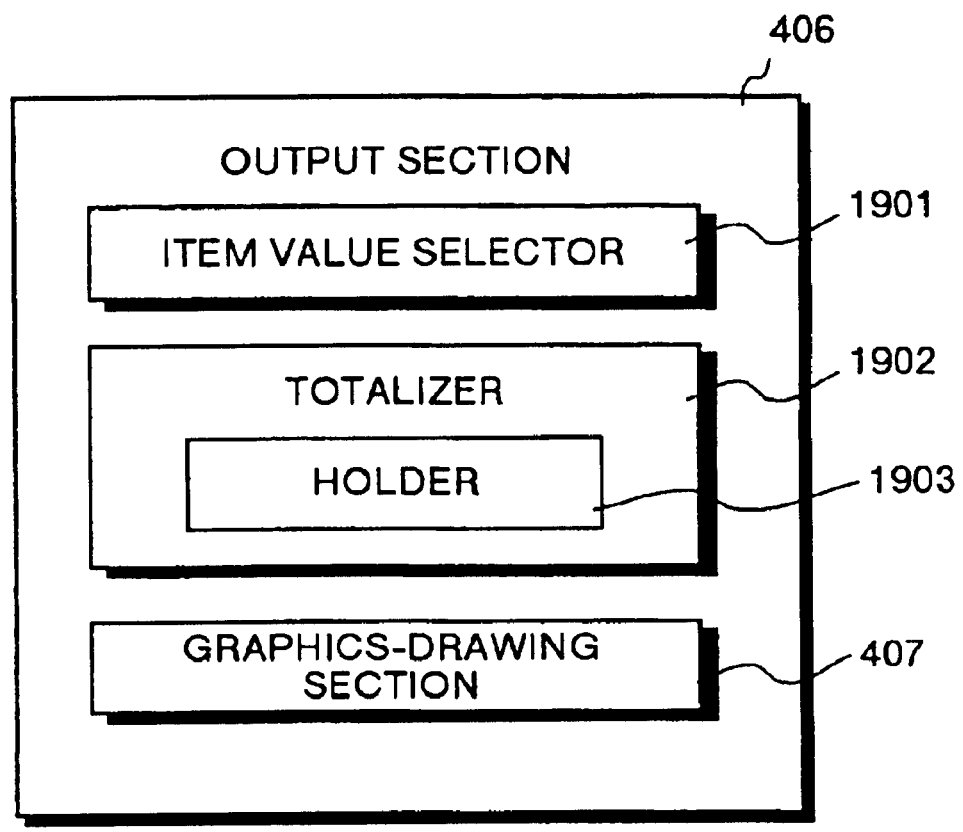
FIG. 19 is a block diagram showing a detailed constitution of an output section of a document processor according to the first embodiment of the present invention.

Next, the constitution of the output section 406 for creating a cross table will be explained in detail. FIG. 19 is a block diagram showing a constitution of the output section 406 of the document processor according to the first embodiment. The output section 406 comprises an item value selector 1901, and a totalizer 1902, in addition to the graph-drawing section 407. Moreover, the totalizer 1902 comprises a table saving section 1903 having a memory region in correspondence with contents which are actually displayed.

In compliance with an item name (axial item name) specified by the operator as one axis of the cross table, the item value selector 1901 sequentially reads out item values from document data stored in the document memory 402, and gathers item values which are not duplicated. Furthermore, the totalizer 1902 totalizes the document by adding a numerical value to the region corresponding to the item value of the table saving section 1903.

Figure 20:
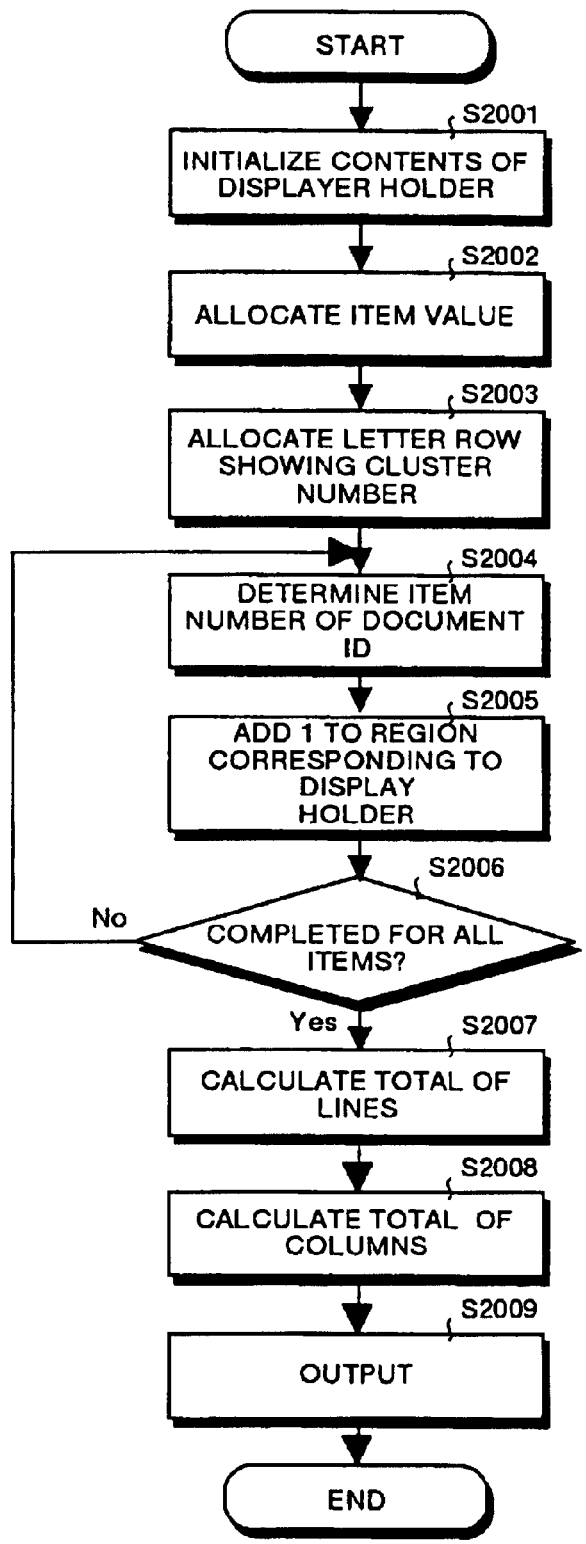
FIG. 20 is a flowchart showing an output sequence of a cross table of a document processor according to the first embodiment of the present invention.

Next, the output sequence of a cross table will be explained. FIG. 20 is a flowchart showing an output sequence of a cross table of the document processor according to the first embodiment. In the flowchart of FIG. 20, the contents of the table saving section 1903 are initialized (Step S2001) prior to totalization.

Next, an item value produced by the item value selector 1901 is allocated to a portion of the table corresponding to the item value label (Step S2002), and a letter row expressing a cluster number is allocated to a portion corresponding to the cluster number (Step S2003).

Next, an item value corresponding to the axial item value is determined by referring to documents stored in the document memory 402 to find document ID which corresponds with the item value saved in the work-processing result saving section 408 (Step S2004). Thereafter, 1 is added to the contents of the corresponding region in the table saving section 1903 (Step S2005).

It is then determined whether all the item values have been processed (Step S2006), and if not (NO in the Step S2006), the sequence shifts back to the Step S2004, and the processes between the Steps S2004 to S2006 are repeated.

When it has been determined in the Step S2006 that processor has been carried out for all the item values (YES in the Step S2006), the total number of lines is calculated to be displayed in the far right row (Step S2007), and simultaneously, the total number of columns is calculated to be displayed in the bottom line (Step S2008).

Thereafter, a table formed in the table saving section 1903 is sequentially read out (Step 82009), whereby all processing ends.

Data output from the work processor 405 can be sent to the document memory 402, and stored there with other data in the document memory 402. Data which have been output from the work processor 405 and stored in the document memory 402 can be displayed by the output section 406 as a new row of the table. Furthermore, existing rows of the table can be deleted, and replaced by writing the new data.

In this constitution, the result of the processing, being the data output from the work processor 405, can be handled on an equality with other data which was not processed this time in the document memory 402. In subsequent analysis, the data can be selected for work processing without needing to distinguish whether it was present in the original input data, or was created by the work processor 405 during analysis.

Therefore, the data to be work processed and the contents of the work processing can be flexibly selected in accordance with the type of data, and the contents of the information analysis to be performed, enabling a wide variety of information to be analyzed with high precision.

Furthermore, it is possible to input to the work processor 405 not only data output from the characteristics extractor 404, but also data selected by the selector 403. Consequently, additional work processing can be carried out to data whose characteristics do not need to be extracted from the letter row, and to numerical values of the work processed result, enabling an even wider variety of information to be analyzed with high precision.

FIGS. 21 to 24 are diagrams explaining other examples of display screens of the output section 406 of the document processor according to the first embodiment. In FIG. 21, a "cluster number" 2101 obtained by classification is displayed in addition to "number", "date received", "sales office", "vehicle type", "year", and "contents".

Moreover, in FIG. 21, the selector 403 has selected "cluster number" 2101, and data relating to the "cluster number" 2101 is displayed in inverse video. When the "cluster number" 2101 is indicated using a key, the work processor 405 rearranges the data.

FIG. 22 shows the result of the rearrangement. In FIG. 22, documents having a "cluster number" of "1" have been collected and displayed. Thereafter, documents having a "cluster number" of "2" are collected and displayed.

More specifically, the documents are rearranged in a sequence of "numbers" "2", "11", "15", "23", "35", "54", "63", "73", and "82", which have a "cluster number" of "1". Thereafter, "numbers" "14", "18", "22", "27", "37", . . . , which have a "cluster number" of "2", are displayed.

Next, documents whose items in the "vehicle type" column belong to "cluster number" of "1" are selected. In FIG. 23, the items in the "vehicle type" column which belong to "cluster number"of "1" have been selected, and the selected region 2301 is displayed in inverse video. In this way, since the document have already been rearranged according to their "cluster number", and documents belonging to the same cluster have been gathered and displayed, they can easily be selected as a continuous region on the screen.

Figure 24:
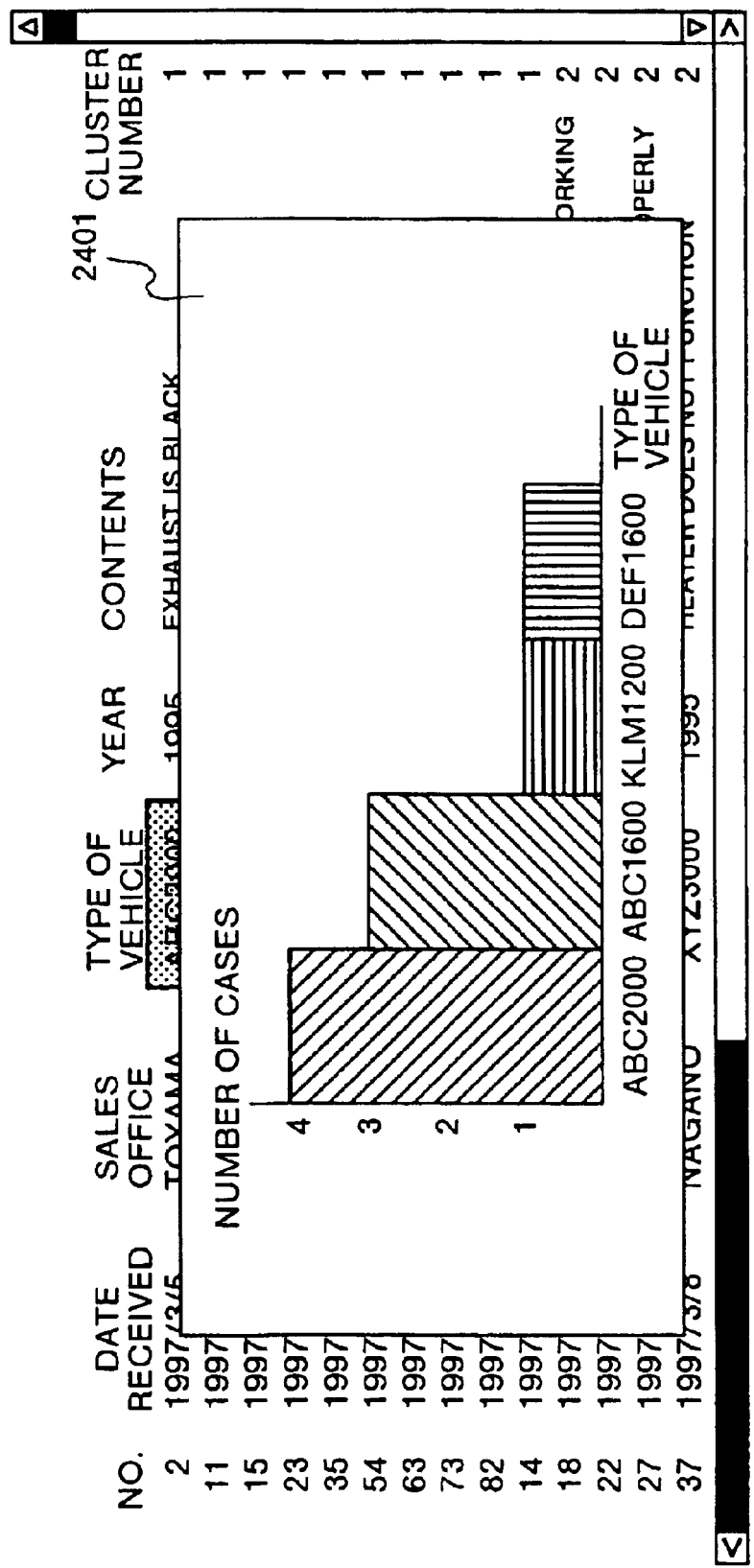
FIG. 24 is a diagram explaining another screen display of an output section of a document processor according to the first embodiment of the present invention.

Next, FIG. 24 shows a bar graph of the incidence of generation of the separate vehicle types in the selected region 2301. In FIG. 24, the bar graph display region 2401 displays the nine selected documents whose "cluster number" is "1", selected in the selection region 2301. These nine documents are displayed in the bar graph according to their vehicle type.

In this way, the documents to be work processed can be flexibly and easily selected, and various kinds of processes can be carried out thereto. Furthermore, the processed result can be processed again in the next processing, enabling information to be analyzed at high precision.

Here, the characteristics of the letter rows which have been classified or the like are extracted, and are processed in a variety of ways after work processing using the characteristics. However, a variety of processing may alternatively be performed in advance.

For example, it is possible to select the item "vehicle type", rearrange the documents using this as a key, and classify the collected vehicle types according to, for example, "ABC1600". Furthermore, when a document input by the input section 401 contains errors such as misspellings, it is possible to retrieve the letter row and replace the errors prior to extracting the characteristics of the classified letter row and carrying out work processing using these characteristics, thereby adjusting the data to obtain a more accurate result.

Figure 25:
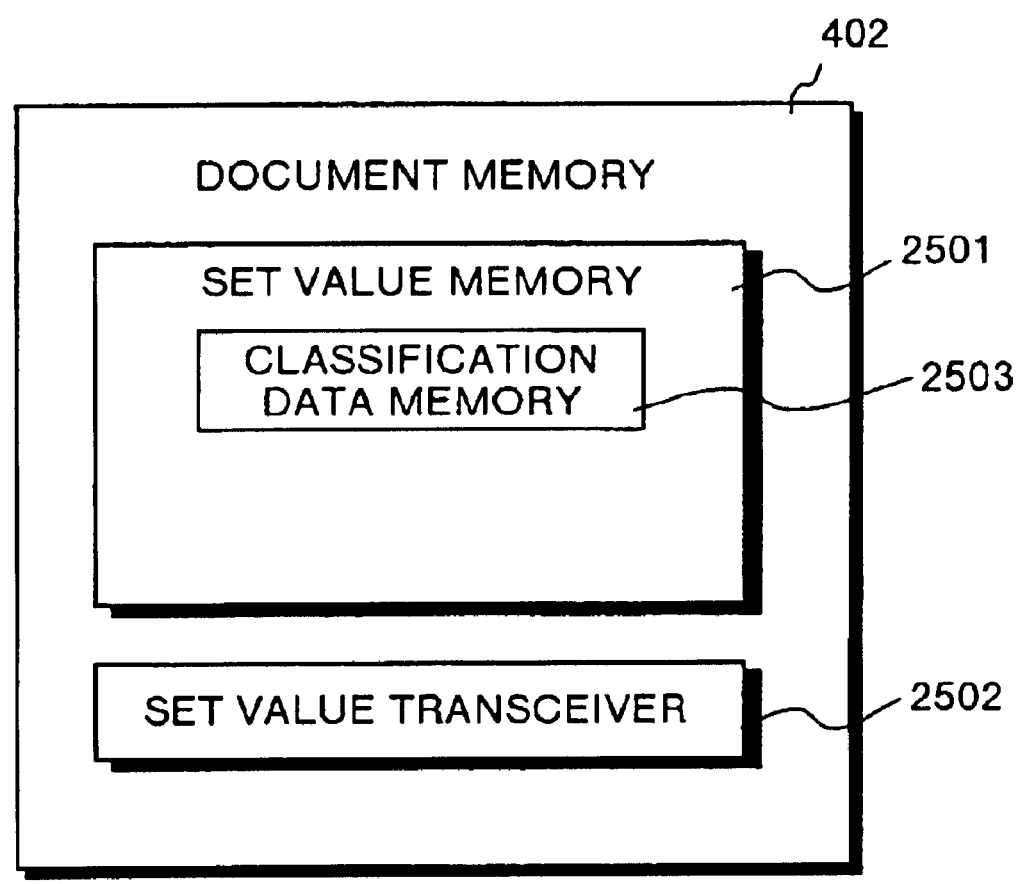
FIG. 25 is a block diagram showing a detailed constitution of document memory of a document processor according to the first embodiment of the present invention.

FIG. 25 is a block diagram showing a detailed constitution of the document memory 402 of the document processor according to the first embodiment. In FIG. 25, the document memory 402 comprises a set value memory 2501, and a set value transceiver 2502. The set value memory 2501 comprises memories, starting with a classification data memory 2503, for storing information relating to various set values, that is, set values needed for operations of the document processor. Consequently, the information relating to the set values can be stored together with the document information.

Furthermore, the set value transceiver 2502 transmits information relating to the set values stored in the set value memory 2501 to other information processors. Furthermore, the set value transceiver 2502 receives the information relating to the set values from other information processors. Information relating to set values is received by the set value transceiver 2502, and is stored in the set value memory 2501.

Stored information relating to set values is read out simultaneous to the subsequent second reading of the document, and is stored in the set value memory 2501. The operator can refer to the information relating to the set values by a predetermined operation, and it can be reused in subsequent processing. Consequently, the information relating to set values can be saved and managed together with the documents, thereby preventing loss of the information relating to the set value, and enabling appropriate set values to be reused later.

Figure 27:
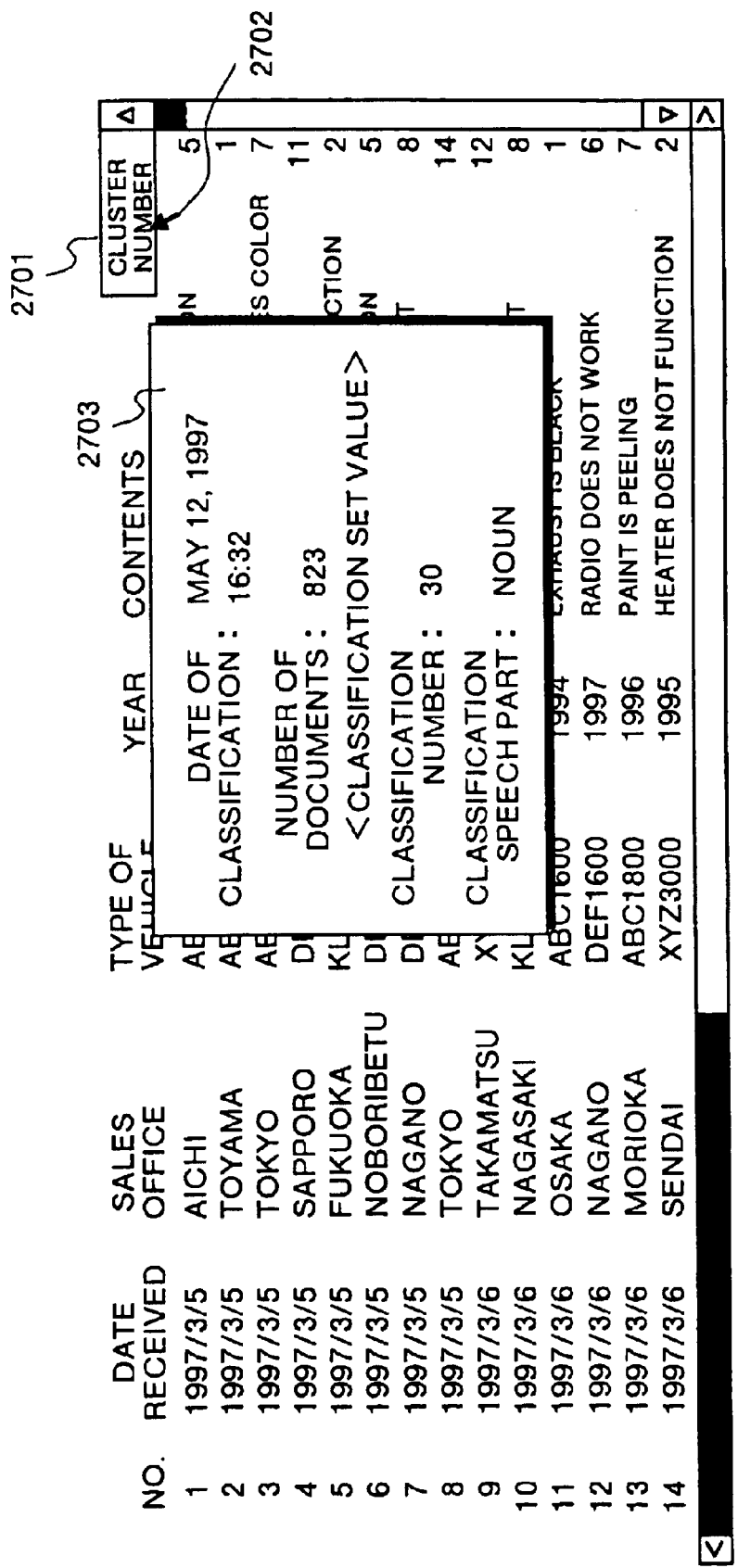
FIG. 27 is a diagram explaining another screen display of an output section of a document processor according to the first embodiment of the present invention.

FIGS. 26 to 28 are diagrams explaining other examples of screen displays of the output section 406 of the document processor according to the first embodiment. In FIG. 26, firstly, the operator selects the "contents" to be classified on the display screen. Consequently, the selected region 2601 is displayed in inverse video. Next, when the classification button 2603 is selected from a menu bar 2603, a question screen 2604 appears asking the number of classifications required, that is, the number of documents to be classified.

When the operator enters the number of classifications into the question screen 2604, information relating to the number of classifications is stored in the document memory 402. In FIG. 26, "50" is input as the number of classifications.

Thereafter, when the operator completes the analysis of the information, and presses a save button (not shown in the diagram) which pops up on the screen after selecting the file button 2605 of the menu bar 2603, the document memory 402 stores the information of the document together with the classification result after appending a file name specified by the operator.

In FIG. 27, when the mouse pointer 2702 is moved to a column 2701 displaying the classification result, and the mouse button is pressed, a classification information display screen 2703 displays the information relating to classification used in the classification, and information relating to the classification set value. As a consequence, relevance of the set value used can be easily understood.

The information relating to classification, displayed on the classification information display screen 2703, for example comprises "classification date" showing information relating to the time and date on which classification was carried out, "number of documents" showing information relating to the number of documents that were classified, etc. Furthermore, the information relating to the classification set value comprises information such as "classification number" showing the number of classified documents, and "classification speech part" showing which part of speech the classification was based on.

A new table is created for each classification. FIG. 28 shows a second classification result displayed after classification has been carried out a second time after obtaining the first classification result. When the operator wishes to display the first classification result again, he or she moves the mouse pointer to the selection region 2801 on the label at the bottom left of the screen, and presses the mouse button. As a consequence, the first classification result is displayed again. Thereafter, the second classification result can be displayed again by performing the same operation.

Furthermore, in FIG. 28, information relating to the set value used in the classifications are displayed in a predetermined display region 2802 of the table. The display region 2802 does not conceal the classification result display, and the position of the display can be moved. Consequently, the relationship between the classification result and the set value can easily be understood.

Figure 29:
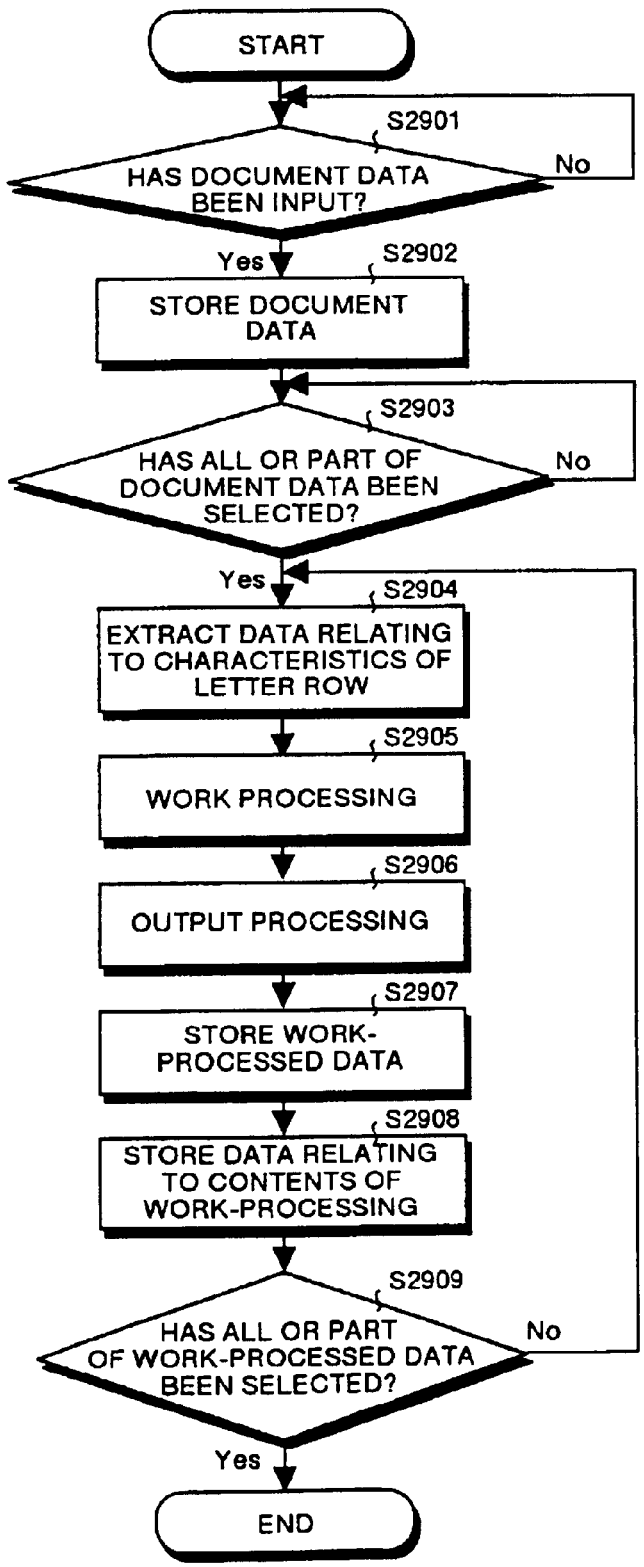
FIG. 29 is flowchart showing a sequence of document processing in a document processor according to the first embodiment of the present invention.

Next, a sequence of document processing of the document processor according to the first embodiment will be explained. FIG. 29 is a flowchart showing a document processing sequence of the document processor according to the first embodiment.

In the flowchart of FIG. 29, when starting the process, it is determined whether the document data has been input to the document processor (Step S2901). Here, the document processor waits for the document data to be input, and when the document data has been input (YES in Step S2901), the input document data is stored (Step S2902). The Steps S2901 and S2902 may be carried out independently of other steps each time document data is input.

Next, it is determined whether all or part of the stored document data has been selected (Step S2903). Here, the document processor waits for all or part of the document data to be selected, and when document data has been selected (YES in Step S2903), data relating to letter row characteristics of all or part of the stored document data is extracted (Step S2904).

Thereafter, in the Step S2904, predetermined work processing, such as classification, is carried out based on the extracted data relating to the letter row characteristics (Step S2905). Following this, data which were work-processed in the Step S2905 are output in a table format or the like (Step S2906).

Moreover, the data which were work-processed in the Step S2905 are stored in correspondence with the original document data (Step S2907). Furthermore, data relating to contents of the work processing such as the set value of the work processing are simultaneously stored (Step S2908).

Thereafter, it is determined whether all or part of the data processed in the Step S2905 has been selected (Step S2908). When the data has been selected (YES in the Step S2908), the sequence shifts to the Step S2904, and thereafter, the processes from the Step S2904 to S2909 are repeated. On the other hand, when it is determined that all or part of the data processed in the Step S2909 has not been selected (NO in the Step S2909), all processing ends.

The document processing explained in the first embodiment can be realized using a program prepared in advance on a computer, such as a personal computer or a work station. This program is recorded on a computer-readable recording medium such as a hard disk, a floppy disk, a CD-ROM, an MO, or a DVD, and is executed by reading out the program from the recording medium using the computer. Furthermore, the program can be distributed via the recording medium, or by using a network such as the Internet as a transmission medium.

Next, an information classification device according to a second to sixth embodiments will be explained. In the second to sixth embodiments described below, multiple classifications are carried out while varying parameters (number of clusters and document clusters to be classified, standards of similarity, stop words, etc.) for document classification, extraction, and positioning of a topic (content) from one cluster of documents, based on the same interpretation as above, namely that a document cluster includes a great amount of noise. By providing means for saving and integrating the results, it is possible to gradually determine what kind of contents are contained in a given document cluster.

Since the information processing system comprising the document classification device according to the second embodiment of the present invention is the same as the first embodiment shown in FIG. 1, further explanation will be omitted. Furthermore, since the hardware constitution of the server 101 and the clients 102 is the same as the first embodiment shown in FIGS. 2 and 3, in order to avoid repetition, their explanation will be omitted.

Figure 30:
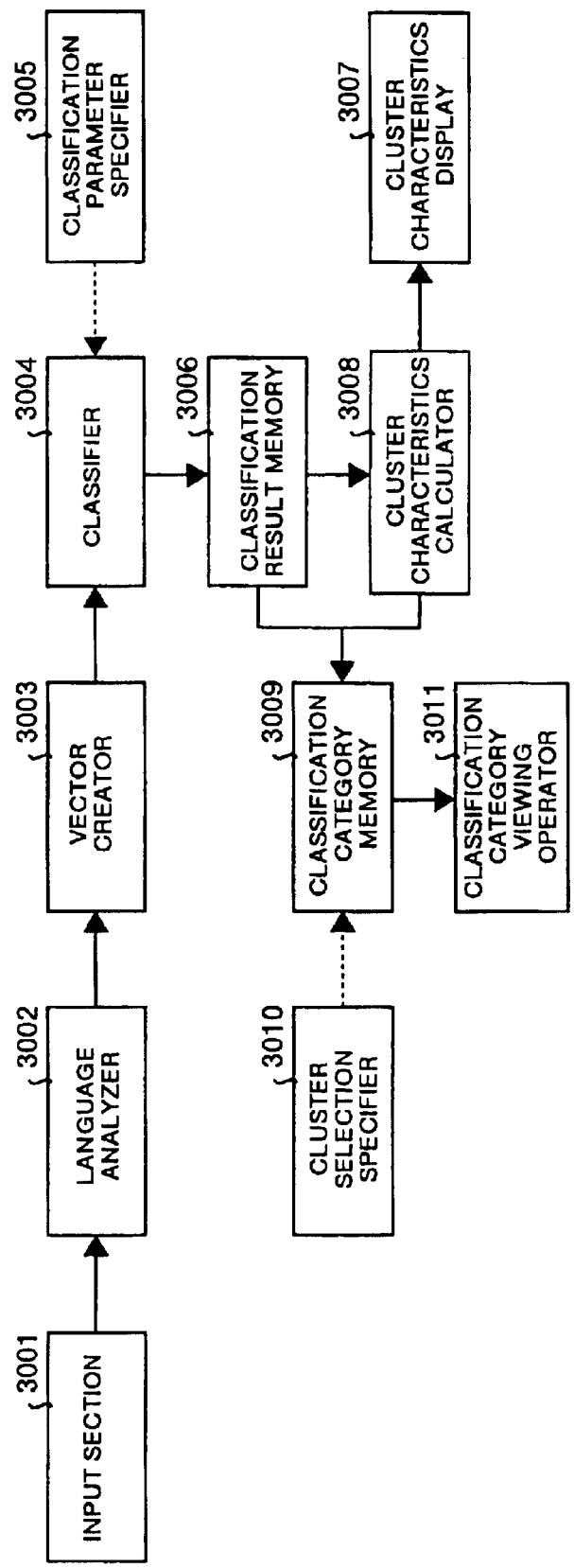
FIG. 30 is a block diagram functionally showing a constitution of a document classification device according to a second embodiment of the present invention.

Next, the functional constitution of a document classification device according to the second embodiment will be explained. FIG. 30 is a block diagram showing a functional constitution of the document classification device according to the second embodiment.

As shown in the block diagram of FIG. 30, the document classification device comprises an input section 3001, a language analyzer 3002, a vector creator 3003, a classifier 3004, a classification parameter specifier 3005, a classification result memory 3006, a cluster characteristics display 3007, a cluster characteristics calculator 3008, a classification category memory 3009, a cluster selection specifier 3010, and a classification category viewing operator 3011.

The input section 3001, the language analyzer 3002, the vector creator 3003, the classifier 3004, the classification parameter specifier 3005, the classification result memory 3006, the cluster characteristics display 3007, the cluster characteristics calculator 3008, the classification category memory 3009, the cluster selection specifier 3010, and the classification category viewing operator 3011 are controlled by command processing of a CPU 201, a CPU 301, and the like, in compliance with commands written in programs recorded in recording media such as a ROM 202, a ROM 302, a RAM 203, a RAM 303, or a disk device 306, and a hard disk 316.

Here, the input section 3001 inputs document data, and for example comprises an I/F 204, or an I/F 309, or the like, capable of obtaining documents and groups of documents via keyboards 209 or 311, a scanner 313 comprising an OCR function, and a network 103.

Furthermore, in addition to the above, if the input section 3001 is capable of extracting document data, it may comprise all the above parts. For example, when the document data is saved in a data base, and the medium in which the data base is stored is provided in the document processor of the first embodiment, document data is input.

Furthermore, the language analyzer 3002 obtains language-analyzed information by analyzing document data input by the input section 3001. The vector creator 3003 creates a document characteristics vector for the document data, based on the language-analyzed information obtained from the language analyzer 3002.

Furthermore, the classifier 3004 classifies documents based on the degree of similarity between document characteristic vectors created by the vector creator 3003, and creates clusters of documents. The classification parameter specifier 3005 specifies classification parameters, and for example comprises the I/F 204 or 309, or the like, capable of obtaining documents and groups of documents via the keyboards 209 or 311, the mouses 210 or 312, or the network 103.

Furthermore, the classification result memory 3006 stores the classification result obtained by the classifier 3004, that is, information relating to clusters of classified documents. Furthermore, the cluster characteristics display 3007 displays cluster characteristics calculated by the cluster characteristics calculator 3008.

The cluster characteristics calculator 3008 calculates cluster characteristics, which are characteristics of document clusters created by the classifier 3004. Furthermore, the classification category memory 3009 stores the cluster characteristics, calculated by the cluster characteristics calculator 3008, as constitution elements of classification categories. Furthermore, the classification category memory 3009 stores clusters of documents, selected by the cluster selection specifier 3010, as constitution elements of classification categories. That is, it stores all or some of the documents belonging to clusters selected by the cluster selection specifier 3010 as constitution elements of classification categories.

The cluster selection specifier 3010 selects desired clusters from among the multiple cluster characteristics displayed by the cluster characteristics display 3007. Furthermore, the cluster selection specifier 3010 selects desired clusters of document from among the clusters of documents created by the classifier 3004. Furthermore, the classification category viewing operator 3011 controls viewing of data stored in the classification category memory 3009.

Next, there will be explained an appropriate example in which it is important to extract a topic (contents) contained in a document cluster, by imagining an analysis of free responses collected through a questionnaire or the like.

In recent years, it has become possible to collect thousands to tens of thousands of free responses in a short period of time via the Internet or the like. Using this function, a large amount of textual information can be gathered.

As an example of a large amount of textual information collected through a questionnaire or the like, documents containing written answers given in response to the question: "Please give an example of wasteful office networking". A document cluster is a cluster of single responses.

Here, the operator (the questionnaire analyzer) may want to know a summary of the opinions expressed, that is, what type of opinions (topics) are contained in the cluster of opinions (document cluster). To fulfil this requirement, the topic is extracted by gathering together (classifying) similar opinions, so as to extract information relating to the kind of opinions that are contained in the result of the questionnaire.

Document classification typically comprises the following three clearly divided steps. In the first Step, the language analyzer 3002 extracts words (or specific continuous rows of letters) contained in each of the documents (opinions) input by the input section 3001. At this time, for example, a language analysis algorithm such as a format element sign is used.

In the second Step, a "word"ד"document" matrix is created using the extracted words as rows, the documents as lines, and the word incidence as components. In addition to word extraction using language analysis tools having a format element analysis function and a syntax analysis function, other information such as speech-part information, phrases, and syntax information, can be obtained simultaneously, and can be considered when creating the above "word"ד"document" matrix.

Based on the "word"ד"document" matrix, the vector creator 3003 expresses the documents as vectors in multidimensional space comprising words. This is accomplished by one of the following methods, all of which are implemented in the embodiments of the present invention.

(1) use the row elements of the matrix directly;
(2) append values representing the importance of the documents after considering the length of the documents (number of letters, number of pages, etc.) and the incidence of the words in all the classified clusters;
(3) calculate an inner product matrix between documents from the above matrix, and apply specific value analysis (for example, by using factor analysis or main element analysis, third-type quantified logic, and the like), to form dormant meaningful space.

Furthermore, it is also possible to use the method described in "Representing documents using an explicit model of their similarities" (Authors: Brian T. Bartell, Garrison W. Cottrell, and Richard K. Belew; Paper Title: Journal of the American Society for Information Science; Academic Body: The American Society for Information Science; Pages: 254–271, Vol. 46 No. 4; Year of Publication: 1995)", wherein the method for converting to dormant meaningful space is generalized, and joint reference information and the like, created from reference information of the document for other documents, is appended to the inner product matrix between documents, and this matrix is used to lead out expression space conversion coefficients for projecting documents and words to space reflecting their similarities.

In the third Step, the classifier 3004 classifies the documents using the degree of similarity of the document characteristic vectors. More specifically, the documents are classified by a method such as square contingency, discriminatory analysis, or clustering.

Furthermore, the degree of similarity may be measured by the inner product, the cosine, the Euclidean distance, the Mahalanobis distance, or the like. Any of these methods can be used in the present embodiment.

Furthermore, there are many conventionally known clustering algorithms. Clustering is generally divided into layered clustering and non-layered clustering, but either can be used in the present embodiment.

Furthermore, the classification parameter specifier 3005 specifies classification parameters to enable the classifier 3004 to classify the document characteristic vectors. The classifier 3004 classifies the document characteristic vectors it is saving, in compliance with classification parameters specified by the classification parameter specifier 3005.

Thus, when the first document classification, comprising the processes of the first to third Steps, has ended, the classification result memory 3006 stores the classification result.

Following this, the cluster characteristics calculator 3008 calculates characteristics showing what kind of clusters have been obtained in the classification result, that is, it calculates cluster characteristics. Typically, it calculates the documents, or some of the documents, belonging to each cluster, and sorts the documents based on their degree of similarity with the center of the cluster.

In addition, numerical values representing standard deviation within the cluster, showing the word with the highest incidence, the number of documents belonging to the cluster, the level of variation of documents within the cluster, are calculated to represent cluster characteristics.

The cluster information is calculated in order to inform the operator what kinds of clusters (i.e. what kind of characteristics they possess) have been output (displayed), and as long as the cluster information shows cluster characteristics to the operator, other types of contents (characteristics) than the above may be used.

Furthermore, in addition to displaying cluster characteristics as above, the cluster characteristics calculator 3008 also calculates information representing the relationship between clusters. In the case of layered clustering, the upper or lower cluster is calculated, and in the case of non-layered clustering, adjacent clusters are calculated based on their degree of similarity to the cluster center.

Next, the cluster characteristics display of the cluster characteristics display 3007 and cluster selection will be explained. FIG. 31 is a diagram explaining an example of a display of the cluster characteristics display 3007 of the document classification device according to the second embodiment.

In FIG. 31, each cluster comprises items such as a "cluster ID" column 3101, a "number of members" column 3102, a "words of high incidence" column 3103, a "document contents" column 3104, and a "degree of similarity to center" column 3105, thereby enabling the operator to operate the display in units.

The "cluster ID" column 3101 displays serial numbers showing the cluster IDs. The "number of members" column 3102 displays the calculated number of documents, or some of the documents, belonging to the cluster. The words having the highest incidence in these documents are extracted and displayed in the "words of high incidence" column 3103. The contents of the documents are displayed in the "document contents" column 3104, and the degree of similarity to the center is expressed in numerical form and displayed in the "degree of similarity to center" column 3105. This makes it easier for the operator to understand the information.

The operator can detect the characteristics of the clusters based on the information (amount of characteristics) displayed. Here, when there is one cluster whose contents (characteristics) can be understood, it can be selected by the cluster selection specifier 3010.

More specifically, by moving the cursor 3110 to a predetermined position of the displayed cluster, for example to the "cluster ID" column 3101 using the mouse 210 or 312 or the like, and clicking on that position, the entire cluster of that cluster ID can be selected. It is acceptable to select some, rather than all, of the documents belonging to the selected cluster.

In FIG. 31, the "cluster ID" column 3101 has been clicked, whereby the entire cluster is displayed in inverse video, and the cluster (cluster ID "1") is selected.

Furthermore, when there is no cluster with comprehensible contents, the operator resets the classification parameters using the classification parameter specifier 3005, and executes another classification.

Data relating to the cluster ID selected by the cluster selection specifier 3010 is transmitted to the classification category memory 3009. The classification category memory 3009 retrieves and stores the above amount of characteristics from the cluster characteristics calculator 3008, based on the data relating to the cluster ID.

Similarly, the classification category memory 3009 retrieves and stores the classification result from the classification result memory 3006. Moreover, the classification category memory 3009 can simultaneously store information representing comments (e.g. "network maintenance cost is high") about clusters input by the operator. Storing information created by the operator as constituent elements of the classification category in this way increases the utilizable value of the classification category.

When an interface for other viewing operations is provided, data stored in the classification category memory 3009 can be structured and categorized manually, or automatically by using the degree of similarity of the stored clusters to the cluster center, while viewing contents of selected and stored clusters, and pinpointing meaningful connections therebetween.

Figure 32:
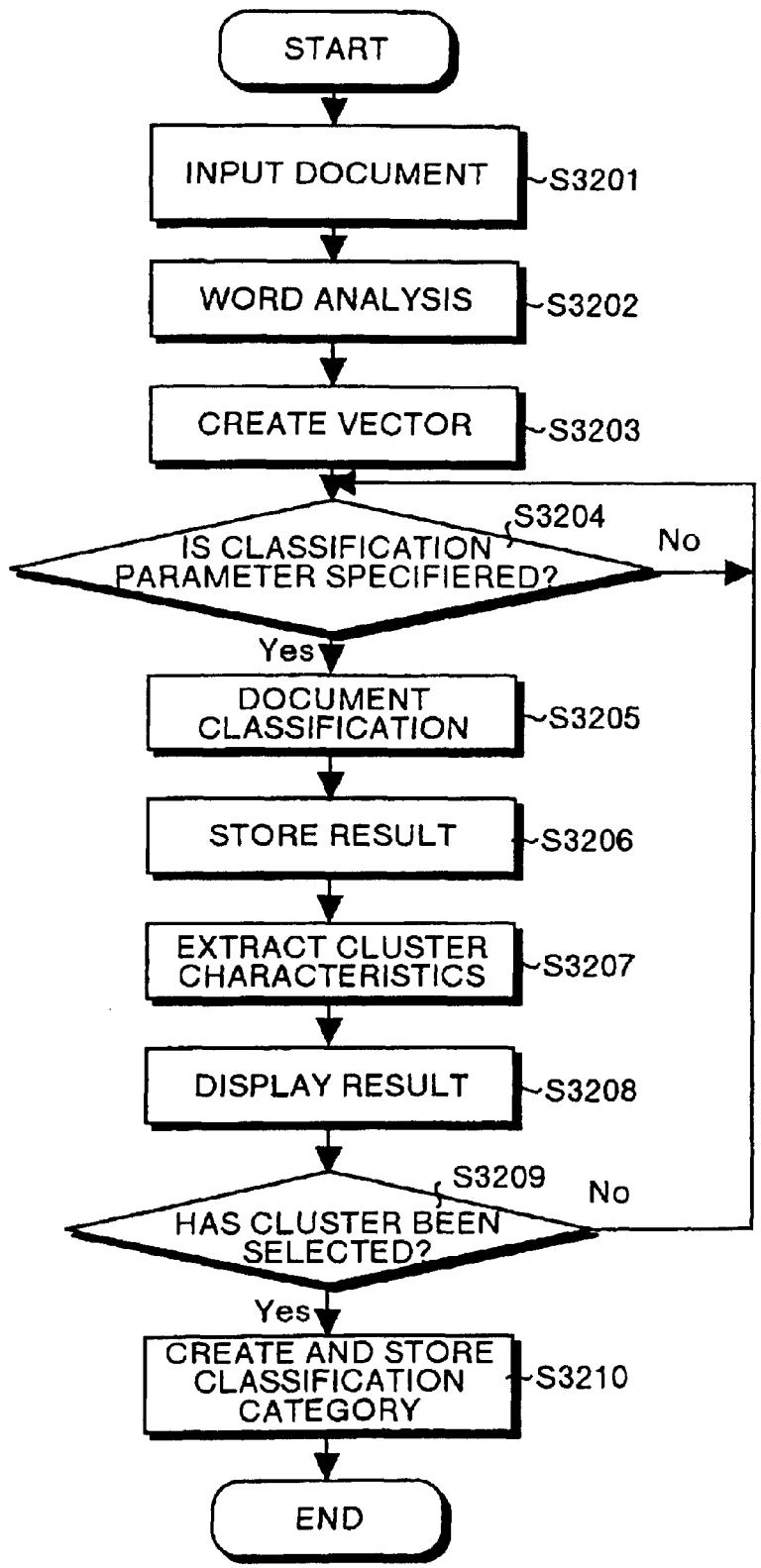
FIG. 32 is a flowchart showing a sequence of processing in a document classification device according to the second embodiment of the present invention.

Next, a processing sequence of the document classification device according to the second embodiment will be explained. FIG. 32 is a flowchart showing a processing sequence of the document classification device according to the second embodiment. In the flowchart of FIG. 32, firstly, the document to be classified is input (Step S3201).

Next, the language of the input document is analyzed (Step S3202), a document characteristic vector is created based on the result of the analysis, that is, based on the extracted words (Step S3203).

Thereafter, the process waits for a classification parameter to be specified, and when a classification parameter has been specified (YES in Step S3204), the document is classified in compliance with the specified classification parameter (Step S3205), and the result, that is, information relating to the clusters, is stored (Step S3206).

Next, the characteristics of the classified clusters are calculated (Step S3207), and the calculated results are displayed (Step 53208). It is determined whether any of the displayed clusters has been selected (Step S3209), and if not (NO in the Step S3209), processing shifts to the Step S3204 and waits once more for a classification parameter to be specified (Step S3204).

On the other hand, when it is determined in the Step 33209 that a cluster has been selected (YES in the Step S3209), a classification category for the selected cluster is created and stored (Step S3210). At this time information relating to clusters input by the operator can also be stored. Here, the processing series ends.

As described above, according to the document classification device of the second embodiment, an expression space conversion coefficient, for converting the documents to expression space capable of projecting the meaningful connections between the documents, is calculated based on the degree of similarity between documents in document clusters to be classified, and the documents are classified in the expression space. Consequently, the documents can be classified in a manner that reflects the intentions of the operator.

Therefore, clusters can be obtained from the classifier 3004, and in addition, the clusters can be structured and categorized based on their contents by the cluster characteristics calculator 3008 and the classification category memory 3009, using the degree of similarity of the clusters to the cluster center and the like.

Furthermore, it is possible to structure and categorize clusters closer to the intentions of the operator by using only the clusters selected by the cluster selection specifier 3010.

In addition to the second embodiment described above, a vector memory and a vector corrector may be added to the constitution as in the third embodiment described below.

Since the information processing system comprising the document classification device according to the third embodiment of the present invention is the same as the first embodiment shown in FIG. 1, further explanation will be omitted. Furthermore, since the hardware constitutions of the server 101 and the clients 102 are the same as the first embodiment shown in FIGS. 2 and 3, explanation thereof will be omitted.

Figure 33:
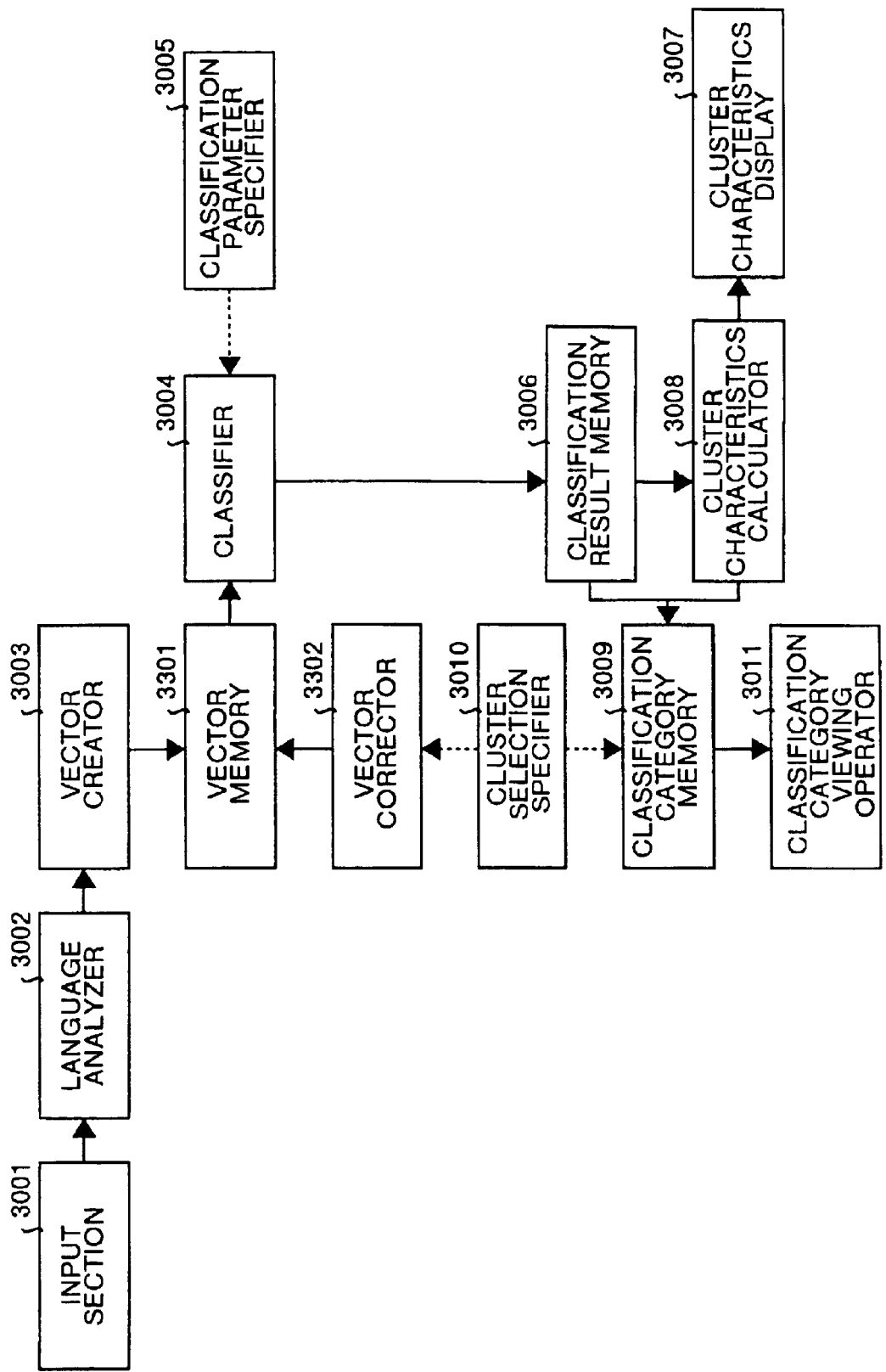
FIG. 33 is a block diagram functionally showing a constitution of a document classification device according to a third embodiment of the present invention.

Next, the functional constitution of a document classification device according to the third embodiment will be explained. FIG. 33 is a block diagram showing a functional constitution of the document classification device according to the third embodiment. In FIG. 33, like members to those in FIG. 30 of the second embodiment are represented by like reference symbols, and explanation thereof is omitted.

In the block diagram of FIG. 33, the document classification device comprises an input section 3001, a language analyzer 3002, a vector creator 3003, a classifier 3004, a classification parameter specifier 3005, a classification result memory 3006, a cluster characteristics display 3007, a cluster characteristics calculator 3008, a classification category memory 3009, a cluster selection specifier 3010, a classification category viewing operator 3011, a vector memory 3301, and a vector corrector 3302.

The vector memory 3301 stores document characteristic vectors created by the vector creator 3003. Furthermore, the vector corrector 3302 corrects document characteristic vectors, stored in the document characteristic vector memory 3301, by deleting document characteristic vectors of documents belonging to the portion of clusters selected by the cluster selection specifier 3010.

Furthermore, the classifier 3004 classifies the documents based on the document characteristic vectors corrected by the vector corrector 3302.

The vector memory 3301 and the vector corrector 3302 are controlled in accordance with commands from the CPU 201 and 301, and the like, in compliance with commands written in programs recorded in recording media such as a ROM 202 and 302, a RAM 203 and 303, or a disk device 306, and a hard disk 316.

The document characteristic vectors (row vectors) and word (word characteristics) vectors (line vectors) are created in the vector creator 3003, and stored in the vector memory 3301. This is in order to secure the document characteristic vectors to be used in subsequent classifications.

The vector corrector 3302 deletes all or some of the documents belonging to the clusters selected by the cluster selection specifier 3010, so that these documents are also deleted from subsequent classifications. The deleted document characteristic vectors are stored in the vector memory 3301.

As a result, of the vector data being stored in the vector memory 3301, the data to be used in subsequent classifications are those whose document (or a part thereof, as specified by the operator) row vectors belong to the selected clusters.

Figure 34:
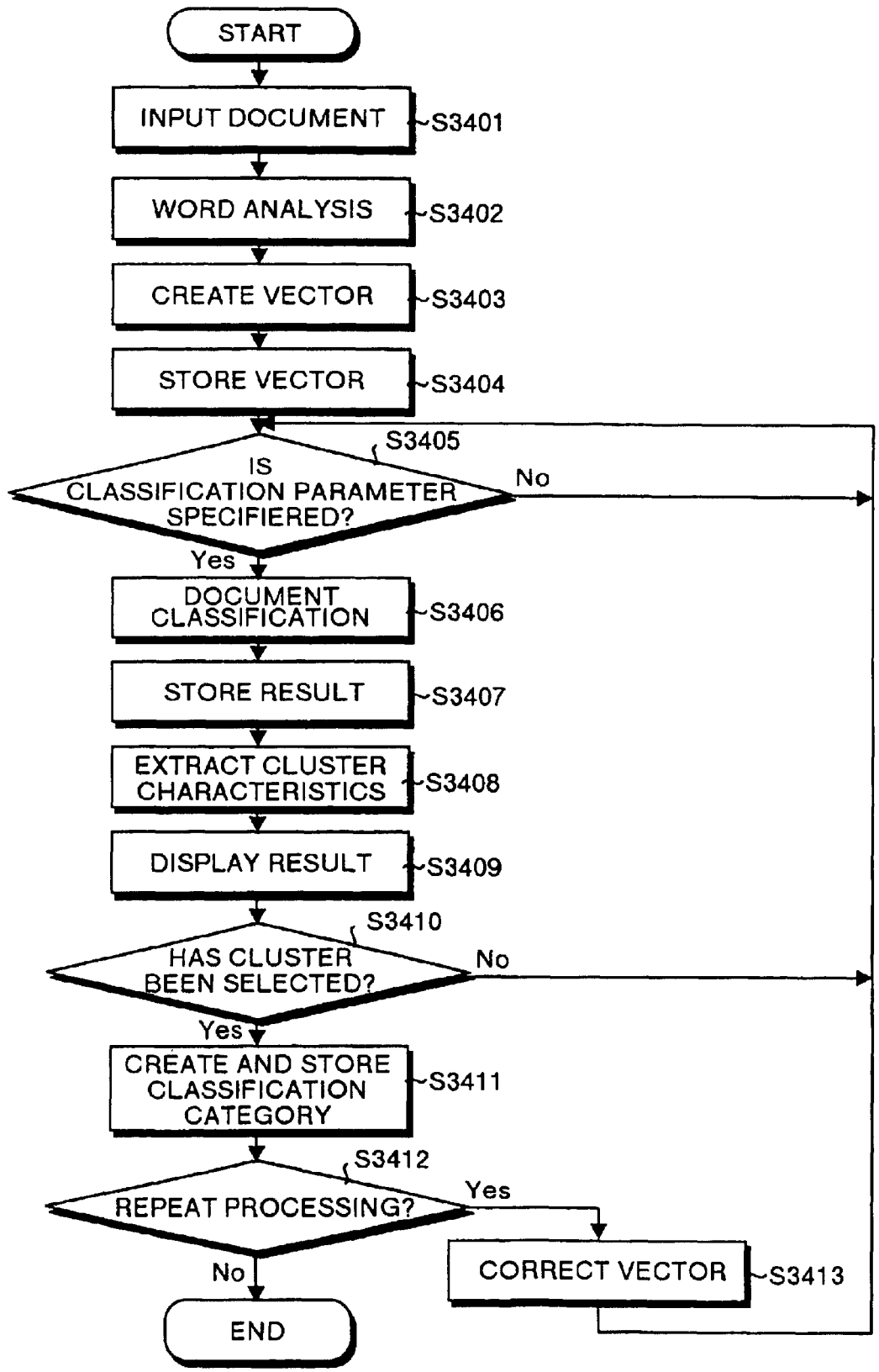
FIG. 34 is a flowchart showing a sequence of processing in a document classification device according to the third embodiment of the present invention.

Next, a processing sequence of the document classification device according to the third embodiment will be explained. FIG. 34 is a flowchart showing a processing sequence of the document classification device according to the third embodiment. In the flowchart of FIG. 34, firstly, the document to be classified is input (Step S3401).

Next, the language of the input document is analyzed (Step S3402), a document characteristic vector is created based on the result of the analysis, that is, based on the extracted words (Step S3403), and the created document characteristic vectors are stored (Step S3404).

Thereafter, the process waits for a classification parameter to be specified, and when a classification parameter has been specified (YES in Step S3405), the document is classified in compliance with the specified classification parameter (Step S3406), and the result, that is, information relating to the clusters, is stored (Step S3407).

Next, the characteristics of the classified clusters are calculated (Step S3408), and the calculated results are displayed (Step S3409). It is determined whether any of the displayed clusters has been selected (Step S3410), and if not (NO in the Step S3410), the processing shifts to the Step S3405 and waits once more for a classification parameter to be specified (Step S3405).

On the other hand, when it is determined in the Step S3410 that a cluster has been selected (YES in the Step S3410), a classification category for the selected cluster is created and stored (Step S3411). At this time information relating to clusters input by the operator can also be stored. Thereafter, it is determined whether a repeat of the processing has been specified (Step S3412).

In the Step S3412, when a repeat of the processing has been specified (YES in Step S3412), all or some of the documents belonging to the selected clusters are deleted by document characteristic vector correction (Step S3413). Thereafter, the processing shifts to the Step S3405, and all the processes from the Steps S3405 to S3413 are repeated.

On the other hand, in the Step S3412, when a repeat of the processing has not been specified (NO in the Step S3412), the processing series ends.

As described above, according to the document classification device of the third embodiment, the vector memory 3301 creates a new cluster in which the effects of clusters which are already known is removed.

In the third embodiment described above, a vector memory and a vector corrector are added to the constitution, but a document expression space corrector may be added instead of the vector corrector, as in a fourth embodiment described below.

Since the information processing system comprising the document classification device according to the fourth embodiment of the present invention is the same as the first embodiment shown in FIG. 1, further explanation will be omitted. Furthermore, since the hardware constitutions of the server 101 and the clients 102 are the same as the first embodiment shown in FIGS. 2 and 3, in order to avoid repetition, their explanation will be omitted.

Figure 35:
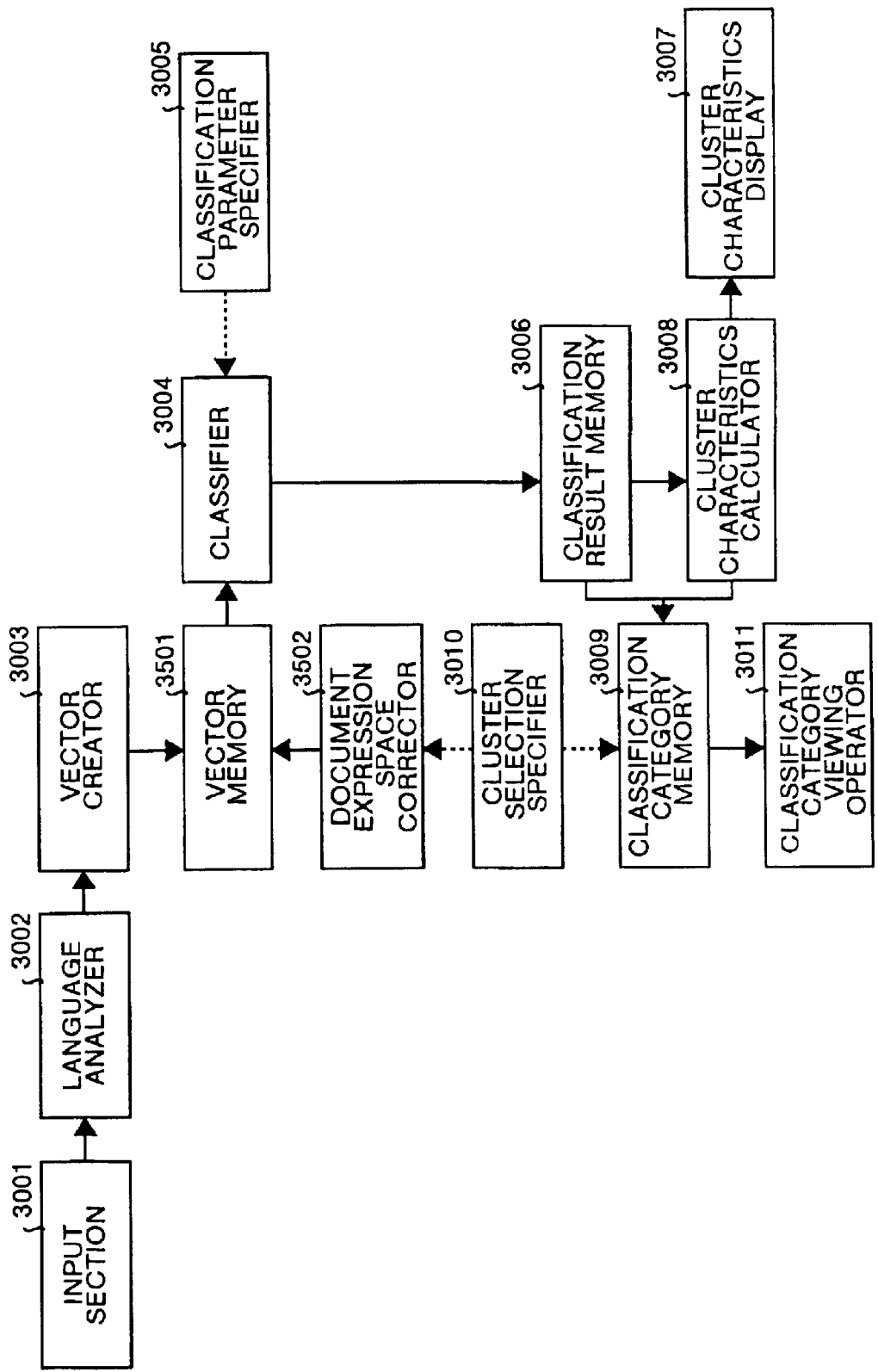
FIG. 35 is a block diagram functionally showing a constitution of a document classification device according to a fourth embodiment of the present invention.

Next, the functional constitution of a document classification device according to the fourth embodiment will be explained. FIG. 35 is a block diagram showing a functional constitution of the document classification device according to the fourth embodiment. In FIG. 35, like members to those in FIG. 30 of the-second embodiment are represented by like reference symbols, and explanation thereof is omitted.

In the block diagram of FIG. 35, the document classification device comprises an input section 3001, a language analyzer 3002, a vector creator 3003, a classifier 3004, a classification parameter specifier 3005, a classification result memory 3006, a cluster characteristics display 3007, a cluster characteristics calculator 3008, a classification category memory 3009, a cluster selection specifier 3010, a classification category viewing operator 3011, a vector memory 3501, and a document expression space corrector 3502.

The vector memory 3501 stores document characteristic vectors created by the vector creator 3003. Furthermore, the document expression space corrector 3502 corrects the document expression space, used when determining the degree of similarity between document characteristics vectors stored in the document characteristic vector memory 3501, based on an amount of characteristics calculated from the portion of clusters selected by the cluster selection specifier 3010.

Furthermore, the classifier 3004 classifies the documents using the document expression space corrected by the document expression space corrector 3502, based on the degree of similarity between the document characteristic vectors created by the vector creator 3003.

The vector memory 3501 and the document expression space corrector 3502 are controlled in accordance with commands from the CPU 201 and 301, and the like, in compliance with commands written in programs recorded in recording media such as a ROM 202 and 302, a RAM 203 and 303, or a disk device 306, and a hard disk 316.

Next, the contents of the document expression space corrector 3502 will be explained. In the vector corrector 3302 in the third embodiment, document characteristic vectors were deleted to eliminate the effects of clusters that were already known, but the multidimensional space in which the document characteristic vectors are expressed was not altered.

Therefore, when format characteristics of clusters selected by the operator in the previous classification are to be eliminated from the next classification, the space in which the document characteristic vectors are expressed must itself be altered.

The document expression space corrector 3502 is provided for this purpose, and corrects the document expression space. Here, as example where the characteristic dimensions of the document expression space is altered by deleting the characteristic dimension having a high degree of similarity with the center of a cluster selected by the operator.

Since the center of a cluster selected by the operator can be expressed as a vector, the degree of similarity between this cluster center vector and the characteristic dimensions of the document expression space stored in the vector memory 3501 is calculated, so as to identify the characteristic dimensions with a high degree of similarity.

The cosine, inner product, the Euclidean distance, the Mahalanobis distance, or the like, is used to measure the degree of similarity. Furthermore, characteristic dimensions with a high degree of similarity can be identified by threshold value processing, in which characteristic dimensions with a degree of similarity exceeding a certain degree of similarity are deleted, or fixed-number processing, in which a fixed number of characteristic dimensions with a high degree of similarity are deleted. Furthermore, discriminatory analysis or the like can be performed.

The document express space corrector 3502 deletes the characteristic dimensions after calculating those which are to be deleted. Deletion is carried out by deleting the line vectors of characteristic dimensions identified from a matrix of "characteristic dimensions (words)"×"documents" stored in the vector memory 3501. The document vectors corrected by the document express space corrector 3502 are stored in the vector memory 3501 to be used in subsequent classifications.

Figure 36:
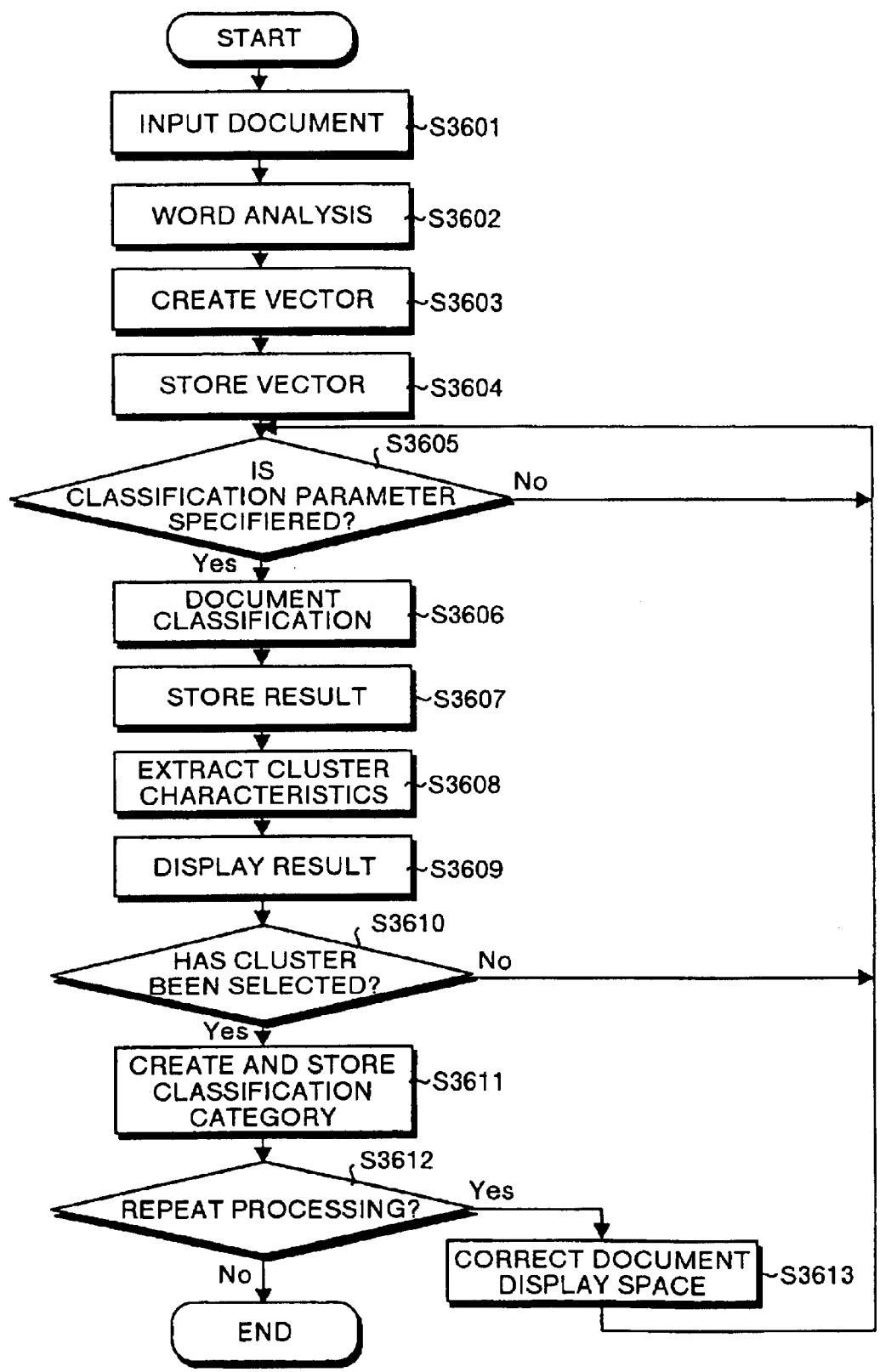
FIG. 36 is a flowchart showing a sequence of processing in a document classification device according to the fourth embodiment of the present invention.

Next, a processing sequence of the document classification device according to the fourth embodiment will be explained. FIG. 36 is a flowchart showing a processing sequence of the document classification device according to the fourth embodiment. In the flowchart of FIG. 36, firstly, the document to be classified is input (Step S3601).

Next, the language of the input document is analyzed (Step S3602), a document characteristic vector is created based on the result of the analysis, that is, based on the extracted words (Step S3603), and the created document characteristic vectors are stored (Step S3604).

Thereafter, the process waits for a classification parameter to be specified, and when a classification parameter has been specified (YES in Step S3605), the document is classified in compliance with the specified classification parameter (Step S3606), and the result, that is, information relating to the clusters, is stored (Step S3607).

Next, the characteristics of the classified clusters are calculated (Step S3608), and the calculated results are displayed (Step S3609). It is determined whether any of the displayed clusters has been selected (Step S3610), and if not (NO in the Step S3610), the processing shifts to the Step S3605 and waits once more for a classification parameter to be specified (Step S3605).

On the other hand, when it is determined in the Step S3610 that a cluster has been selected (YES in the Step S3610), a classification category for the selected cluster is created and stored (Step S3611). At this time, information relating to clusters input by the operator can also be stored. Thereafter, it is determined whether a repeat of the processing has been specified (Step S3612).

In the Step S3612, when a repeat of the processing has been specified (YES in Step S3612), the document expression space is corrected by deleting the line vectors of the characteristic dimensions identified from the matrix "characteristic dimensions (words)"×"documents" (Step S3613). Thereafter, the processing shifts to the Step S3605, and all the processes from the Steps S3605 to S3613 are repeated.

On the other hand, in the Step S3612, when a repeat of the processing has not been specified (NO in the Step S3612), the processing series ends.

As described above, according to the document classification device according to the fourth embodiment, format characteristics of a cluster selected by the operator in a previous classification can be deleted from subsequent classifications by the document express space corrector 3502, enabling a new cluster to be created in the deleted state.

In the third and fourth embodiments described above, either one of a vector corrector and a document express space corrector are added to the constitution, but both the vector corrector and the document expression space corrector may be added instead of the vector corrector, as in a fifth embodiment described below.

Since the information processing system comprising the document classification device according to the fifth embodiment of the present invention is the same as the first embodiment shown in FIG. 1, further explanation will be omitted. Furthermore, since the hardware constitutions of the server 101 and the clients 102 are the same as the first embodiment shown in FIGS. 2 and 3, in order to avoid repetition, their explanation will be omitted.

Figure 37:
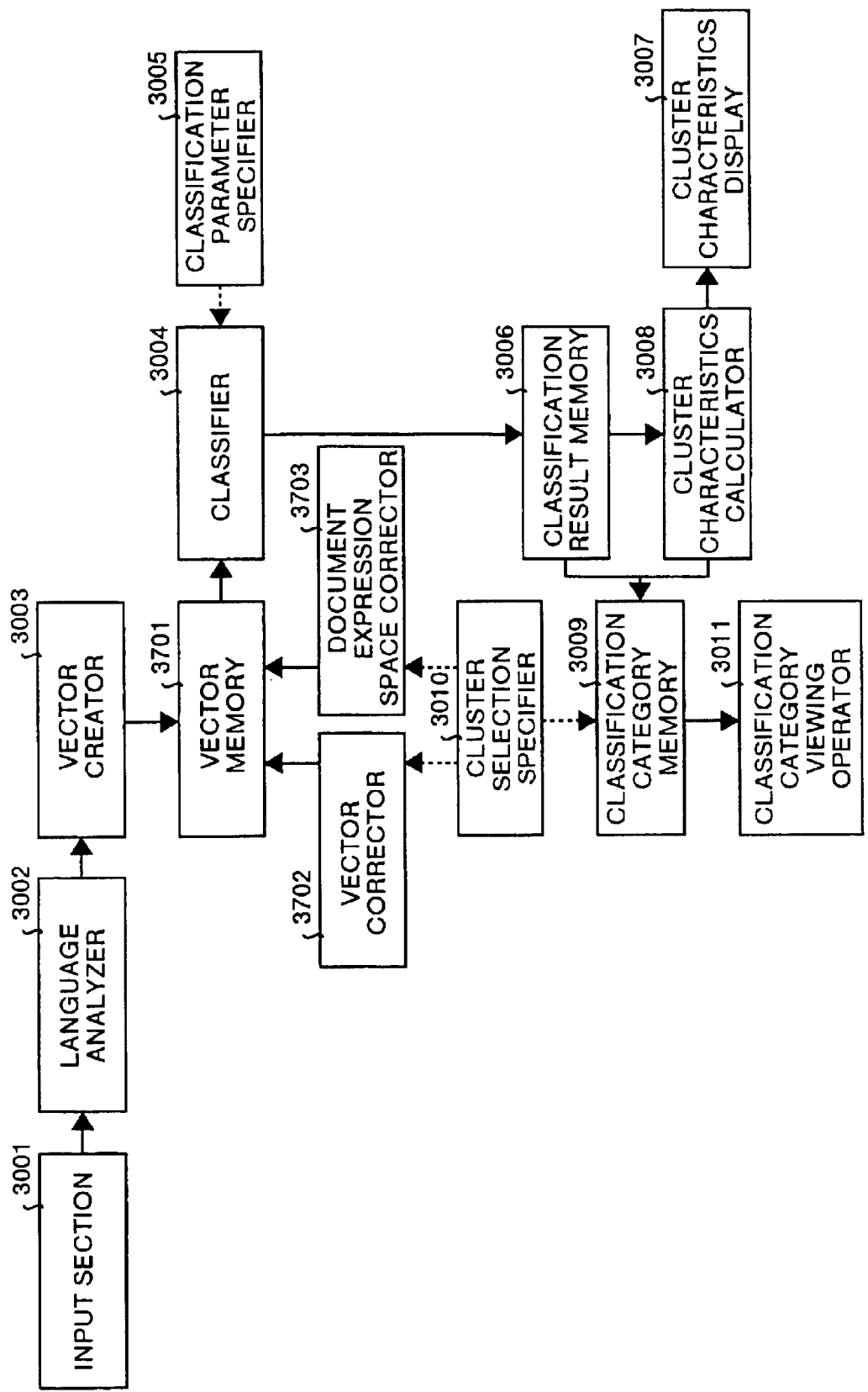
FIG. 37 is a block diagram functionally showing a constitution of a document classification device according to a fifth embodiment of the present invention.

Next, the functional constitution of a document classification device according to the fifth embodiment will be explained. FIG. 37 is a block diagram showing a functional constitution of the document classification device according to the fifth embodiment. In FIG. 37, like members to those in FIG. 30 of the second embodiment are represented by like reference symbols, and explanation thereof is omitted.

In the block diagram of FIG. 37, the document classification device comprises an input section 3001, a language analyzer 3002, a vector creator 3003, a classifier 3004, a classification parameter specifier 3005, a classification result memory 3006, a cluster characteristics display 3007, a cluster characteristics calculator 3008, a classification category memory 3009, a cluster selection specifier 3010, a classification category viewing operator 3011, a vector memory 3701, a vector corrector 3702, and a document expression space corrector 3703.

The vector memory 3701 stores document characteristic vectors created by the vector creator 3003. Furthermore, the vector corrector 3702 corrects the document characteristic vectors, stored in the document characteristic vector memory 3301, by deleting document characteristic vectors of documents belonging to the portion of clusters created by the classifier 3004.

Furthermore, the document expression space corrector 3703 corrects the document expression space, used when determining the degree of similarity between document characteristics vectors stored in the document characteristic vector memory 3701, based on the characteristics of clusters selected by the cluster selection specifier 3010.

Furthermore, the classifier 3004 classifies the documents based on the degree of similarity between document characteristic vectors corrected by the vector corrector 3702, using the document expression space corrected by the document expression space corrector 3703.

The vector memory 3701, the vector corrector 3702, and the document expression space corrector 3703 are controlled in accordance with commands from the CPU 201 aid 301, and the like, in compliance with commands written in programs recorded in recording media such as a ROM 202 and 302, a RAM 203 and 303, or a disk device 306, and a hard disk 316.

Next, the contents of the vector corrector 3702 and the document expression space corrector 3703 will be explained. In the fourth embodiment, documents belonging to a selected cluster are used in subsequent classifications.

In the fifth embodiment, since the vector corrector 3702 and the document expression space corrector 3703 are both provided, documents belonging to selected clusters are deleted from subsequent classifications, and are not classified in subsequent classifications.

In the fourth embodiment, the aspect of topic extraction is emphasized, and it is assumed that a given document can be classified under multiple topics. For example, in an investigation into networking, the following answer is given: "The end user enquires about how to install the software, and so cannot work as a system manager.". This can be classified under the topic of "difficulties relating to understanding the software operation", but can also be classified under the topic of "busy nature of system manager work".

The fourth embodiment addresses the need to be able to extract both the cluster "difficulties relating to understanding the software operation" and the cluster "busy nature of system manager work".

Conversely, since the operator already knows topics which have been extracted once, there will be cases when he or she desires a different result from the next classification. The fifth embodiment addresses this requirement by providing the vector corrector 3702, thereby ensuring that all or part of documents belonging to clusters selected in the nth classification are deleted from subsequent classifications.

Documents belonging to clusters which have been specified for selection by the cluster selection specifier 3010 are stored in row vector format in the vector memory 3701. Therefore, document clusters for subsequent classification are created by deleting these row vectors using the vector corrector 3702.

Moreover, as in the fourth embodiment, in accordance with the selected clusters, the document expression space corrector 3703 deletes the characteristic dimension from the matrix stored in the vector memory 3701.

Figure 38:
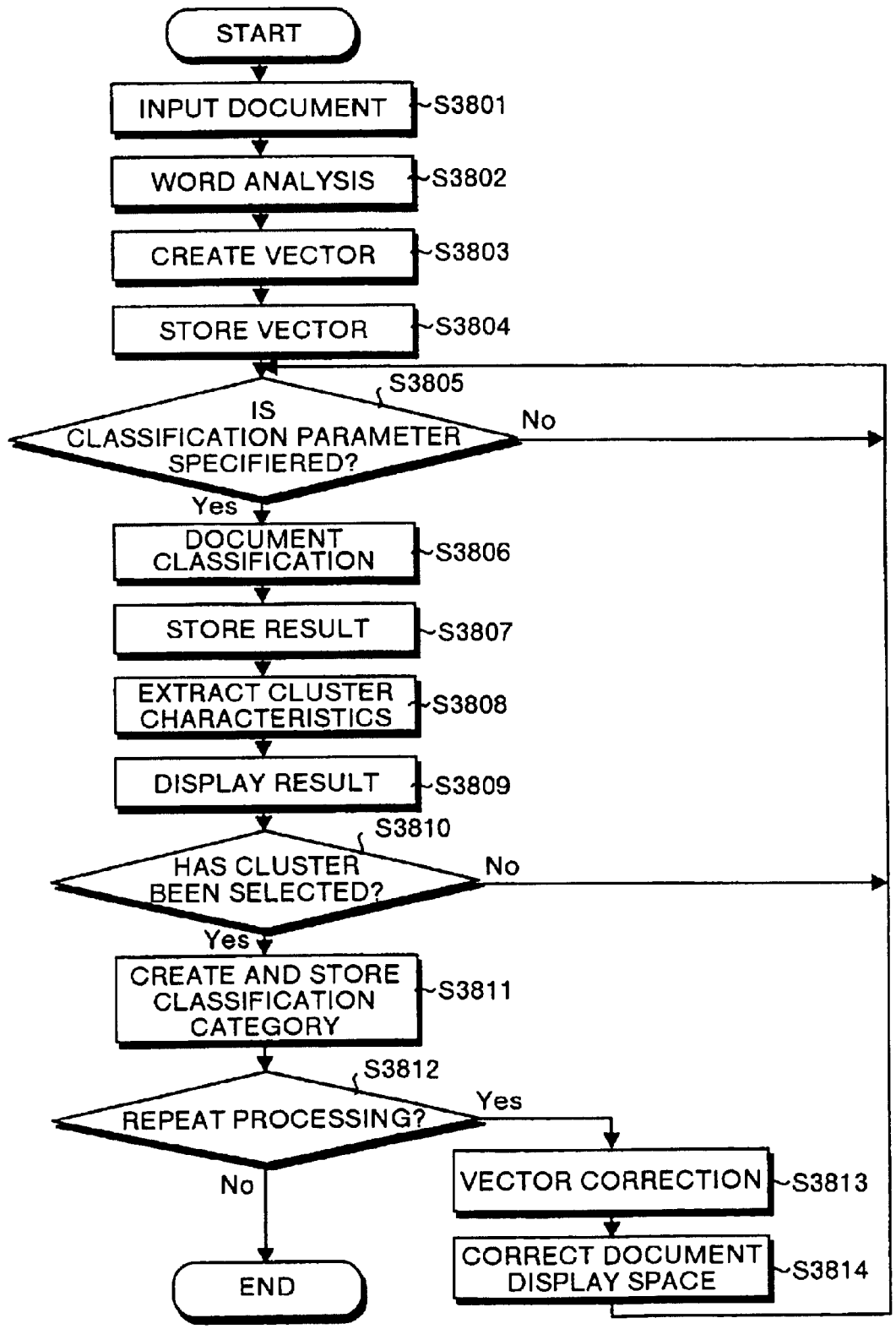
FIG. 38 is a flowchart showing a sequence of processing in a document classification device according to the fifth embodiment of the present invention.

Next, a processing sequence of the document classification device according to the fifth embodiment will be explained. FIG. 38 is a flowchart showing a processing sequence of the document classification device according to the fifth embodiment. In the flowchart of FIG. 38, firstly, the document to be classified is input (Step S3801).

Next, the language of the input document is analyzed (Step S3802), a document characteristic vector is created based on the result of the analysis, that is, based on the extracted words (Step S3803), and the created document characteristic vector is stored (Step S3804).

Thereafter, the process waits for a classification parameter to be specified, and when a classification parameter has been specified (YES in Step S3805), the document is classified in compliance with the specified classification parameter (Step S3806), and the result, that is, information relating to the clusters, is stored (Step S3807).

Next, the characteristics of the classified clusters are calculated (Step S3808), and the calculated results are displayed (Step S3809). It is determined whether any of the displayed clusters has been selected (Step S3810), and if not (NO in the Step S3810), the processing shifts to the Step S3805 and waits once more for a classification parameter to be specified (Step S3805).

On the other hand, when it is determined in the Step S3810 that a cluster has been selected (YES in the Step S3810), a classification category for the selected cluster is created and stored (Step S3811). At this time, information relating to clusters input by the operator can also be stored. Thereafter, it is determined whether a repeat of the processing has been specified (Step S3812).

In the Step S3812, when a repeat of the processing has been specified (YES in Step S3812), all or some of the documents belonging to the selected clusters are deleted by document characteristic vector correction (Step S3813).

Following the Step S3813, the document expression space is corrected by deleting the line vectors of the characteristic dimensions identified from the matrix "characteristic dimensions (words)"ב"document" (Step S3814). Thereafter, the processing shifts to the Step S3805, and all the processes from the Steps S3805 to S3814 are repeated.

On the other hand, in the Step S3812, when a repeat of the processing has not been specified (NO in the Step S3812), the processing series ends.

As described above, according to the document classification device of the fifth embodiment, the vector corrector 3702 eliminates the effects of clusters which are already known, and in addition, the document expression space corrector 3703 eliminates the format characteristics of a cluster selected by the operator in a previous classification from subsequent classifications, thereby enabling a new cluster to be created in the deleted state.

In the second and fourth embodiments described above, when classification was repeatedly carried out, no consideration was given to information relating to how many times a document was selected, but when the constitution comprises a selection information appender, as in a sixth embodiment described below, selection information can be displayed together with cluster characteristics.

Since the information processing system comprising the document classification device according to the sixth embodiment of the present invention is the same as the first embodiment shown in FIG. 1, further explanation will be omitted. Furthermore, since the hardware constitutions of the server 101 and the clients 102 are the same as the first embodiment shown in FIGS. 2 and 3, in order to avoid repetition, their explanation will be omitted.

Figure 39:
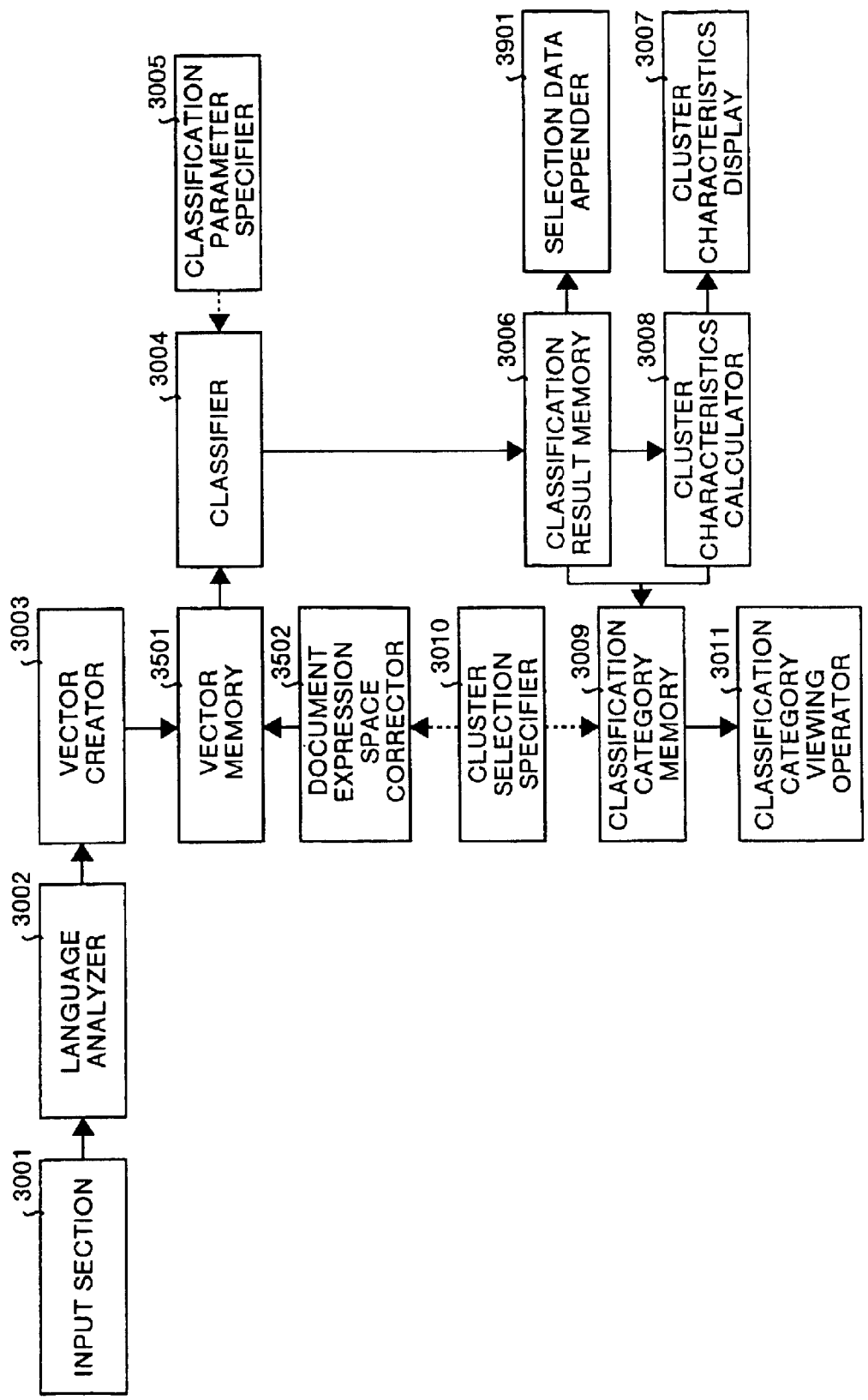
FIG. 39 is a block diagram functionally showing a constitution of a document classification device according to a sixth embodiment of the present invention.

Next, the functional constitution of a document classification device according to the sixth embodiment will be explained. FIG. 39 is a block diagram showing a functional constitution of the document classification device according to the sixth embodiment. In FIG. 39, like members to those in FIG. 35 of the fourth embodiment are represented by like reference symbols, and explanation thereof is omitted.

In the block diagram of FIG. 39, the document classification device comprises an input section 3001, a language analyzer 3002, a vector creator 3003, a classifier 3004, a classification parameter specifier 3005, a classification result memory 3006, a cluster characteristics display 3007, a cluster characteristics calculator 3008, a classification category memory 3009, a cluster selection specifier 3010, a classification category viewing operator 3011, a vector memory 3501, a document expression space corrector 3502, and a selection information appender 3901.

When all or some documents belonging to a cluster portion of documents created by the classifier 3004 have been selected, the selection information appender 3901 appends selection information showing that the documents have been selected. Furthermore, the cluster characteristics display 3007 displays the cluster characteristics, and the selection information appended by the selection information appender 3901.

The selection information appender 3901 are controlled in accordance with commands from the CPU 201 and 301, and the like, in compliance with commands written in programs recorded in recording media such as a ROM 202 and 302, a RAM 203 and 303, or a disk device 306, and a hard disk 316.

Next, the detailed contents of the selection information appender 3901 will be explained. In a questionnaire, experience has taught that unique and highly opinionated answers are extremely important. This is because many answers could not have been anticipated by the person who planned the questionnaire.

Accordingly, in a case where documents belonging to a cluster selected by the operator are used in subsequent classifications, it is possible to improve the ability to identify documents used on multiple occasions, and also the ability to identify documents which have not been selected at all, by showing how many times the documents have been selected when the cluster characteristics display 3007 displays the individual documents.

FIG. 40 is a diagram explaining a table 4000 provided in the classification result memory 3006 of the document classification device according to the sixth embodiment. In FIG. 40, table contents are listed for each document ID, and the table 4000 shows in which cycle each document was selected by the operator during classification. That is, when a document has been selected, selection information of "1" is entered, and when a document has not been selected, selection information of "0" is entered.

For example, when a document has been selected four times, the table 4000 shows that document ID "1" was selected by the operator in the first and second classifications, but was not selected in the third and fourth classifications. On the other hand, document ID "2" has not once been selected yet, indicating that it is an opinion unknown to the operator.

Based on such information, when the cluster characteristics display 3007 displays the documents to the operator, the display may for example be altered in accordance with the number of times the documents have been selected. For example, visual characteristics such as the color of the letters, the density of the background, and the color intensity may conceivably be altered.

Furthermore, the number of selections can be directly displayed by numerical symbols, graphs, or the like. In any case, as long as it is possible to visually identify selected documents and unselected documents, the constitution is not limited to that described above.

Furthermore, the selection information may be viewed using the classification category viewing operator 3011.

Figure 41:
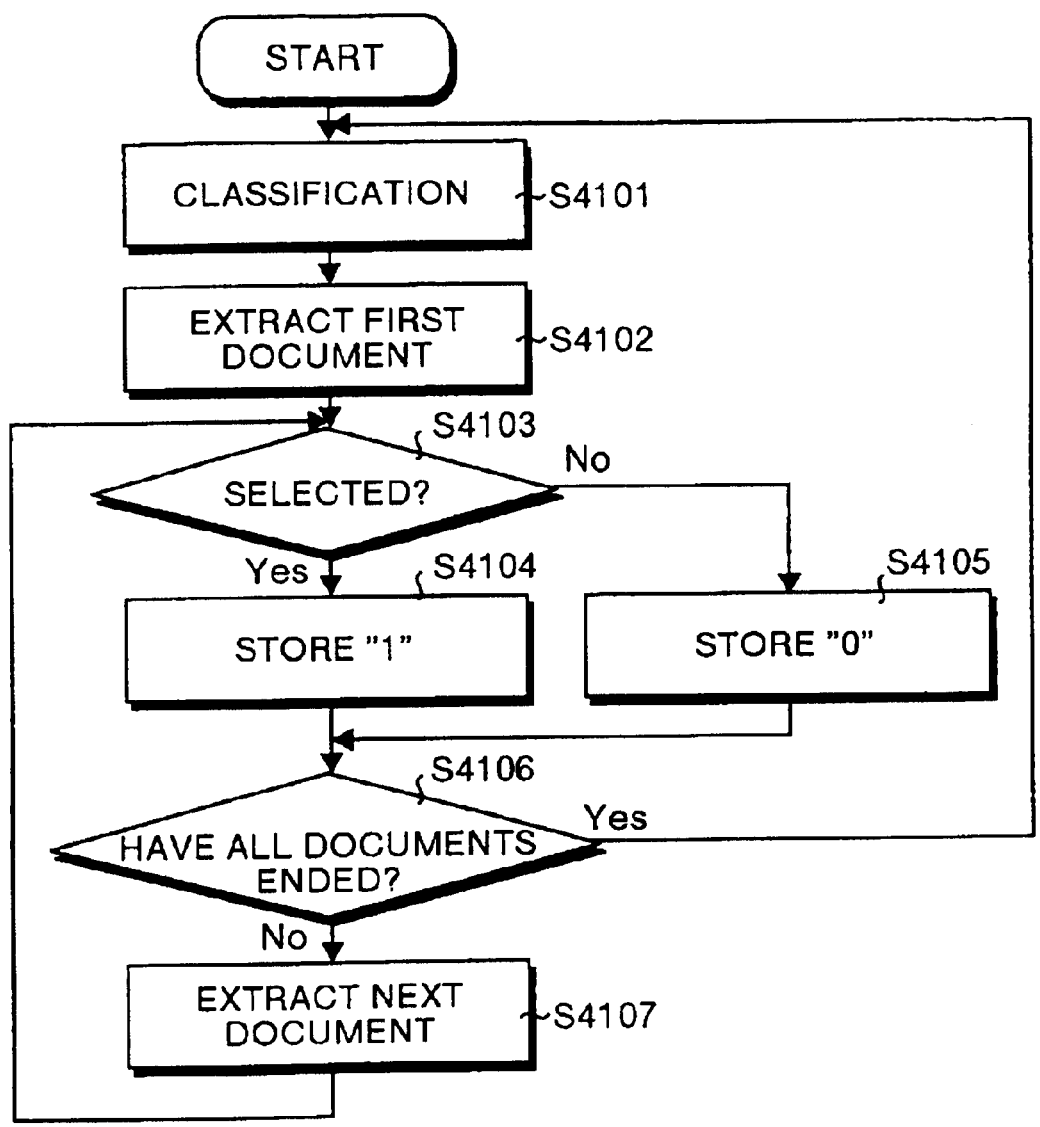
FIG. 41 is a flowchart showing a processing sequence of a selection information append section of a document classification device according to the sixth embodiment of the present invention.

Next, the processing performed by the selection information appender 3901 will be explained. FIG. 41 is a flowchart showing a processing sequence of the selection information appender 3901 of the document classification device according to the sixth embodiment. In the flowchart of FIG. 41, firstly, classification is carried out (Step S4101), and then, the first document is extracted (Step S4102).

It is determined whether the extracted document has been selected for classification in the Step S4101 (Step S4103). Here, when the document has been selected (YES in the Step S4103), data "1" is stored as the selection information (Step S4104) On the other hand, when the document has not been selected (NO in the Step S4103), data "0" is stored as the selection information (Step S4105).

Next, it is determined whether or not the processing of the document has ended (Step S4106). Here, when all of the documents have not been processed (NO in the Step S4106), the next document is extracted (Step S4107), the processing shifts to the Step S4103, and the Steps S4103 to S4107 are repeated.

On the other hand, in the Step S4106, when all the documents have been processed (YES in the Step S4106), the processing shifts to the Step S4101, and classification is performed again (Step S4101). In this way, the number of times that the processing between the Steps S4101 to S4107 is repeated is equal to the number of classifications.

As explained above, according to the sixth embodiment, the selection information appender 3901 appends selected information, which is displayed by the cluster characteristics display 3007, and consequently, it is possible to improve the ability to identify documents used on multiple occasions, and also the ability to identify documents which have not been selected at all.

The document classification method described in the second to fifth embodiments is realized by running a predetermined program on a computer, such as a personal computer or a work station. The program is recorded on a computer-readable recording medium such as a hard disk, a floppy disk, a CD-ROM, an MO, or a DVD, and is executed by reading out the program from the recording medium using the computer. Furthermore, the program can be distributed via the recording medium, or by using a network such as the Internet as a transmission medium.

Next, an information classification device according to the seventh to sixteenth embodiments will be explained. In the present embodiment of the present invention, when one or more collections of sentences written in a natural language is/are to be classified, this will be termed a document. By way of a more specific example, patent laid-open publications classified by IPC classification, or newspaper articles classified into specific fields such as politics, economics, culture, science and technology, and the like, are documents. When claims and specific sentences are extracted therefrom, these are regarded either as sentences under the classification of "claims", or, in the case of specific sentences which can be classified according to intended usage, these are regarded as documents. There follows a detailed description of the seventh to sixteenth embodiments of the present invention based on the drawings.

Figure 42:
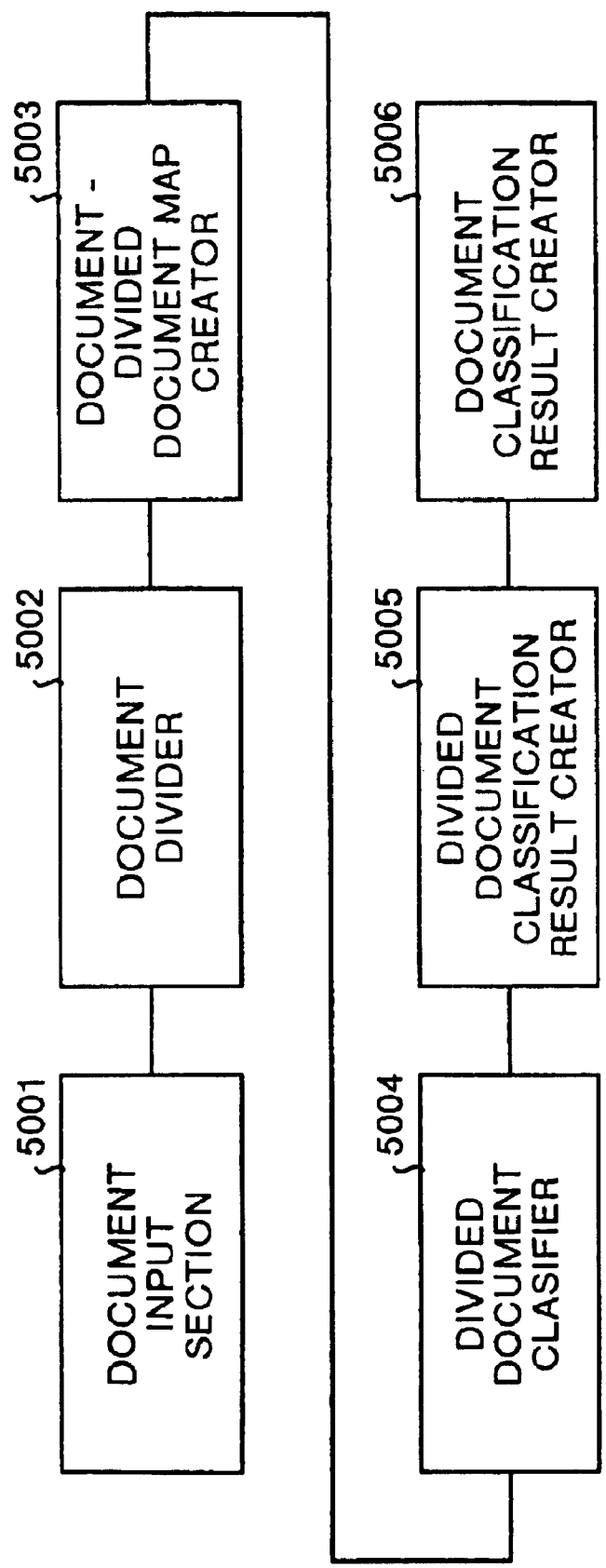
FIG. 42 is a block diagram showing a constitution of a document classification device according to a seventh embodiment of the present invention.

FIG. 42 is a block diagram showing a constitution of a document classification device according to the seventh embodiment of the present invention. As shown in FIG. 42, the document classification device of the seventh embodiment comprises a document input section (document input means) 5001 for inputting document data groups, a document divider (document dividing means) 5002 for dividing document data into one or multiple divided document data based on a predetermined reference, a document-divided document map creator (document-divided document map creation means) 5003 for creating a map showing the correspondence between the document data and the divided document data, a divided document classifier (divided document classifying means) 5004 for classifying the divided document data, that is, the divided document, a divided document classification result creator (divided document classification result creation means) 5005 for creating divided document classification result information, a document classification result creator (document classification result creation means) 5006 for creating classification result information of the above document data using the document-divided document map and the divided document classification result information, etc.

The document divider 5002, the document-divided document map creator 5003, the divided document classifier 5004, the divided document classification result creator 5005, and the document classification result creator 5006 have a shared or independent memory for storing programs and a CPU, which operates in compliance with the programs.

Next, the document classification device and the document classification method of the seventh embodiment will be explained in detail in accordance with FIG. 42 and the like. Firstly, the document input section 5001 inputs a group of documents. The document input section 5001 comprises a keyboard, an OCR device, a detachable recording medium, or network communications means, and the documents are input via any one of these.

Then, document divider 5002 extracts the document data, divides them based on a predetermined reference, and creates one or multiple divided document data from one document data. The document data is divided using a method specified by the user, such as using information relating to the structure of the documents, or information relating to the constituents of the documents. The method used will not be considered here.

Figure 43:
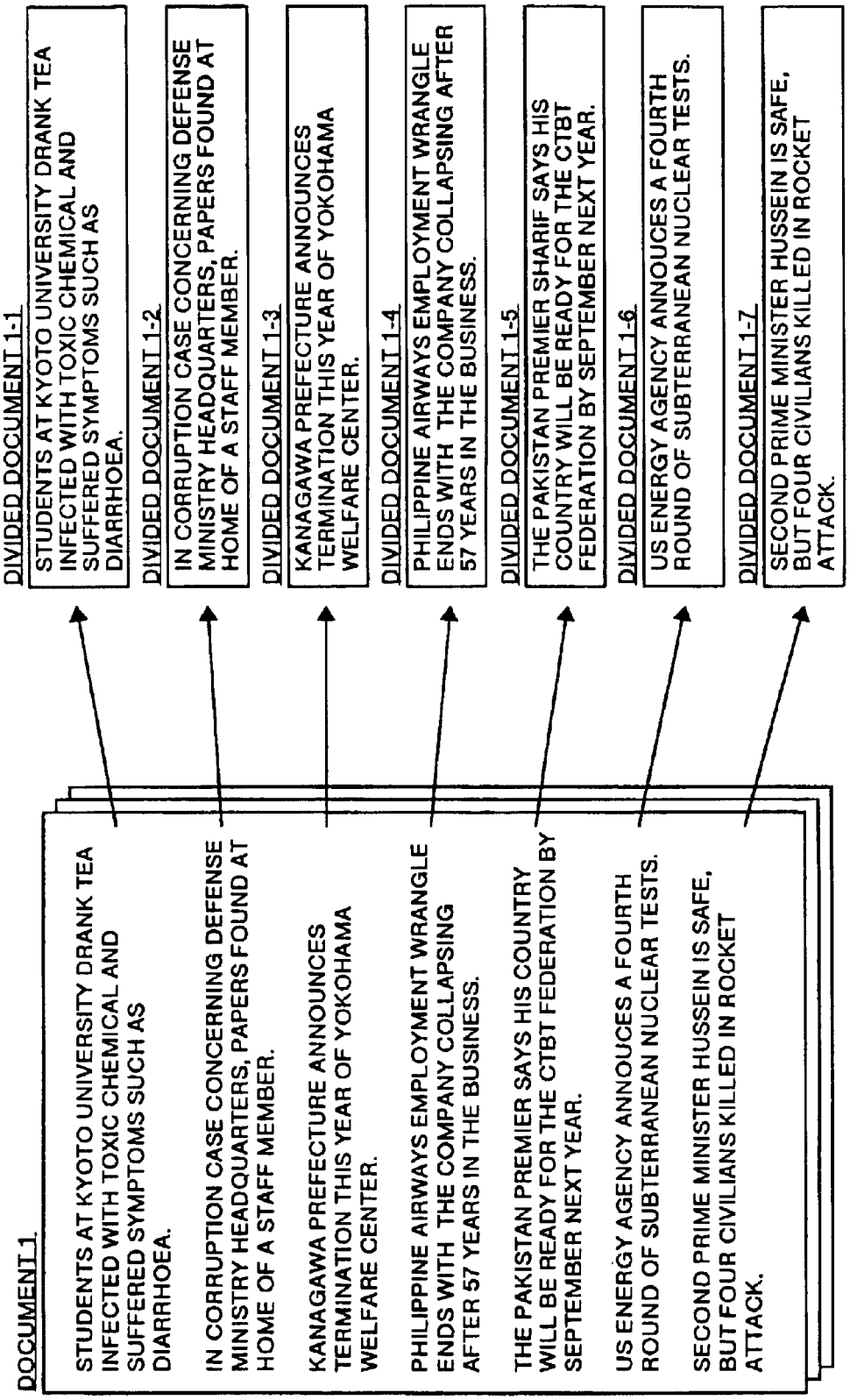
FIG. 43 is a diagram explaining a document classification device and a document classification method according to the seventh embodiment of the present invention.

FIG. 43 shows an example of creating multiple divided document data from document data using the document classification device and document classification method of the present invention. In this example, a document 1 comprises multiple news topics, and each one-minute topic forms one document unit. As shown in FIG. 43, the news topics are separated by two line-break codes. The document 1, comprising one document, is divided using this stipulation to create seven divided document data of divided documents 1-1 to 1-7, each comprising a separate topic. It is also possible to include the document 1 in its state prior to division in the data, but this is not done here.

When the document has been divided, the document-divided document map creator 5003 creates a map showing the document data prior to division in correspondence with the divided document data created from the document data. For example, the document-divided document map creator 5003 creates a map comprising identifiers uniquely representing individual document data, and identifiers uniquely representing individual divided document data, or a map comprising identifiers uniquely representing divided document data for each document data. The method for arranging the document data and divided document data in mutual correspondence will not be considered here.

FIG. 44 shows an example of creating a document-divided document map. In FIG. 44, the documents 1 to 3 represent document data, and the divided documents 1 to 12 represent divided document data. As shown in the diagram, identification numbers (identifiers) for uniquely identifying the document data and the divided document data are appended. Then, as shown in the bottom left portion of FIG. 44, the identification numbers of the document data and the identification numbers of the divided document data are listed in mutual correspondence in table format. When multiple divided document data can be regarded as identical with regard to the reference used for the document classification, identical identification numbers may be appended thereto.

Thereafter, the divided document classifier 5004. classifies the divided documents. The divided documents can be classified by, for example, language-analyzing the individual divided documents, counting the incidence of words contained therein, determining a characteristics vectors quantitatively showing the characteristics of the documents based on the result of the language analysis, and then using a method such as square contingency, discriminatory analysis, or cluster analysis.

Next, the divided document classification result creator 5005 creates divided document classification result information based on the result of the divided document classification (see FIG. 45). Here, the divided document classification result information comprises, for example, (a) information relating to categories to which the divided data belong (e.g. information of the items "classification category" and "representative value and distance of categories to which the documents belong" in the table of "Results of classifying divided document data into three categories" shown in FIG. 45), (b) information relating to individually created categories (e.g. information of the items "representative value" and "number of data belonging to category (number of divided document)" in the table of "Information Relating to Classification Categories" shown in FIG. 45), (c) information between created categories (e.g. information in the table of "Distance between Classification Categories" in Table 4), (d) and such like. The user can also use the various information mentioned above as basic data for analyzing the classification result.

FIG. 45 shows an example of creating a classification result in a case where twelve divided document data are classified into three categories using their quantitative characteristics vectors. The quantitative three-dimensional vectors of the divided document data (the number of components of the vector is the number of all the types of words originating in the classified document cluster, but here, the vectors are linearly converted to three-dimensional vectors in which several words have been deleted) can be classified into three categories by utilizing a cluster analysis method such as, for example, Ward's method.

That is, each of the divided document data belongs to one of the three categories shown in the diagram. The representative value of each category to which the divided document data belong is an average value of the characteristics vector of the divided document data which belong to the category (the center of the divided document data which belong to the category).

Furthermore, the distance (corresponding to the degree of similarity) to the representative value of the category to which the data belongs can be determined (for example, in the case of the divided document 3 in FIG. 45) using the value of divided document 3 in the divided document data characteristics vector item, and the value of the item of the representative value (center of the divided document category) of the category 2, which is the classification category for the divided document 3, in the following equation.

$$((3.00-2.66)^2+(2.00-2.00)^2(4.00-3.66)^2)^{1/2}=0.48$$

Hence, the smaller the distance to the representative value of the category to which the divided document belongs, the higher the degree of similarity with the average divided document belonging to that category.

In addition to the statistics shown in FIG. 45, various statistics can be created, such as dispersion within or between categories, the range of the degree of similarity in each category, etc.

Then, the document classification result creator 5006 uses the document-divided document map and the divided document classification result information to create classification result information of the document data, such as that shown in FIG. 46, for example. As shown in the example of FIG. 46, for each category, classification result information such as divided document data belong to each category, the degree of similarity thereof (distance to the representative value of the category to which the data belongs), the pre-division document data to which the divided document data belongs (document to which data belongs), the area occupied by the document (the share of the category occupied by the divided document data), the relative position of the divided document data in the document (order), and the degree of similarity ranking of the divided document data within the category to which it belongs, are created.

In the above example, document to which data belongs is obtained from the document-divided document map, and other classification result information is obtained from the divided document classification result information. In addition to the information shown in FIG. 46, the document classification result creator 5006 can use various statistics, such as the dispersion of the data within categories, and the deviation value of the divided document data within the category to which it belongs, and the contents of the document data and the divided document data, and the like, as the classification result information.

Furthermore, in the example described above, all the results are expressed in table format as units of divided document data, but the classification categories and document data can also be expressed units. Furthermore, the classification result information need not only be expressed in text format, but can also be expression graphically, making it more comprehensible to the user.

Thus, according to the present invention, one document is divided, the divided document is classified, and the relationship between the document prior to division and the divided document is displayed to the user. Furthermore, the classification result of the divided document is displayed to the user. Therefore, when one document contains multiple topics and meanings, the document is not classified into categories limited to specific topics and meanings, or classified into categories different from those desired by the user, making the classification categories more easily comprehensible to the user. Furthermore, since the position of the divided document in the document prior to division (the document to which the divided document belongs) is displayed, the user can efficiently read the part of the document cluster that he or she wants to read.

Figure 47:
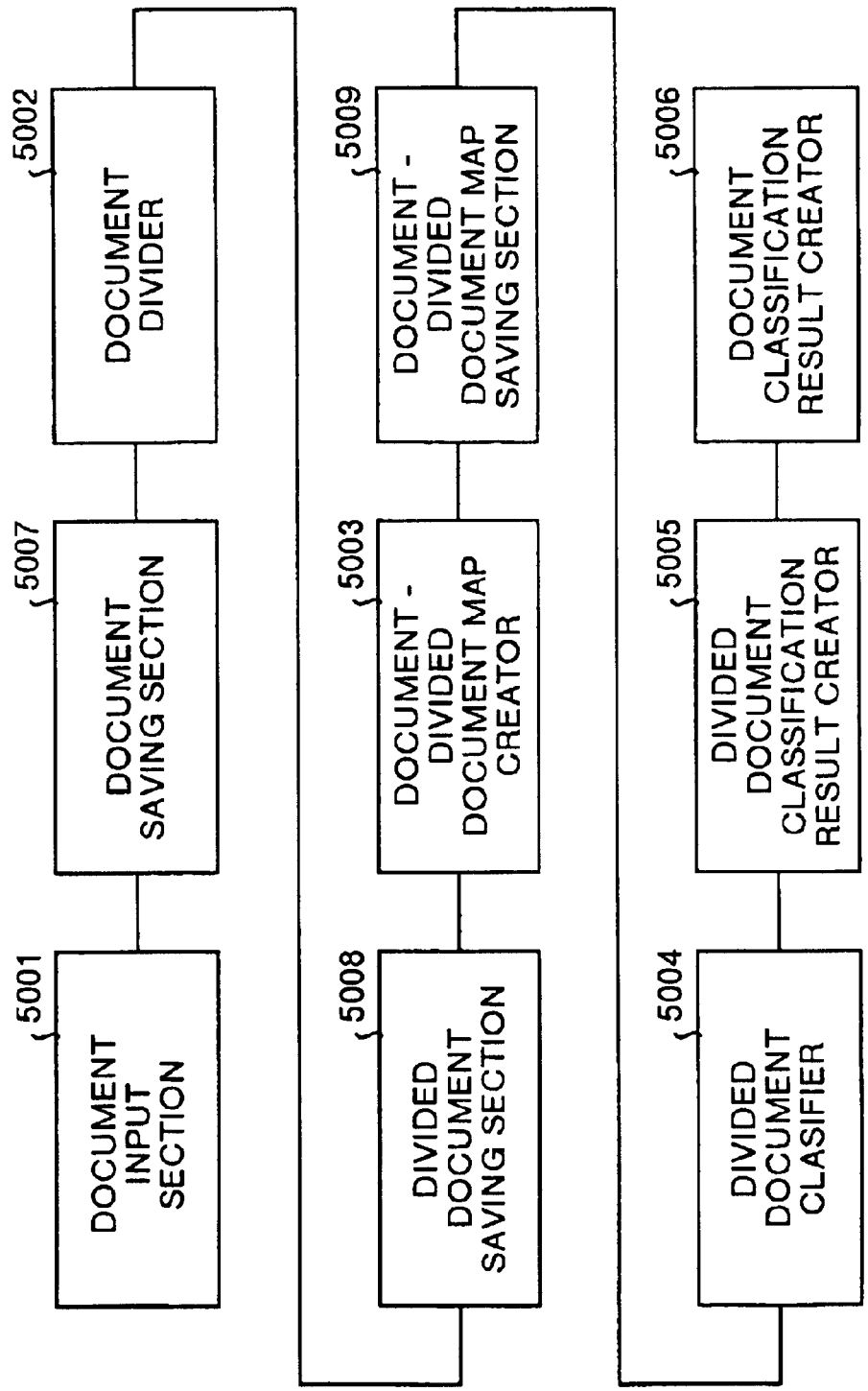
FIG. 47 is a block diagram showing a constitution of a document classification device according to an eighth embodiment of the present invention.

FIG. 47 is a block diagram showing a constitution of the document classification device according to an eighth embodiment of the present invention. As shown in FIG. 47, in addition to the constitution shown in the seventh embodiment of FIG. 42, the document classification device according to the eighth embodiment are added (a) a document saving section (document saving means) 5007 for saving document data, (b) a divided document saving section (divided document saving means) 5008 for saving divided document data, and (c) a document-divided document map saving section (document-divided document map saving means) 5009 for saving a document-divided document map created by the document-divided document map creator 5003. The saving sections for example comprise shared hard disks, semiconductor memories, or the like.

With the constitution described above, the document saving section 5007 of the present embodiment saves information accompanying the document, such as the contents of the document, the author of the document, the date of authorship, the date of last correction, in an appropriate format. Furthermore, when the document has a quantitative characteristics vector comprising elements of the document, in addition to the document contents, these are also saved in the document saving section 5007. When identifiers uniquely expressing the individual document data are appended in the document input section 5001, the document saving section 5007 also saves these identifiers in an appropriate format.

Furthermore, the divided document saving section 5008 the contents of the divided document data created by the document divider 5002 in an appropriate format, and in addition, saves quantitative characteristics vectors. When identifiers uniquely expressing the individual document data are appended, the divided document saving section 5008 also saves the identifiers in an appropriate format.

Furthermore, the document-divided document map saving section 5009 saves document-divided document maps created by the document-divided document map creator 5003 in an appropriate format.

According to the eighth embodiment, since document data, divided document data, and document-divided document maps are saved in this way, for a single document it is possible to efficiently determine classification results having different parameters such as the number of classifications, the classification method, and the settings used in the classifications, without recreating the divided document data and the document-divided document map. Furthermore, by classifying the document data and saving the data needed to create the classification result, the user is free to take more time over the classification, and to re-analyze previously classified documents within a given period of time.

Figure 48:
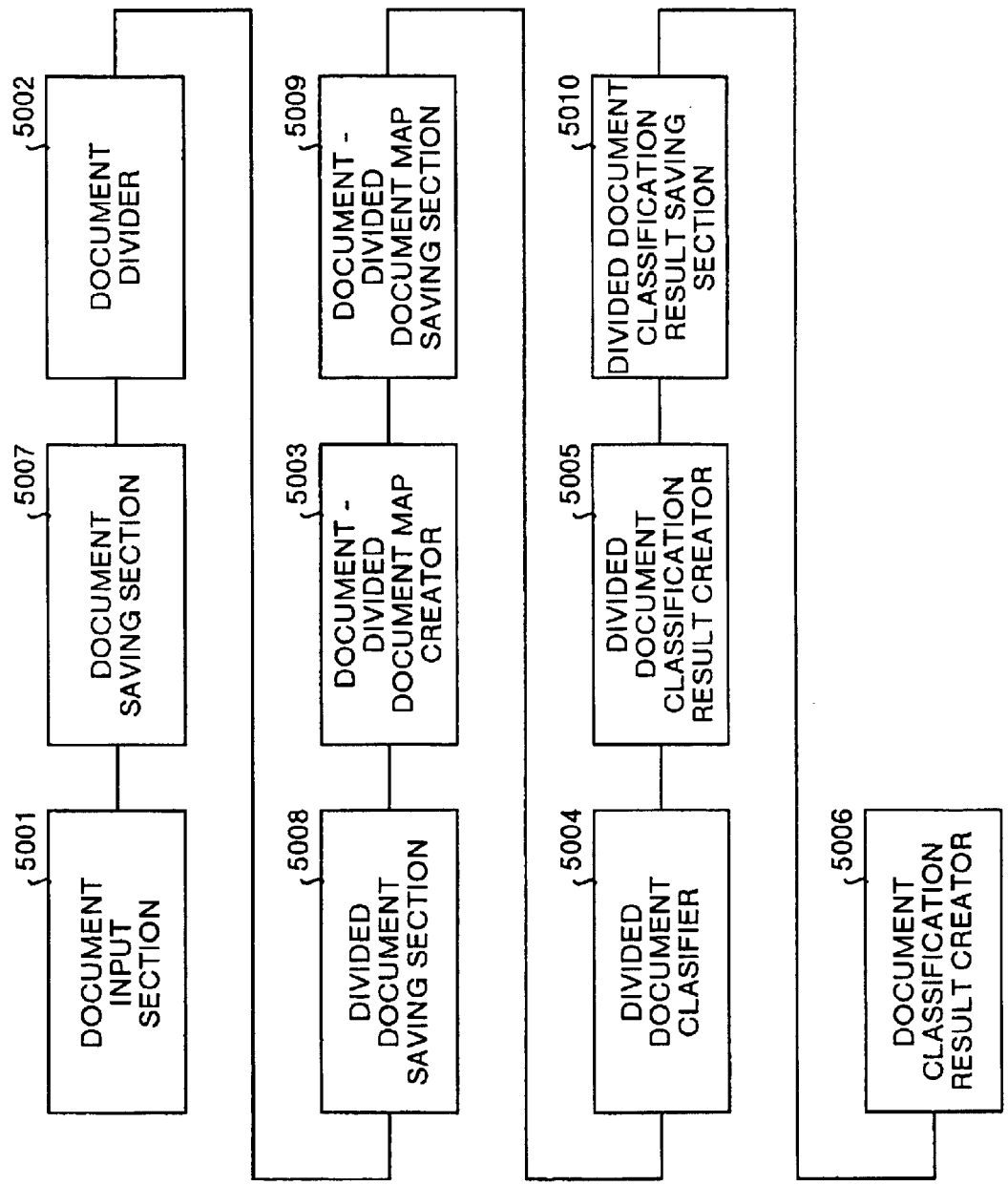
FIG. 48 is a block diagram showing a constitution of a document classification device according to a ninth embodiment of the present invention.

FIG. 48 is a block diagram showing a constitution of the document classification device according to a ninth embodiment of the present invention. As shown in FIG. 48, in addition to the constitution shown in the eighth embodiment of FIG. 47, the document classification device of the present embodiment further comprises a divided document classification result saving section (divided document classification result saving means) 5010 for saving the divided document classification results created by the divided document classification result creator 5005. The divided document classification result saving section 5010 comprise, for example, a shared hard disk, a semiconductor memory, or the like.

Thus, according to the ninth embodiment, since document data, divided document data, document-divided document maps, and divided document classification results are saved, in addition to the effects of the eighth embodiment, it is possible to express the classification result of a single classification in various formats, such as textual format, chart format and graph format. Moreover, since the divided document classification result information is saved, during classifications and analysis of classification results, the user is free to take more time over the operations, and can re-analyze previously classified documents in a variety of formats within any given period of time.

Figure 49:
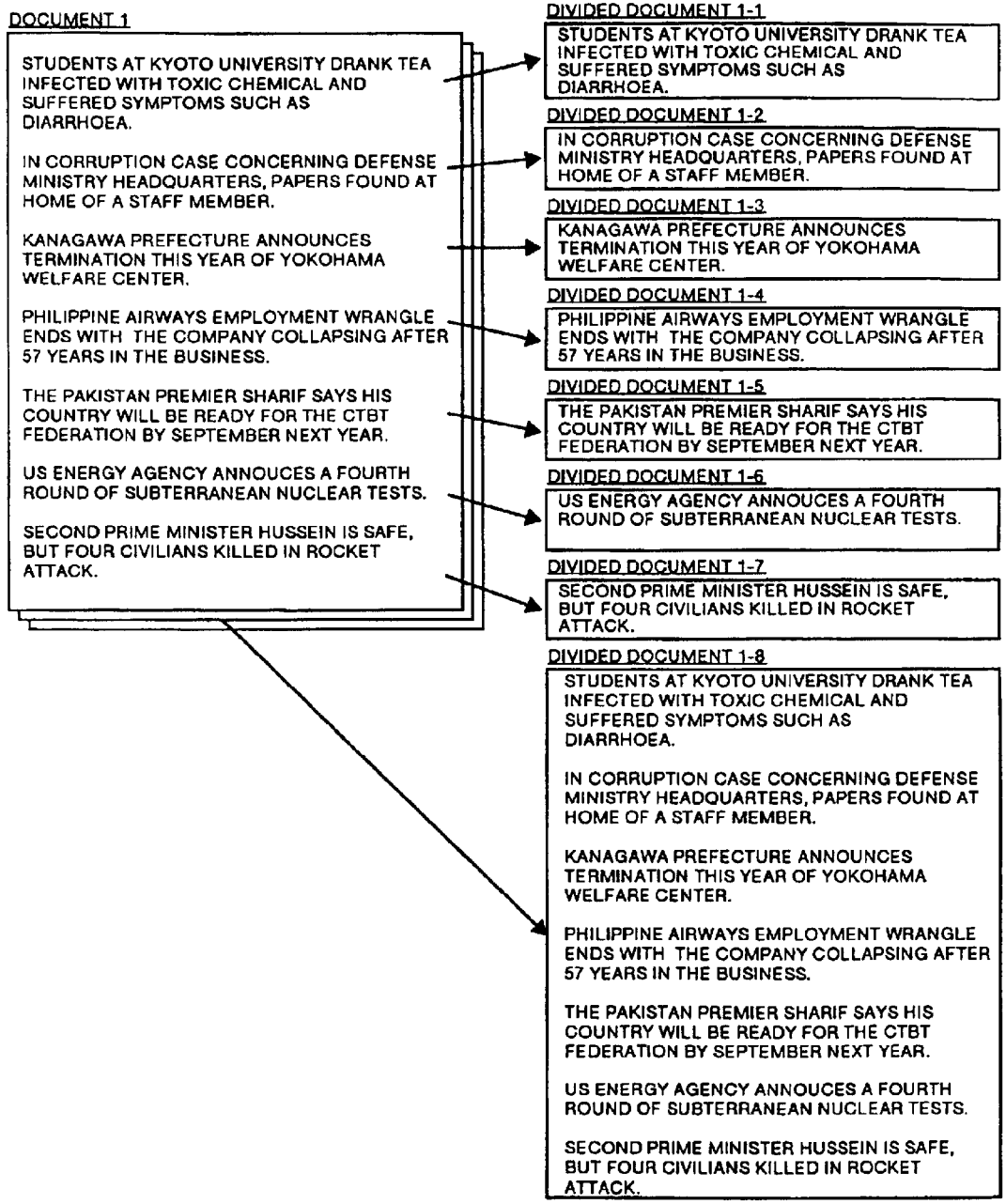
FIG. 49 is a diagram explaining a document classification device and a document classification method according to a tenth embodiment of the present invention.

In the document classification device and document classification method according to the tenth embodiment of the present invention, as shown in FIG. 49, a document 1 comprises document data prior to division, and is contained in multiple divided document data created by the document divider 2. As a consequence, in the present embodiment, the user is able to obtain not only a detailed classification structure of document data, but also a classification structure fusing a schematic macro classification structure, obtained as a result of classifying the document data itself prior to division.

In the document classification device and document classification method according to the eleventh embodiment of the present invention, the document divider 2 divides the document data based on structural information relating to the document data. FIG. 50 shows an example of the document described by classification object document data or HTML-format. Prior to division, structural information is extracted from HTML-format document data such as that shown in FIG. 50, and divided document data is created from document data by setting appropriate division stipulation for the documents using that structure.

That is, taking the tag "L1" in the document data by way of example, it is a stipulation for creating divided document data to "treat text having tag " L1"as one divided document data". By applying this stipulation to the document data, the seven divided documents shown in FIG. 50 are created.

Even when the document does not have a specific structural format such as HTML, XML, SGML, as described above, a stipulation for division can be created from information relating to the size of the letters, the decoration of the letters, the color of the letters, the font, and the like, enabling the document to be divided. Furthermore, when the document data comprises an image, and is input by an OCR device or the like, a stipulation for division can be created using information relating to the original layout of the image, or the like, enabling a divided document to be created.

It is not necessary to use all the document data for the divided document data. For example, in the example shown in FIG. 50, the letter row "News Topic (98/09/25)" is not used in the divided document.

Thus, in the eleventh embodiment, structural information is extracted from the document data, and the structural information is used to set an appropriate stipulation for division prior to dividing the document. As a result, different topics are divided appropriately. Consequently, documents can be classified in such a manner that the detailed classification structure of the document data is known.

Figure 51:
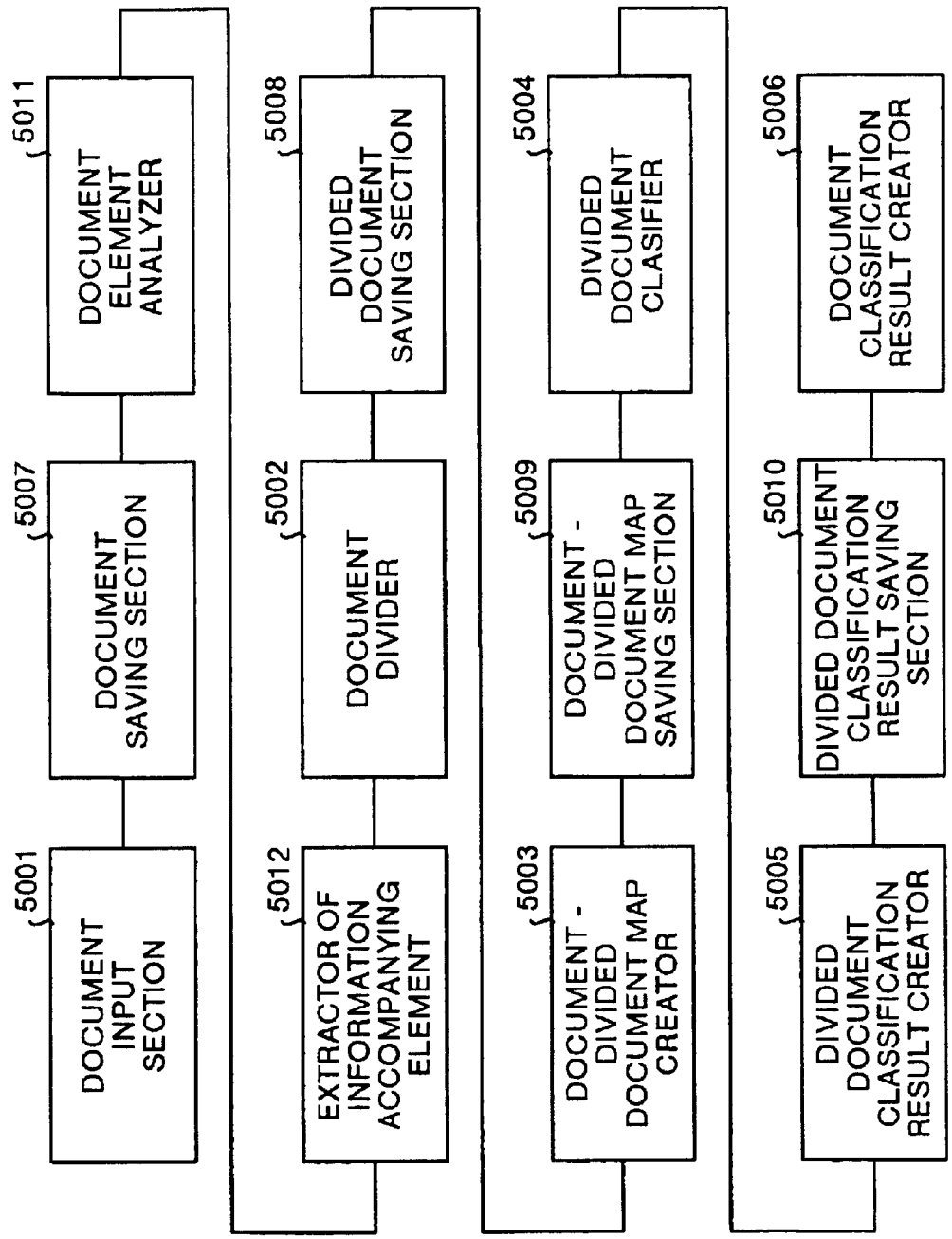
FIG. 51 is a block diagram showing a constitution of a document classification device according to a twelfth embodiment of the present invention.

In the twelfth embodiment, the document classification device and document classification method according to the seventh to tenth embodiments of the present invention, as shown in FIG. 51, further comprise (a) a document element analyzer (document element extraction means) 5011 for extracting elements such as words contained in the document data, and (b) an extractor of information accompanying elements (information accompanying elements extraction means) 5012 for extracting information accompanying the elements such as the part of speech accompanying the elements extracted by the document element analyzer 5011 (FIG. 51 shows an example in which the document element analyzer 5011 and the extractor of information accompanying elements 5012 are additionally provided to the ninth embodiment of FIG. 48). The document divider 5002 divides the document data using the elements extracted by the document element analyzer 5011, and the information accompanying the elements extracted by the extractor of information accompanying elements 5012.

As shown in FIG. 52, prior to division, the document element analyzer 5011, comprising language analysis processing means, extracts from the document data elements such as words, and the extractor of information accompanying elements 5012 extracts information accompanying the elements such as the parts of speech, and an appropriate stipulation for division is set in accordance with the information. The document element analyzer 5011 and the extractor of information accompanying elements 5012 do not have to be newly provided, since similar means in the divided document classifier 5004 can be used instead.

In this embodiment, as for example shown in FIG. 52, the document data comprises a group of multiple news topics having no specific structural information. In this example, the topics are listed after letter rows comprising: Word "topic"+"number"+"return symbol". The above structure is identified from the extraction results of the document element analyzer 5011 and the extractor of information accompanying elements 5012, and after considering the ends of the sentences, the following division stipulation is created: "With the letter row "topic+number+return symbol" as the header, deem a letter row comprising the above letter row, and a letter row surrounded by a document return symbol, to be one divided document data".

More specifically, firstly, only the parts of speech and return symbols are extracted from the extracted words and information about parts of speech and the like. Then, letter rows "topic+number+return symbol" and document end symbols are detected, and their positions in the document are stored. Then, a division stipulation is applied to the document data, creating divided document data such as that shown in FIG. 52.

It is not necessary to use all the document data for the divided document data. For example, in the example shown in FIG. 52, the letter row "News Topic (98/09/25)" is not used in the divided document. Furthermore, in the above example, elements and information accompanying the elements is extracted from the document data in order to set a stipulation for division, but it is acceptable to extract only the elements, and to set a stipulation for division based only on the element information.

Thus, according to the twelfth embodiment, element information and the like is extracted from the document data, and the extracted element information and the like is used to set an appropriate stipulation for division. Consequently, as same as the eleventh embodiment, the document can be classified in such a manner that the detailed classification structure of the document data is known.

Figure 53:
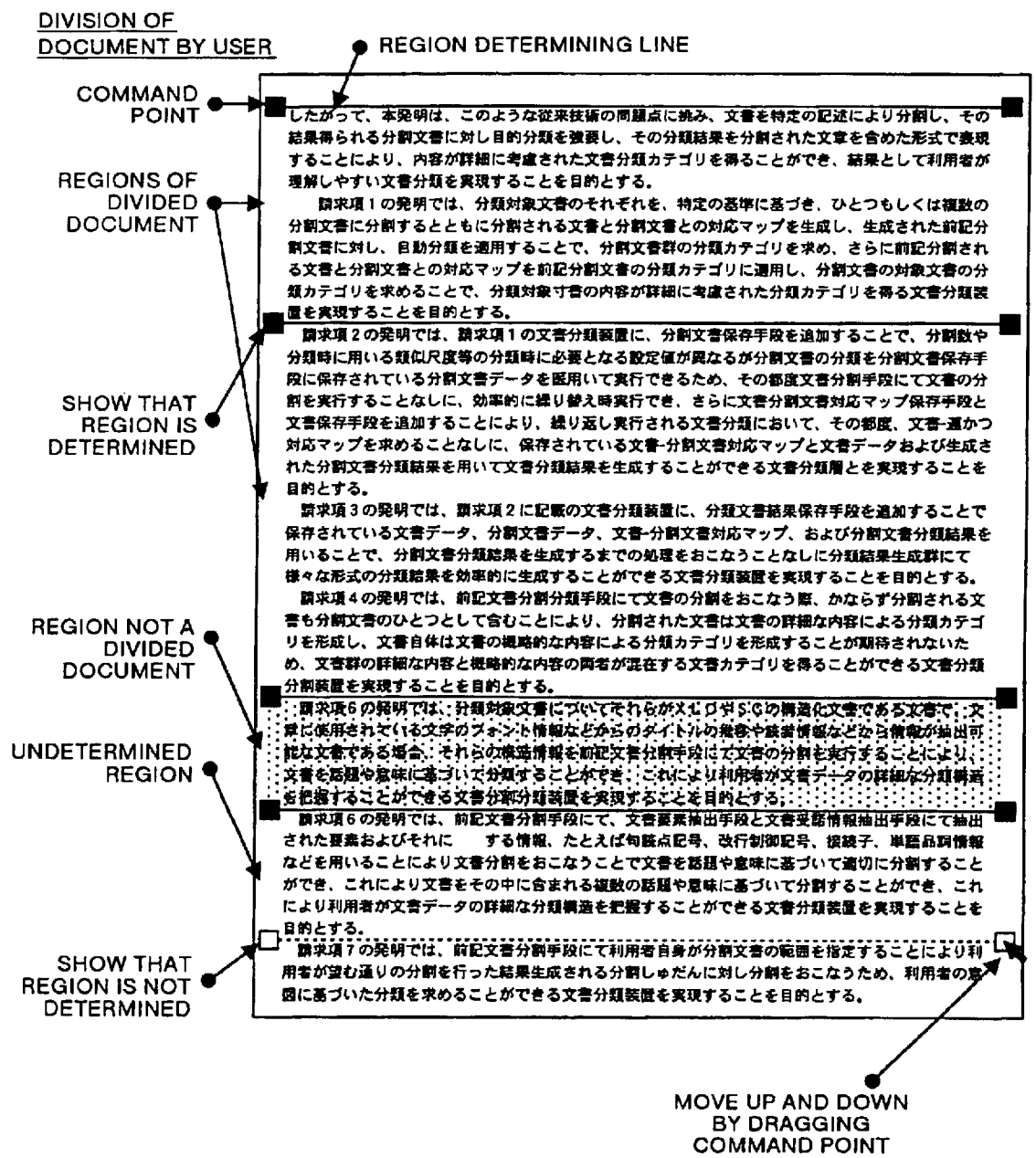
FIG. 53 is a diagram explaining a document classification device and a document classification method according to a thirteenth embodiment of the present invention.

According to the thirteenth embodiment, in the document classification device and document classification method according to the seventh to the tenth embodiments, the document divider 5002 divides data in accordance with a specification range specified by the user. When the user specifies various divided document ranges for document data such as that shown in FIG. 53, the document divider 5002 divides the document in compliance with the specifications.

In the present embodiment, when classifying a document, the document divider 5002 firstly displays on the screen left and right specification points, and a region specification object comprising region specification lines, as the initialized state in the upper part of the document. In this state, by using a pointing device such as a mouse to drag the left or right specification points and move it up and down, the user can select regions of the divided document.

When making a specification, the document divider 5002 shows that a region is being selected by changing the color of the specification pointer from dark to light, and changing the region specification line from a solid line to a broken line. To select a region, the user need only stop dragging the specification point at a position of his own choice.

Next, the user decides whether or not to make the region he or she has selected into a divided document. When he or she decides not to do so, this decision is shown clearly by the document divider 5002 casting a net over the selected region on the screen.

In this way, according to the present embodiment, since the user can select divided document data from document data as he or she wishes, he or she can learn the detailed classification structure of the document data. In addition, the user can classify documents as he or she wishes.

According to the fourteenth embodiment, in the document classification device and document classification method according to the seventh to the tenth embodiments, document data is divided based on the number of letters, the number of sentences, or both the number of letters and the number of sentences. For example, the document data shown in FIG. 54 is divided into units of approximately two hundred letters.

Here, the units each comprise approximately two hundred letters, since there is no guarantee that a unit of exactly two hundred letters will end with a full stop. Therefore, the nearest full stop before or after the two hundredth letter is deemed to be the end of the divided document. In this way, the divided document of FIG. 54 is created. Similarly, documents can be divided into units comprising a predetermined number of sentences, and documents can be divided based on both the number of letters and the number of sentences.

Consequently, according to the fourteenth embodiment, since documents can be divided based on the number of letters, the number of sentences or both the number of letters and the number of sentences, there is an increased capability to classify different documents having contents of different topics and the like. Therefore, as above, documents can be classified so that the detailed classification structure of the document data can be known.

According to the fifteenth embodiment, in the document classification device and document classification method according to the previous embodiments, the document classification result creator 5006 specifies only information representing document data, and representative information accompanying the document data, as classification result information.

Figure 55:
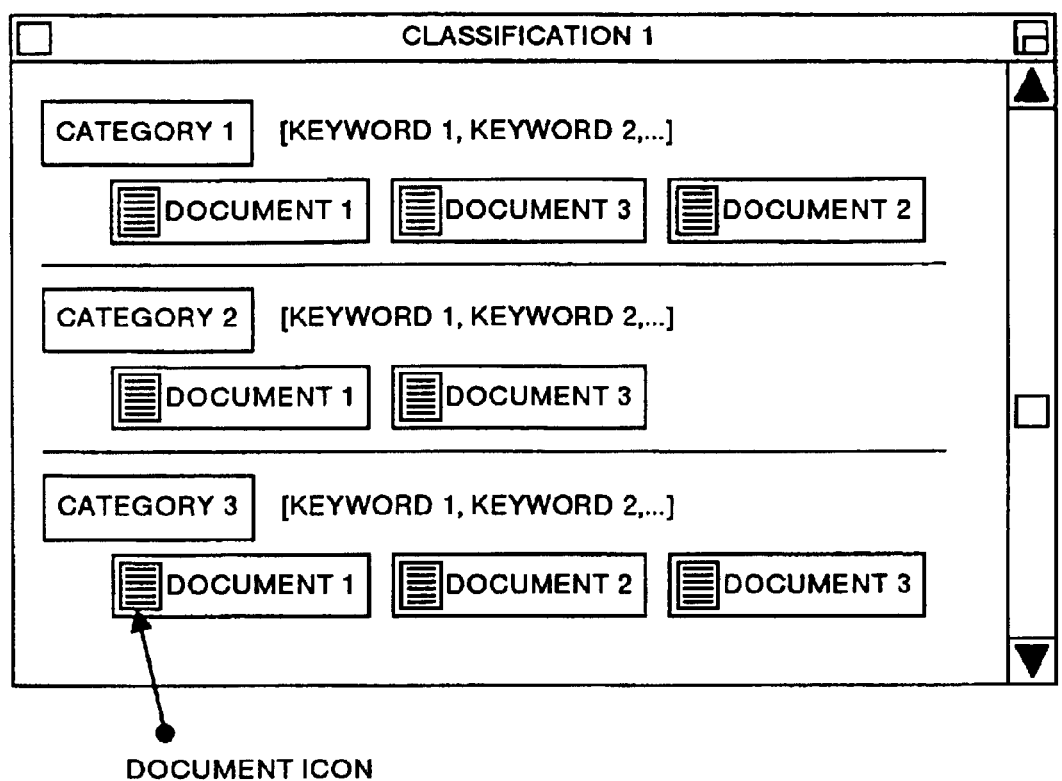
FIG. 55 is a diagram explaining a document classification device and a document classification method according to a fifteenth embodiment of the present invention.

As shown for example in FIG. 55, the classification categories are displayed at the head, key words representing the categories are displayed next to the classification categories, and, for example, the document data name (document name) of the document data contained in the divided document data belonging to the categories is displayed below the category name, as information representing the document data. Furthermore, document icons are displayed on the left of the document data names. When these document icons are specified, the contents of the document data are displayed.

Furthermore, document data names of divided document data having a high degree of similarity to the category representative value are arranged at the head (left side) of the list of document data names. Furthermore, when multiple divided document data created from the same document data belong to the same classification category, only a document data name corresponding to the divided document data having the highest degree of similarity is displayed. The key words are words which appear frequently.

Thus, according to the fifteenth embodiment, since only information representing document data, and representative information accompanying the document data, are displayed as the classification result information, the user can easily comprehend the overall classification structure of the document data in detail.

According to the sixteenth embodiment of the present invention, in addition to specifying the document classification result as in the fifteenth embodiment, information representing divided document data and information accompanying the divided document data are also displayed.

Figure 56:
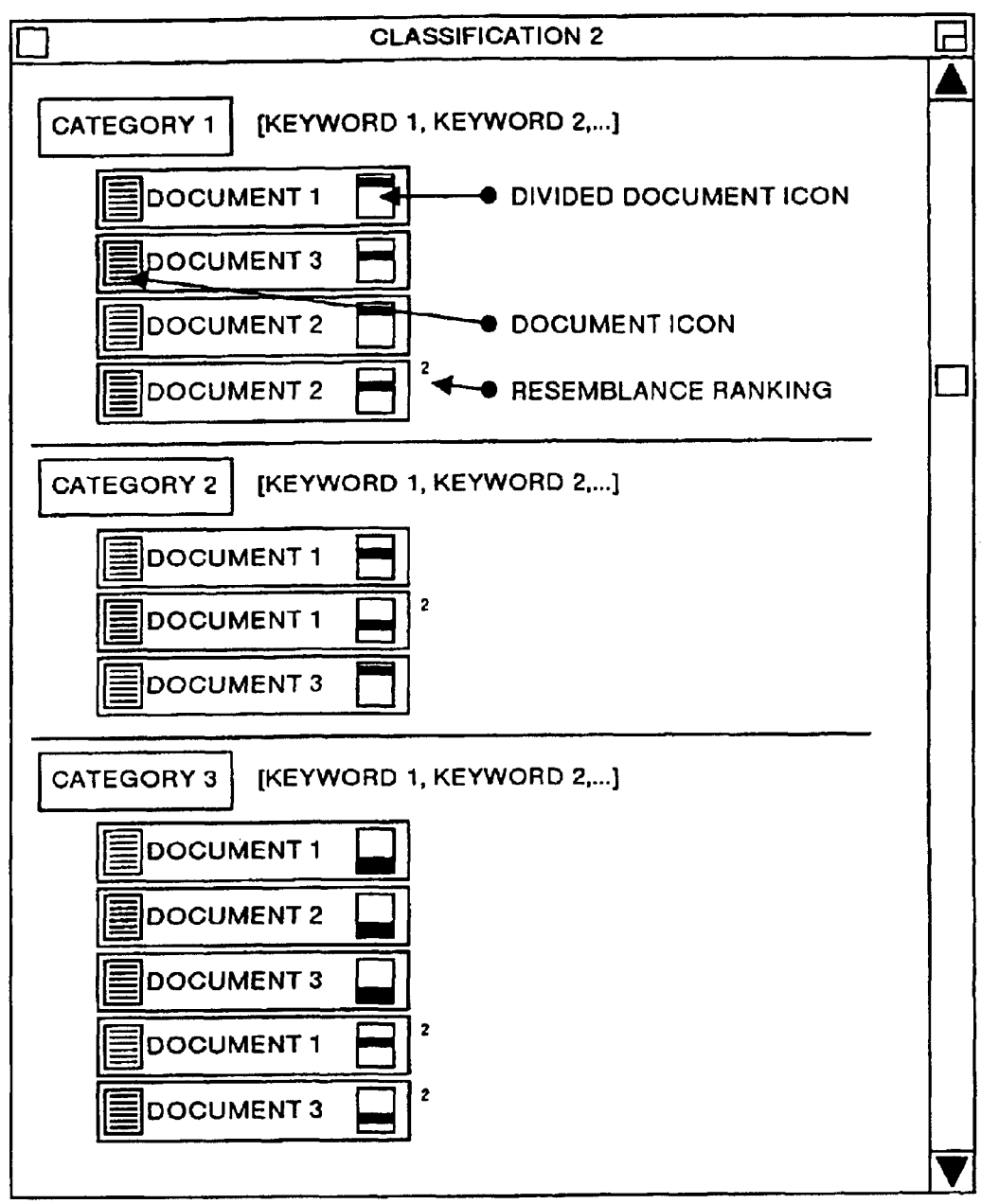
FIG. 56 is a diagram explaining a document classification device and a document classification method according to a sixteenth embodiment of the present invention.

As shown for example in FIG. 56, the classification categories are displayed at the head, key words representing the categories are displayed next to the classification categories, and, for example, the document data name (document name) of the document data contained in the divided document data belonging to the categories is displayed below the category name, as information representing the document data.

Furthermore, document icons are displayed on the left of the document data names. When the document icons are specified, the contents of the document data are displayed. Moreover, divided document icons are displayed on the right of the document data names. The position of divided document data in the document data, and the number of divided documents in the document data, are displayed in the divided document icons. The divided document data in the document data can be displayed by specifying a divided document icon.

Furthermore, document data names of divided document data having a high degree of similarity to the category representative value are arranged at the head of the list of document data names. Furthermore, when multiple divided document data created from the same document data belong to the same classification category, only a document data name corresponding to the divided document data having the highest degree of similarity is displayed.

Thus, according to the sixteenth embodiment, since only information representing document data, representative information accompanying the document data, and information representing divided document data, representative information accompanying the divided document data, are displayed as the classification result information, the user can easily comprehend the overall classification structure of the document data in detail, and can easily comprehend which document data has been classified in which category, and the like.

The document classification device and document classification method of the present invention have been explained above, and programs for executing the document classification method can be recorded on a detachable and computer-readable recording medium, and the document classification according to the present invention can be carried out by the recording medium within the above-mentioned data processing device.

As described above, according to one aspect of this invention, the document processor of the present invention comprises a document memory for storing input document data; a selection unit for selecting all or part of document data stored in the documents memory; a characteristics extraction unit for extracting data relating to characteristics of letter rows from all or part of the document data selected by the selection unit; a work processing unit for work-processing all or part of the document data based on the data relating to characteristics of letter rows extracted by the characteristics extraction unit; and an output unit for outputting all or part of the document data work-processed by the work processing unit. Consequently, when analyzing documents according to their meanings, rather than merely outputting the result of the analysis, the entire information analysis operation can be supported.

Further, the output unit comprises an item value set unit for setting a plurality of item values based on the contents of all or part of the document data work-processed by the work-processing unit; and a totalization unit for totalizing all or part of the document data for each item value set by the item value set unit. Furthermore, the output unit outputs all or part of the document data in the format of a table having an item value as at least one axis. Consequently, the result of the work-processing can easily be expressed in a cross table, and the contents of the information can easily be grasped. Therefore, when analyzing documents according to their meanings, rather than merely outputting the result of the analysis, the entire information analysis operation can be supported.

Further, the output unit outputs all or part of the document data work-processed by the work processing unit together with all or part of the document data in its state prior to work-processing by the work processing unit. Consequently, data to be work-processed and other data can be displayed simultaneously and identified, whereby the range of the work-processing to be carried out can be accurately and easily determined. Therefore, when analyzing documents according to their meanings, rather than merely outputting the result of the analysis, the entire information analysis operation can be supported.

Further, the document memory also stores all or part of the document data work-processed by the work processing unit. Consequently, since other data can be handled simultaneously, when thereafter analyzing documents according to their meanings, rather than merely outputting the result of the analysis, the entire information analysis operation can be supported.

Further, the selection unit further selects all or part of the document data output by the output unit. Consequently, since all or part of the document data output by the output unit can be selected for analysis, a wide variety of information can be analyzed with high precision. Therefore, when analyzing documents according to their meanings, rather than merely outputting the result of the analysis, the entire information analysis operation can be supported.

Further, the document memory further stores data relating to contents of the work processing. Consequently, not only can loss of data relating to the contents of work-processing can be prevented and the data managed easily, but also the relationship between settings used in the work-processing and the processed result can be determined. Therefore, when analyzing documents according to their meanings, rather than merely outputting the result of the analysis, the entire information analysis operation can be supported.

According to the another aspect of this invention, the document classification device according to the present invention comprises an input unit for inputting document data; a language analyzer unit for analyzing document data input by the input unit and obtaining language analysis information; a vector creation unit for document characteristic vectors for the document data based on the language analysis information obtained by the language analyzer unit; a classification unit for classifying documents based on the degree of similarity between document characteristic vectors created by the vector creation unit, and creating clusters of documents; a cluster characteristics calculation unit for calculating cluster characteristics, which are characteristics of clusters of documents created by the classification unit; and a classification category memory for storing cluster characteristics, calculated by the cluster characteristics calculation unit, as constituent elements of classification categories. Consequently, it is possible to obtain clusters, and to structure and categorize the clusters based on their contents using their degree of similarity to the cluster center, and the like. Therefore, it is possible to gradually determine what kind of contents are contained in a given document cluster.

According to the another aspect of this invention, the document classification device comprises an input unit for inputting document data; a language analyzer unit for analyzing document data input by the input unit and obtaining language analysis information; a vector creation unit for creating document characteristic vectors for the document data based on the language analysis information obtained by the language analyzer unit; a classification unit for classifying documents based on the degree of similarity between document characteristic vectors created by the vector creation unit, and creating clusters of documents; a cluster characteristics calculation unit for calculating cluster characteristics, which are characteristics of clusters of documents created by the classification unit; a display unit for displaying the cluster characteristics calculated by the cluster characteristics calculation unit; a cluster selection specification unit for selecting predetermined clusters from cluster of documents created by the classification unit; and a classification category memory for storing cluster characteristics, calculated by the cluster characteristics calculation unit, as constituent elements of classification categories. Consequently, only selected clusters are used, making it possible to structure and categorize to clusters in a manner closer to that desired by the operator. Therefore, it is possible to gradually determine what kind of contents are contained in a given document cluster.

Further, the document classification device of the present invention described above further comprises a document characteristic vector memory for storing document characteristic vectors created by vector creation unit; and a vector correction unit for correcting document characteristic vectors stored in the document characteristic vector memory, so that document characteristic vectors of documents belonging to clusters selected by the cluster selection unit are deleted. Furthermore, the classification unit classifies documents based on the document characteristic vectors corrected by the vector correction unit. Consequently, the effects of clusters which are already known can be eliminated, and new clusters can be created. Therefore, it is possible to gradually determine what kind of contents are contained in a given document cluster.

Further, the document classification device of the present invention described above further comprises a document characteristic vector memory for storing document characteristic vectors created by vector creation unit; and a document expression space correction unit for correcting document expression space when determining the degree of similarity between document characteristic vectors stored in the document characteristic vectors memory, based on a characteristics amount calculated from clusters selected by the cluster selection unit. Furthermore, the classification unit classifies documents based on the degree of similarity between document characteristic vectors created by the vector creation unit, using the document expression space corrected by the document expression space correction unit. Consequently, cluster characteristics selected by the operator in the previous classification can be eliminated from the next classification, enabling new clusters to be created. Therefore, it is possible to gradually determine what kind of contents are contained in a given document cluster.

Further, the document classification device of the present invention described above further comprises a document characteristic vector memory for storing document characteristic vectors created by vector creation unit; and a document expression space correction unit for correcting document expression space when determining the degree of similarity between document characteristic vectors stored in the document characteristic vectors memory, based on a characteristics amount calculated from clusters selected by the cluster selection unit. Furthermore, the classification unit classifies documents based on the degree of similarity between document characteristic vectors created by the vector creation unit, using the document expression space corrected by the document expression space correction unit. Consequently, influences of the known cluster can be eliminated and cluster characteristics selected by the operator in the previous classification can be eliminated from the next classification, enabling new clusters to be created. Therefore, it is possible to gradually determine what kind of contents are contained in a given document cluster.

Further, the document classification device of the present invention described in above further comprises a selection information appending unit for appending selection information showing the fact of selection when all or part of the documents belonging to a cluster of documents created by the classification unit have been selected. Furthermore, the display unit displays the cluster characteristics, and also displays the selection information appended by the selection information appending unit. Consequently, it is possible to improve the ability to identify documents used on multiple occasions, and the ability to identify documents which have not been selected at all. Therefore, it is possible to gradually determine what kind of contents are contained in a given document cluster.

Further, the classification category memory stores cluster characteristics and/or information created by an operator, in addition to all or part of the documents belonging to a cluster of documents selected by the selection specification unit, as constituent elements of classification categories. Consequently, the contents of clusters can be easily recognized, and in addition, the operator can easily create his own classification categories, thereby improving the usefulness of the classification categories. Therefore, it is possible to gradually determine what kind of contents are contained in a given document cluster.

According to still another aspect of this invention, the document classification device for classifying document clusters in accordance with contents thereof of the present invention comprises a document input unit for inputting document data groups; a document dividing unit for dividing document data into one or multiple divided document data based on a predetermined reference; a document-divided document map creation unit for creating a map showing the correspondence between the document data and the divided document data; a divided document classification unit for classifying the divided document data; a divided document classification result creation unit for creating divided document classification result information based on a classification result of the divided document classification unit; and a document classification result creation unit for creating classification result information of the above document data using the document-divided document map and the divided document classification result information. Consequently, when one document contains multiple topics and meanings, these can be classified into categories according to specific topics and meanings, so that the classifications do not differ from categories desired by a user, thereby enabling the user to easily comprehend the classification categories. Furthermore, since the positions of the divided documents in documents prior to division (documents belonging to the clusters) is displayed, the user is able to efficiently read the parts of the document clusters he or she wishes to read.

Further, the document classification device of the present invention described above further comprises a document save unit for saving the document data; a divided document save unit for saving the divided document data; and a document divided document map save unit for saving a document-divided document map created by the document-divided document map creation unit. Consequently, for a single document data, it is possible to efficiently determine classification results having different parameters such as the number of classifications, the classification method, and the settings used in the classifications, without recreating the divided document data and the document-divided document map. Furthermore, by classifying the document data and saving the data needed to create the classification result, the user is free to take more time over the classification, an d to reanalyze previously classified documents within a given period of time.

Further, the document classification device of the present invention described above further comprises a divided document classification result save unit for saving divided document classification result information created by the divided document classification result creation unit. Consequently, in addition to the effects achieved by the specific arrangement of the present invention described above, after one classification has been carried out, the result of that classification can be expressed in a variety of formats such as text, charts, graphs, and the like. Furthermore, by saving the divided document classification result information, the user is free to take more time over classifications and analysis of classification results, and to re-analyze previously classified documents in a variety of formats within a given period of time.

Further, the multiple divided document data created by the document dividing unit contains the document data in its state prior to being divided. Consequently, in addition to a classification structure of detailed document data, obtained by classifying the divided document data, the user is able to obtain a classification structure fusing a schematic macro classification as a result classifying the document data itself prior to division.

Further, the document dividing unit divides document data based on information relating to the structure of the document data. Consequently, division and the like of different topics can be carried out, whereby documents can be classified in such a manner that the detailed classification structures of their document data can be known.

Further, the document classification device further comprises a document element extraction unit for extracting elements in the document data; an element-accompanying information extraction unit for extracting element-accompanying information accompanying the elements extracted by the document element extraction unit. Furthermore, the document dividing unit divides the document data using elements extracted by the document element extraction unit, or the elements and element-accompanying information extracted by the element-accompanying information extraction unit. Consequently, documents can be classified so that the detailed classification structure of the document data can be known.

Further, the document dividing unit divides document data in compliance with a specified specification range. Consequently, documents can be classified in accordance with the wishes of the user, and so that the detailed classification structure of the document data can be known.

Further, the document dividing unit divides document data based on the number of letters, the number of sentences, or both the number of letters and the number of sentences. Consequently, there is an increased capability to classify different documents having contents of different topics and the like. Therefore, as above, documents can be classified so that the detailed classification structure of the document data can be known.

Further, the document classification result creation unit extracts and presents information showing document data, and representative information accompanying the document data, as classification result information. Consequently, the user is able to determine a detailed schematic structure or overall structure of the document data.

Further, the document classification result creation unit extracts and presents information showing divided document data, and representative information accompanying the divided document data, as classification result information. Consequently, the user is able to determine a detailed schematic structure or overall structure of the document data. In addition, the user can easily determine which divided document has been classified in a given category.

According to still another aspect of this invention, the document processing method of the present invention outputs multiple input document data in order to display or print the document data in a predetermined format, and comprises the steps of storing input document data; selecting all or part of the document data stored in the storing step; extracting data relating to characteristics of letter rows from all or part of the document data selected by the selection step; work-processing all or part of the document data based on the data relating to characteristics of letter rows extracted in the characteristics extraction step; and outputting all or part of the document data work-processed in the work processing step. Consequently, when analyzing documents according to their meanings, rather than merely outputting the result of the analysis, the entire information analysis operation can be supported.

Further, the step of outputting comprises the steps of setting a plurality of item values based on the contents of all or part of the document data work-processed in the work-processing step; and totalizing all or part of the document data for each item value set in the item value set step; and outputs all or part of the document data in the format of a table having an item value as at least one axis. Consequently, the result of the work-processing can easily be expressed in a cross table, and the contents of the information can easily be grasped. Therefore, when analyzing documents according to their meanings, rather than merely outputting the result of the analysis, the entire information analysis operation can be supported.

Further, the step of outputting further comprises outputting all or part of the document data work-processed in the work processing step together with all or part of the document data in its state prior to work-processing in the work processing step. Consequently, data to be work-processed and other data can be displayed simultaneously and identified, whereby the range of the work-processing to be carried out can be accurately and easily determined. Therefore, when analyzing documents according to their meanings, rather than merely outputting the result of the analysis, the entire information analysis operation can be supported.

Further, the step of storing further comprises storing all or part of the document data work-processed in the work processing step. Consequently, since other data can be handled simultaneously, when thereafter analyzing documents according to their meanings, rather than merely outputting the result of the analysis, the entire information analysis operation can be supported.

Further, the step of selecting further comprises selecting all or part of the document data output in the output step. Consequently, since all or part of the document data output in the output step can be selected for analysis, a wide variety of information can be analyzed with high precision. Therefore, when analyzing documents according to their meanings, rather than merely outputting the result of the analysis, the entire information analysis operation can be supported.

Further, the step of storing a document further comprises storing data relating to contents of the work processing. Consequently, not only can loss of data relating to the contents of work-processing can be prevented and the data managed easily, but also the relationship between settings used in the work-processing and the processed result can be determined. Therefore, when analyzing documents according to their meanings, rather than merely outputting the result of the analysis, the entire information analysis operation can be supported.

According to still another aspect of this invention, the document classification method of the present invention comprises the steps of inputting document data; language-analyzing document data input in the step of inputting and obtaining language analysis information; creating document characteristic vectors for the document data based on the language analysis information obtained in the step of language-analyzing; classifying documents based on the degree of similarity between document characteristic vectors created in the step of creating vectors, and creating clusters of documents; calculating cluster characteristics, being characteristics of clusters of documents created in the step of classifying; and storing cluster characteristics, calculated in the step of calculating cluster characteristics, as constituent elements of classification categories. Consequently, it is possible to obtain clusters, and to structure and categorize the clusters based on their contents using their degree of similarity to the cluster center, and the like. Therefore, it is possible to gradually determine what kind of contents are contained in a given document cluster.

According to still another aspect of this invention, the document classification method of the present invention comprises the steps of inputting document data; language-analyzing document data input in the step of inputting and obtaining language analysis information; creating document characteristic vectors for the document data based on the language analysis information obtained in the step of language-analyzing; classifying documents based on the degree of similarity between document characteristic vectors created in the step of creating vectors, and creating clusters of documents; calculating cluster characteristics, which are characteristics of clusters of documents created in the step of classifying; displaying the cluster characteristics calculated in the step of calculating cluster characteristics; selecting predetermined clusters from cluster of documents created in the step of classifying; and storing cluster characteristics, calculated in the step of calculating cluster characteristics, as constituent elements of classification categories. Consequently, only selected clusters are used, making it possible to structure and categorize to clusters in a manner closer to that desired by the operator. Therefore, it is possible to gradually determine what kind of contents are contained in a given document cluster.

Further, the document classification method of the present invention described above further comprises a step of correcting document characteristic vectors stored in the step of storing document characteristic vectors, so that document characteristic vectors of documents belonging to clusters selected by the step of selecting clusters are deleted. Furthermore, the step of classifying comprises classifying documents based on the document characteristic vectors corrected by the step of correcting vectors. Consequently, the effects of clusters which are already known can be eliminated, and new clusters can be created. Therefore, it is possible to gradually determine what kind of contents are contained in a given document cluster.

Further, the document classification method of the present invention described above further comprises a step of correcting document expression space when determining the degree of similarity between document characteristic vectors stored in the step of storing document characteristic vectors, based on a characteristics amount calculated from clusters selected in the step of selecting clusters, and the step of classifying comprises classifying documents based on the degree of similarity between document characteristic vectors created in the step of creating vectors, using the document expression space corrected in the step of correcting the document expression space. Consequently, cluster characteristics selected by the operator in the previous classification can be eliminated from the next classification, enabling new clusters to be created. Therefore, it is possible to gradually determine what kind of contents are contained in a given document cluster.

Further, the document classification method of the present invention described above further comprises the steps of correcting document expression space when determining the degree of similarity between document characteristic vectors stored in the step of storing document characteristic vectors, based on a characteristics amount calculated from clusters selected in the step of selecting clusters. Furthermore, the step of classifying comprises classifying documents based on the degree of similarity between document characteristic vectors created in the step of creating vectors, using the document expression space corrected in the step of correcting the document expression space. Consequently, influences of the known cluster can be eliminated and cluster characteristics selected by the operator in the previous classification can be eliminated from the next classification, enabling new clusters to be created. Therefore, it is possible to gradually determine what kind of contents are contained in a given document cluster.

Further, the document classification method of the present invention described above further comprises the steps of appending selection information showing the fact of selection when all or part of the documents belonging to a cluster of documents created in the step of classifying have been selected. Furthermore, the step of displaying comprises displaying the cluster characteristics, and displaying the selection information appended in the step of appending selection information. Consequently, it is possible to improve the ability to identify documents used on multiple occasions, and the ability to identify documents which have not been selected at all. Therefore, it is possible to gradually determine what kind of contents are contained in a given document cluster.

Further, the step of creating classification categories comprises creating cluster characteristics and/or information created by an operator, in addition to all or part of the documents belonging to a cluster of documents selected in the step of specifying selection, as constituent elements of classification categories. Consequently, the contents of clusters can be easily recognized, and in addition, the operator can easily create his own classification categories, thereby improving the usefulness of the classification categories. Therefore, it is possible to gradually determine what kind of contents are contained in a given document cluster.

According to still another aspect of this invention, the document classification method according to the present invention comprises the steps of inputting document data groups; dividing document data into one or multiple divided document data based on a predetermined reference; creating a map showing the correspondence between the document data and the divided document data; classifying the divided document data; creating divided document classification result information based on the classification result of classifying the divided documents; and creating classification result information of the document data using the document-divided document map and the divided document classification result information. Consequently, when one document contains multiple topics and meanings, these can be classified into categories according to specific topics and meanings, so that the classifications do not differ from categories desired by a user, thereby enabling the user to easily comprehend the classification categories. Furthermore, since the positions of the divided documents in documents prior to division (documents belonging to the clusters) is displayed, the user is able to efficiently read the parts of the document clusters he or she wishes to read.

According to still another aspect of this invention, a computer-readable recording medium of the present invention stores programs for executing the above-described document classification method on a computer, thereby making the program readable mechanically, and enabling the operation of the document classification method to be executed by a computer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A document classification device which classifies documents based on contents thereof comprising:
   an input unit which inputs a document data;
   a language analyzer unit which analyzes document data input by said input unit and obtains language analysis information;
   a vector creation unit which creates document characteristic vectors for the document data based on the language analysis information obtained by said language analyzer unit;
   a classification unit which classifies documents based on the degree of similarity between document characteristic vectors created by said vector creation unit, and creates clusters of documents;
   a cluster characteristics calculation unit which calculates cluster characteristics, which are characteristics of clusters of documents created by said classification unit;
   a display unit which displays the cluster characteristics calculated by said cluster characteristics calculation unit;
   a cluster selection specification unit which selects predetermined clusters from cluster of documents created by said classification unit;
   a classification category memory which stores cluster characteristics, calculated by said cluster characteristics calculation unit, as constituent elements of classification categories;
   a document characteristic vector memory which stores document characteristic vectors created by said vector creation unit; and
   a vector correction unit which corrects document characteristic vectors stored in said document characteristic vector memory so that document characteristic vectors of documents belonging to clusters selected by said cluster selection unit are deleted.

2. The document classification device according to claim 1,
   wherein said classification unit classifies documents based on the document characteristic vectors corrected by said vector correction unit.

3. The document classification device according to claim 1, further comprising
   a document expression space correction unit which corrects document expression space when determining the degree of similarity between document characteristic vectors stored in said document characteristic vectors memory, based on a characteristics amount calculated from clusters selected by said cluster selection unit,
   wherein said classification unit classifies the documents based on the degree of similarity between document characteristic vectors created by said vector creation unit, using the document expression space corrected by said document expression space correction unit.

4. The document classification device according to claim 1, further comprising a selection information appending unit which appends selection information showing the fact of selection when all or part of the documents belonging to a cluster of documents created by said classification unit have been selected,
   wherein said display unit displays the cluster characteristics, and the selection information appended by said selection information appending unit.

5. The document classification device according to claim 1, wherein said classification category memory stores cluster characteristics and/or information created by an operator, in addition to all or part of the documents belonging to a cluster of documents selected by said selection specification unit, as constituent elements of classification categories.

6. A document classification method of classifying documents based on contents thereof, comprising the steps of:
   inputting a document data;
   language-analyzing document data input in the step of inputting and obtaining language analysis information;
   creating document characteristic vectors for the document data based on the language analysis information obtained in the step of language-analyzing;
   classifying documents based on the degree of similarity between document characteristic vectors created in the step of creating vectors, and creating clusters of documents;

calculating cluster characteristics, which are characteristics of clusters of documents created in the step of classifying;

displaying the cluster characteristics calculated in the step of calculating cluster characteristics;

selecting predetermined clusters from cluster of documents created in the step of classifying;

storing cluster characteristics, calculated in the step of calculating cluster characteristics, as constituent elements of classification categories;

storing document characteristics vector created in the step of creating document characteristic vectors; and correcting document characteristic vectors stored in the step of storing document characteristic vectors, so that document characteristic vectors of documents belonging to clusters selected by the step of selecting clusters are deleted.

7. The document classification method according to claim 6, wherein the step of classifying comprising classifying documents based on the document characteristic vectors corrected by the step of correcting vectors.

8. The document classification method according to claim 6, further comprising a step of correcting document expression space when determining the degree of similarity between document characteristic vectors stored in the step of storing document characteristic vectors, based on a characteristics amount calculated from clusters selected in the step of selecting clusters, wherein the step of classifying comprises classifying documents based on the degree of similarity between document characteristic vectors created in the step of creating vectors, using the document expression space corrected in the step of correcting the document expression space.

9. The document classification method according to claim 6, further comprising the steps of appending selection information showing the fact of selection when all or part of the documents belonging to a cluster of documents created in the step of classifying have been selected, wherein the step of displaying comprising displaying the cluster characteristics, and the selection information appended in the step of appending selection information.

10. The document classification device according to claim 6, wherein the step of creating classification categories comprises creating cluster characteristics and/or information created by an operator, in addition to all or part of the documents belonging to a cluster of documents selected in the step of specifying selection, as constituent elements of classification categories.

11. A computer-readable recording medium in which is stored programs for executing a document classification method, which document classification method comprising the steps of:

inputting a document data;

language-analyzing document data input in the step of inputting and obtaining language analysis information;

creating document characteristic vectors for the document data based on the language analysis information obtained in the step of language-analyzing;

classifying documents based on the degree of similarity between document characteristic vectors created in the step of creating vectors, and creating clusters of documents;

calculating cluster characteristics, which are characteristics of clusters of documents created in the step of classifying;

displaying the cluster characteristics calculated in the step of calculating cluster characteristics;

selecting predetermined clusters from cluster of documents created in the step of classifying;

storing cluster characteristics, calculated in the step of calculating cluster characteristics, as constituent elements of classification categories;

storing document characteristics vector created in the step of creating document characteristic vectors; and correcting document characteristic vectors stored in the step of storing document characteristic vectors, so that document characteristic vectors of documents belonging to clusters selected by the step of selecting clusters are deleted.

* * * * *